United States Patent [19]

Lubarsky

[11] Patent Number: 5,124,943
[45] Date of Patent: Jun. 23, 1992

[54] DIGITAL NETWORK UTILIZING TELEPHONE LINES

[75] Inventor: Daniel P. Lubarsky

[73] Assignee: Pacific Bell, San Francisco, Calif.

[21] Appl. No.: 234,920

[22] Filed: Aug. 22, 1988

[51] Int. Cl.$^5$ .................. G06F 13/36; G06F 13/42; G06F 13/376

[52] U.S. Cl. .............................. 395/200; 364/940.8; 364/940.92; 364/940.62; 364/940.64; 364/940.61; 364/242.94; 364/242.96; 364/940.9; 364/941.8; 364/DIG. 1; 364/DIG. 2

[58] Field of Search ........................... 364/200, 900

[56] References Cited

U.S. PATENT DOCUMENTS

| | | | |
|---|---|---|---|
| 4,335,426 | 6/1982 | Maxwell et al. | 364/200 |
| 4,377,862 | 3/1983 | Koford et al. | 364/200 |
| 4,463,448 | 7/1984 | Grimes | 364/200 |
| 4,468,734 | 8/1984 | Lanier et al. | 364/200 |
| 4,493,021 | 1/1985 | Agrawal et al. | 364/200 |
| 4,502,111 | 2/1985 | Riffe et al. | 364/200 |
| 4,511,958 | 4/1985 | Funk | 364/200 |
| 4,513,370 | 4/1985 | Ziv et al. | 364/200 |
| 4,590,468 | 5/1986 | Stieglitz | 364/200 |
| 4,642,755 | 2/1987 | Hinch | 364/200 |
| 4,660,201 | 4/1987 | Nakamura | 371/61 |
| 4,750,109 | 6/1988 | Kita | 364/200 |
| 4,777,595 | 10/1988 | Strecker et al. | 364/200 |
| 4,788,637 | 11/1988 | Tamaru | 364/200 |
| 4,793,813 | 12/1988 | Bitzer et al. | 434/335 |
| 4,890,222 | 12/1989 | Kirk | 364/200 |
| 4,894,823 | 1/1990 | Adelmann | 370/60 |
| 4,914,618 | 4/1990 | Dodge | 364/900 |
| 4,920,534 | 4/1990 | Adelmann et al. | 364/200 |
| 4,991,079 | 2/1991 | Dann | 364/200 |

OTHER PUBLICATIONS

Dunbar, B. J. et al., "Dataport-Channel Units for Digital Data System 56-kb/s Rate", *The Bell System Technical Journal*, vol. 61, No. 9, Nov. 1982, pp. 2741-2756.

Albert, W. G., et al., "Digital Terminal Physical Design", *The Bell System Technical Journal*, vol. 61, No. 9, Nov. 1982, pp. 2757-2790.

*Primary Examiner*—Michael R. Fleming
*Assistant Examiner*—Christopher B. Shin
*Attorney, Agent, or Firm*—McCubbrey, Bartels, Meyer & Ward

[57] ABSTRACT

An improved computer network which utilizes the communication lines of a telephone system to provide connections between computing equipment in geographically mode area is described. The network utilizes a plurality of network units which are coupled by communication links within a telephone system. Each of the network units transmits user data and commands directed to other network units. Each of the network units monitors transmission errors within the telephone system. The data transmission rate within the network can be automatically varied in response to the observed error rate in a manner which reduces transmission errors within the network. When the transmission errors subside, the transmission rate is automatically increased to provide greater data throughput. The network includes features that allow it to be topologically altered without the need to send telephone technicians to the various locations serviced thereby.

16 Claims, 6 Drawing Sheets

DIGITAL NETWORK UTILIZING TELEPHONE LINES

BACKGROUND OF THE INVENTION

The present invention relates to the area of digital networks for connecting a plurality of computers to form a computer network and more particularly to computer networks that utilize the telephone lines for the transmission of data therein.

Many businesses have computer networks which extend over large geographic areas. The most economical manner for implementing such networks utilizes existing telephone lines to connect the various computers in the network. Computer networks that utilize the telephone system are known to the prior art. However, these computer networks are less than ideal.

First, prior art computer networks are difficult to reconfigure either with regard to the speed at which data is transmitted within the telephone system or with regard to the topological configuration of the computer network. In prior art computer networks, telephone company technicians must be dispatched to various locations within the telephone system to affect a data rate change in the computer network. If the new data rate is not one of a small number of existing rates, the actual interface circuitry within the telephone system must often be changed. As a result, it is practically impossible to change data rates in response to short-term changes in the quality of the telephone lines carrying the data.

The telephone lines used for carrying the user's computer data are, in general, identical to the lines used to carry voice communications within the telephone system. These lines are bundled into cables with similar lines. The noise level on these lines depends upon a number of factors including the nature of the transmissions on adjacent lines in the cables. Since the traffic on the adjacent lines varies with time, the noise levels on the lines used for the computer network will, in general, vary with the time of day or the day of the week.

One method of reducing data errors resulting from increased noise on the telephone lines is to reduce the speed at which data is transmitted over these lines. However, given the difficulty in shifting the speed of prior art computer networks, this option is difficult, if not impossible, to implement in a practical manner. Hence, prior art computer networks are normally set up at a sufficiently low data rate to assure an acceptable data error rate. As a result, the increased capacity that is available during those times of the day at which the noise levels are reduced is not available.

In addition to being able to alter the speed in response to noise levels, it would be particularly advantageous to be able to change the topological configuration of the computer network. Such reconfiguration is useful in smoothing peak loads on the computer network. Such reconfigurability would also be useful in transferring specific services to offices in an earlier time zones when the office providing the service in another time zone closed at the end of the day. In prior art systems, such reconfiguration requires that key components of the computer network be rewired by telephone company personnel or that special purpose hardware be installed at significant cost.

Second, prior art computer networks do not allow the user to monitor and manage the computer network. If a failure occurs in the computer network, it often requires telephone company technicians to ascertain the location of the failure within the system. The time delays in waiting for such determinations to be made are often unacceptable. It would be advantageous to provide a means for allowing the network user to set loopbacks and other diagnostic aids within the computer network without the time delays and added expense inherent when telephone company personnel must be involved. Similarly, the computer network user would like to be able to access data showing error rates on the various communication links in the computer network. Such facilities are not provided by prior art computer networks that utilize the telephone system.

Broadly, it is an object of the present invention to provide an improved computer network that utilizes the telephone lines for communication among the computers therein.

It is a further object of the present invention to provide a computer network in which the speed of data transmission can be altered by the computer network user.

It is yet another object of the present invention to provide a computer network in which the speed of data transmission can be altered automatically in response to the observed transmission error rates in the computer network.

It is a still further object of the present invention to provide a computer network which allows automatic reconfiguration to a new topology without the need for rewiring system components.

These and other objects of the present invention will become apparent to those skilled in the art from the following detailed description of the invention and the accompanying drawings.

SUMMARY OF THE INVENTION

A computer network according to the present invention is adapted for coupling computing equipment located in a plurality of subscriber locations through a telephone system. The network comprises a plurality of networks units coupled by communication links. The links in question include subscriber loops for coupling equipment on a user's premises to telephone network units in a central office of a telephone system and time domain multiplexed communication links. Time domain multiplexed communication links are used to transmit data from the central office in question to other central offices within the telephone system. Each network unit includes means for transmitting and receiving digital data in a first mode in which said data is organized into frames on the communication links. Each frame includes synchronization data, command data, error correcting data, and user data. Each network unit includes means for storing an address identifying the network unit in question. Each network unit also includes means for receiving commands from other network units in the computer network. The commands in question are specified by command data in the frames received by the network unit. Commands received by the network unit which specify said network unit as the target thereof are executed by said network unit. Each network unit can also generate commands in response to a received command included in the command data contained in a frame received by the network unit. The so generated commands are transmitted to other network units in the computer network by inserting the commands in the command data of the next frame transmitted by the network unit.

DETAILED DESCRIPTION OF THE INVENTION

Exemplary Network Using The Present Invention

Figure 1:
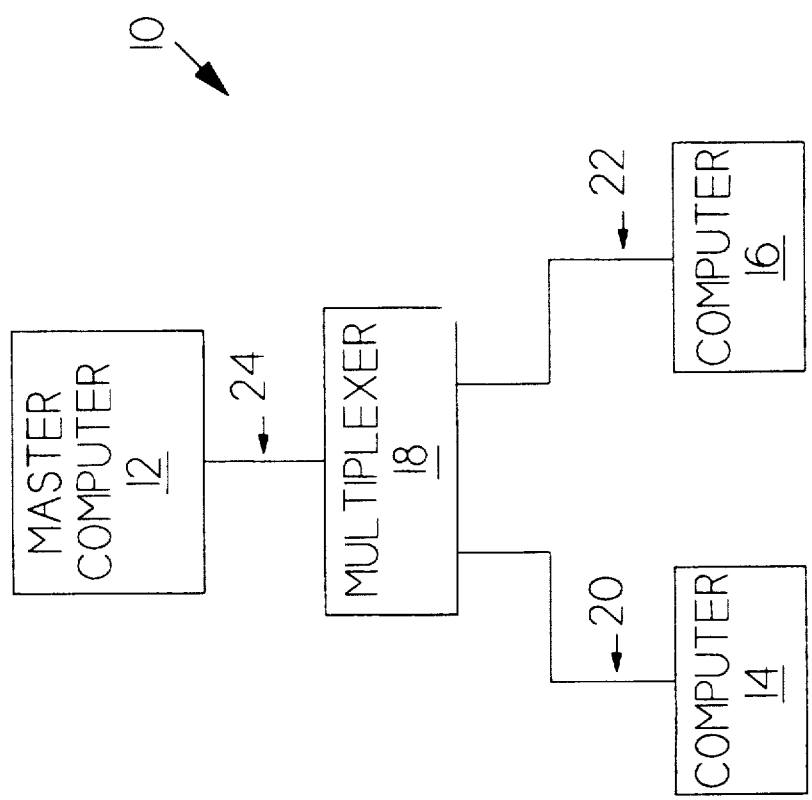
FIG. 1 is a block diagram of a simple computer network.

The present invention can be most easily understood with reference to the simple computer network shown in FIG. 1 at 10. Computer network 10 includes three computers 12, 14 and 16. Computer 12 is the master computer. Computers 14 and 16 are slave computers which communicate with master computer 12 under the control of master computer 12.

A multiplexer 18 communicates each command from master computer 12 on communication link 24 to both of the slave computers. That is, multiplexer 18 copies each command input to it on communication link 24 onto communication links 20 and 22. Hence, each slave computer receives all commands transmitted by master computer 12. Each such command is addressed either to both of the slave computers or to a specified one of them. Each slave computer is programmed to respond only to those commands directed to it.

Multiplexer 18 ORs the commands sent by slave computers 14 and 16 on communication links 20 and 22, respectively, and sends the ORed data to master computer 12 on communication link 24. Hence, slave computers 14 and 16 must be programmed to respond to commands from master computer 12 one at a time. This is normally accomplished by using a polling protocol. Master computer 12 sends a command to one of the slave computers requesting information. The slave computer in question then responds. The other slave computer is programmed to be silent during this response.

The present invention permits computer networks such as computer network 10 to be implemented using telephone lines for communication links 20, 22, and 24. In a computer network according to the present invention, the individual computers may be located at geographically distant locations. Such networks are commonly used in banking and other commercial situations.

Figure 2:
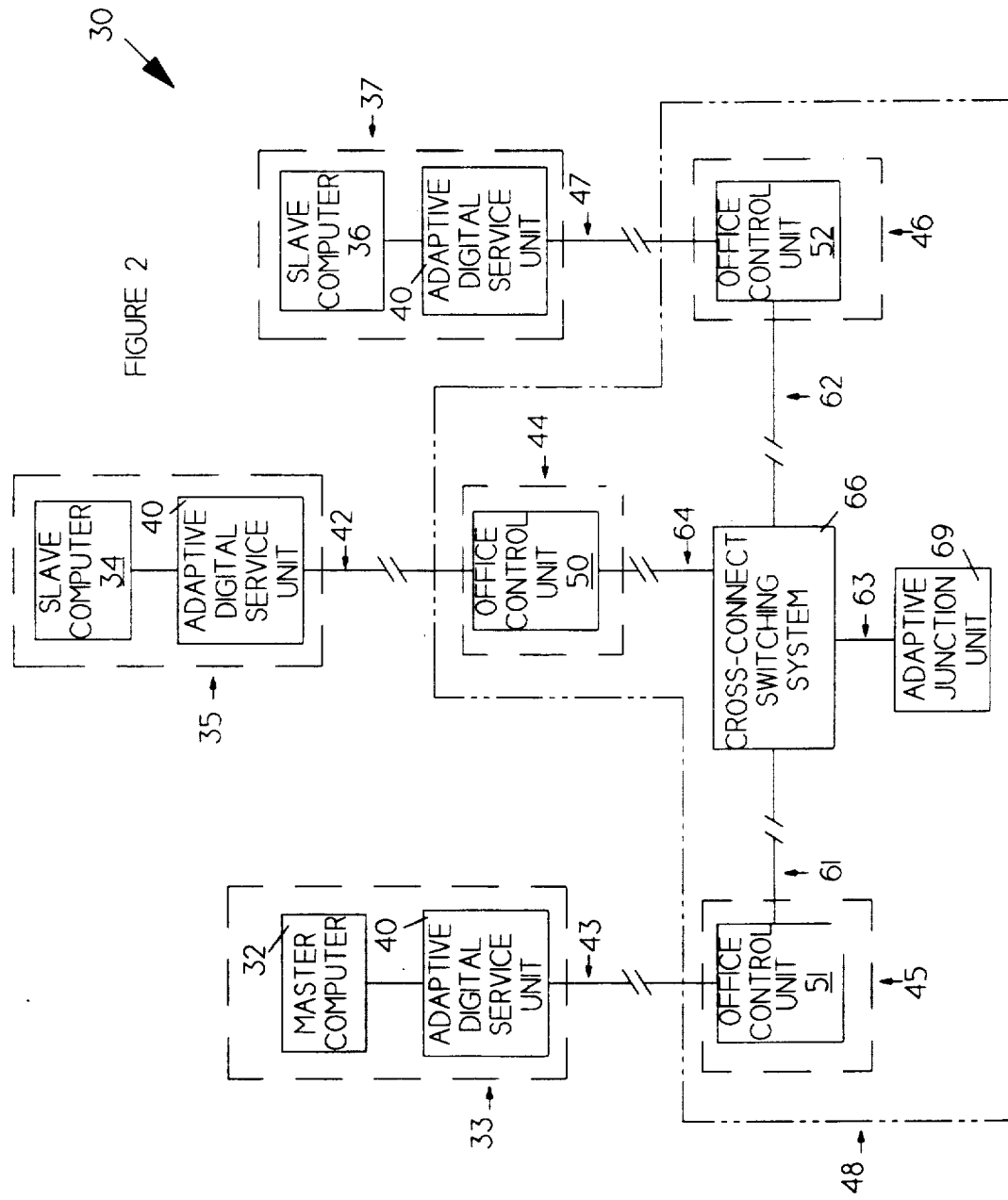
FIG. 2 is a block diagram of an embodiment of the present invention which implements the computer network shown in FIG. 1.

An embodiment of the present invention for implementing computer network 10 is illustrated in FIG. 2 at 30. Computer network 30 includes a master computer 32 at location 33, a slave computer 34 at location 35, and a slave computer 36 at location 37. Each computer sends data to and from an adaptive digital service unit 40 located at the same location as the computer in question. Data is communicated between the adaptive digital service unit 40 and the computer connected thereto in a standard digital format such as RS-232 or V.35. The adaptive digital service units format the data in question for transmission to and from the telephone central office servicing the geographic location in question over a pair of conventional subscriber loops of the type used for normal voice communications. In computer network 30, master computer 32 communicates with central office 45 over the subscriber loops shown at 43. Similarly, slave computer 34 communicates with central office 44 over subscriber loops 42, and slave computer 36 communicates with central office 46 over subscriber loops 47. To clarify FIG. 2, the subscriber loops in question are shown as a single communication path in the figure. The central offices in question are all part of a telephone system 48.

Each pair of subscriber loops terminates at an adaptive office control unit. In computer network 30, subscriber loops 42, 43, and 47, terminate at adaptive office control units 50, 51, and 52, respectively. The adaptive office control units transform the data on the subscriber loops in question to a format compatible with $T_1$ communication links within telephone system 48. Exemplary $T_1$ communication links are shown at 61-64.

Each $T_1$ communication link consists of a bi-directional communication path having 24 time domain multiplexed channels. As explained in detail below, the preferred embodiment of the present invention utilizes two of these channels in each communication direction for moving data within telephone system 48.

Within computer network 30, adaptive multijunction unit 69 performs functions analogous to multiplexer 18 shown in FIG. 1. Adaptive multijunction unit 69 copies the data input to adaptive multijunction unit 69 on the specified channels of $T_1$ communication link 63 are assigned to adaptive office control unit 51. This data is copied to a set of channels on $T_1$ communication link 63 which are routed to the channels on $T_1$ communication links 62 and 64 which are assigned to adaptive office control units 52 and 50, respectively. In addition, adaptive multijunction unit 69 ORs the data input to it on the $T_1$ channels assigned to adaptive office control units 52 and 50 and transmits the combined data the $T_1$ channels assigned to adaptive office control unit 51.

Telephone system 48 includes a cross-connect system 66 which is utilized for routing data between the various $T_1$ channels on the various $T_1$ communication links. Cross-connect system 66 is constructed from a number of cross-connect switches located at different geographical locations within telephone system 48.

As explained in more detail below, communications from master computer 32 intended for slave computers 34 and 36 are routed to adaptive multijunction unit 69 by placing the data in question in either one or two input channels on $T_1$ communication link 63. The data in question is copied to the appropriate $T_1$ channels on $T_1$ communication link 63. The data is then routed by cross-connect system 66 to the channels on $T_1$ communication links 62 and 64 assigned to adaptive office control units 52 and 50, respectively.

Data transmissions from slave computer 34 or 36 to master computer 32 are handled in an analogous fashion. The data in question is first routed to adaptive multijunction unit 69 by cross-connect system 66 which places the data in the appropriate channels on $T_1$ communication link 63. Adaptive multijunction unit 69 combines the data streams into a single data stream which is routed to the channels on $T_1$ communication link 63 assigned to adaptive office control unit 51.

In addition to communicating data to and from the various computers in the computer network, the adaptive digital service units, adaptive office control units, and adaptive multijunction units of the present invention communicate with each other to affect a number of useful network functions. In effect, a computer network according to the present invention consists of two computer networks. The first computer network consists of the user's computers, i.e., master computer 32 and slave computers 34 and 36 shown in FIG. 2. The second network consists of the adaptive digital service units, adaptive office control units, and adaptive multijunction units. The elements of this second network communicate with each other over the same telephone lines used by the computers in the first network. This second computer network will be referred to as the telephone system computer network in the following discussion.

Each of the elements in the telephone system computer network includes a computer that will be referred to as a finite state machine to distinguish it from the computers in the user's computer network. These finite state machines send and receive instructions and data to each other on the same communication links used for transmitting data between the various computers in the computer network. These finite state machines are responsible for monitoring and, in some cases, taking actions that correct and/or reduce transmission errors within the telephone system computer network.

The communication links used in the present invention are designed for carrying voice quality data. Digital data of the type communicated in a computer network requires a much lower error rate than voice data. The error rates in question may depend on other data being transmitted on adjacent lines in the telephone system, and hence, can vary with the time of day and other environmental factors. The adaptive office control units include circuitry for correcting transmission errors on the $T_1$ communication links. In addition, all of the finite state machines monitor error rates on the communication links connected thereto and may report those error rates to the adaptive office control unit connected to the master computer which may take action to reduce the error rates by sending commands to the various finite state machines.

Although previous digital networks have included means for monitoring and correcting errors, information concerning the error rates on the various communication links has not been available to the master computer without the operator contacting the telephone company providing the network service. Hence, when a malfunction is observed, it is difficult to ascertain whether the source of the errors is in the computer network equipment owned by the network operator or in the telephone system. The present invention makes this error rate information available to the the computer network user.

In addition, the present invention provides superior error correction features which maximize the data through-put of the telephone system computer network while keeping error rates at acceptable levels. The finite state machines may be used to change the rate at which data is transmitted in the telephone system computer network. By adjusting the data rates, transmission errors resulting from noise may be significantly reduced. In prior art systems, data transmission rates could only be changed by sending technicians to the various geographical areas within the telephone system. Furthermore, changing the data rates often required replacing the equipment within the system. Hence, the data rates could not be optimally adjusted in response to conditions having a limited time span. As a result, the data rates were often set at values which were significantly below the maximum data rates that could be sustained over the majority of the working hours. In the present invention, the data transmission rates may be automatically reduced when unsatisfactory error rates are observed and then automatically increased when the condition causing the high error rates subsides. Thus, the mean data transmission rate in the present invention is significantly higher than that obtained in prior art networks.

These finite state machines also permit the telephone system computer network to be reconfigured without sending technicians to rewire the system. There are a number of situations in which it would be advantageous to reconfigure the computer network with time of day or day of the week. For example, if the master computer were located in one time zone, it would be advantageous to be able to reconfigure the computer network to "appoint" a different computer in a different time zone as the master computer when the work day ended in the time zone containing the current master computer. Such reconfiguration requires costly equipment and custom computer network designs in prior art systems. The present invention can handle such reconfigurations in an automated manner.

Finally, the present invention allows both asynchronous and synchronous data communication protocols. Furthermore, these protocols may be changed by the computer network owner without the need and expense of intervention by telephone company personnel. Prior art systems are limited to synchronous data formats at a predetermined fixed data rate.

The manner in which this flexibility is provided by the present invention requires a knowledge of the various data formats and communication protocols utilized by the present invention. These formats and protocols will now be described in detail. In order to simplify this discussion, the manner in which the present invention communicates when the master computer utilizes a synchronous protocol at a data rate less than 64 Kbits/sec will be described first. Then the method for providing asynchronous communication will be described. Finally the manner in which a 64 Kbits/sec protocol is provided will be described.

Hardware and Data Formats

Figure 3:
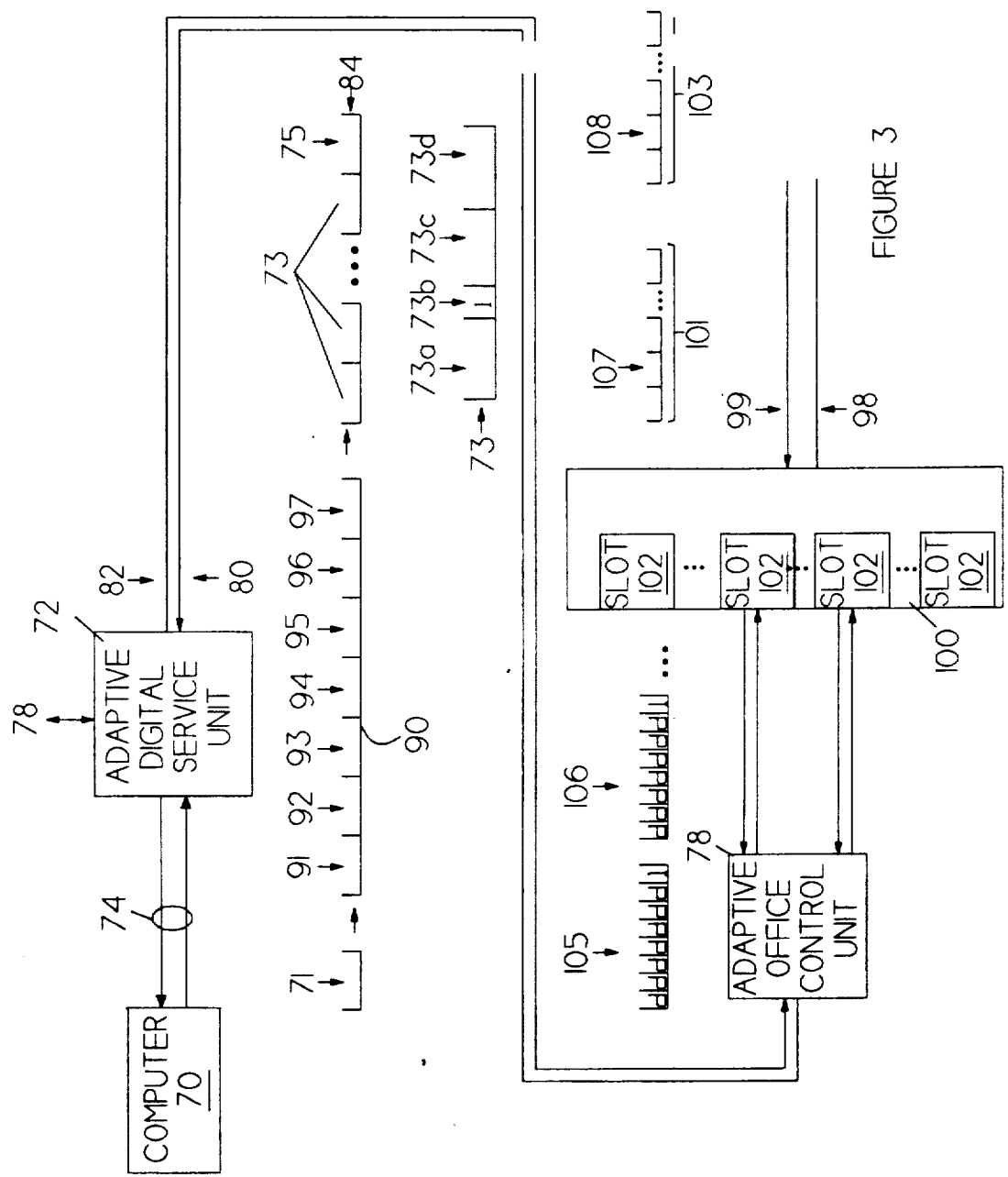
FIG. 3 illustrates the interface between the user's computing equipment and a $T_1$ communication links via two subscriber loops.

FIG. 3 illustrates the interface between the user's computing equipment and a $T_1$ communication link via two subscriber loops. A user's computer 70 communicates with an adaptive digital service unit 72 over a serial communication line 74. Communication line 74 is used to communicate with the other computers in the user's computer network through the telephone system. The user may also communicate with the various elements of the telephone system computer network through a command port 76 in adaptive digital service unit 72. Adaptive digital service unit 72 communicates with an adaptive office control unit 78 over two subscriber loops 80 and 82. Subscriber loop 82 is used to send data to adaptive office control unit 78, and subscriber loop 80 is used to receive data from the adaptive office control unit. Communications on subscriber loops 80 and 82 are in a synchronous protocol which utilizes a clock in the telephone system for timing. When computer 70 communicates with adaptive digital service unit 72 in a synchronous protocol, it also uses this clock.

Data is communicated between computer 70 and adaptive digital service unit 72 in bytes, i.e., 8-bit words. A typical data byte is shown at 71. Adaptive digital service unit 72 accumulates a number of data bytes from computer 70 before transmitting the data to adaptive office control unit 78 on subscriber loop 82.

The data communicated between adaptive digital service unit 72 and adaptive office control unit 78 is preferably formatted in 560 bit packets referred to as frames. Each frame includes user data plus additional data used by the finite state machines of the present invention. This additional data comprises synchronization data, command data, and error correcting data. A typical frame is shown at 84. Frame 84 is constructed from 17 32-bit elements 73 and a 16-bit block 75. Each element 73 contains four fields. The first field 73a consists of 16 data bits. The second field 73b consists of a "1" used to maintain synchrony within the telephone system. The third field 73c consists of 10 more data bits. And, the fourth field 73d consists of 5 bits used for detecting and correcting transmission errors. The 5 bits in question will be referred to as ECC/CRC bits for reasons discussed in detail below.

Each frame is created from a loop interface data frame which is also produced within adaptive digital service unit 72. The loop interface frame is shown at 90 in FIG. 3. Loop interface frame 90 consists of 7 fields. The first field 91 consists of a 16-bit synchronization word which is used to achieve and maintain system synchronization. This field is preferably equal to 1FD0 in hexadecimal.

The second field 92 consists of a 16-bit command word which is used to signal the various finite state machines in the telephone system computer network. The functions specified by this command word will be discussed in detail below. The third field 93 consists of a 16-bit address identifying the device in the telephone system computer network to which the command in field 92 is directed.

The fourth field 94 consists of an 8-bit rate word which is used to communicate data in the asynchronous mode described below. This field is also used to communicate data which is needed by certain commands.

The fifth field 95 is a 2-bit signal word. One of these bits is used for security purposes, and the other specifies the number of data bits used in the asynchronous communication mode discussed in detail below.

The sixth field 96 contains the user data, i.e., the data being communicated between the computers of the user's computer network. This field contains 384 bits.

Finally, the seventh field 97 contains a 16-bit word used to implement a secondary low speed communication channel. The functions of this channel are discussed in detail below.

Adaptive digital service unit 72 accumulates data bytes 71 from computer 70 in a FIFO buffer. Data is read from this buffer to create frame 84. As will be explained in detail below, the number of bits read from this buffer depends on the speed at which the network is running and on the whether or not the computer network is running in a synchronous or asynchronous mode.

Adaptive digital service unit 72 also stores any commands input thereto on command port 76 until adaptive digital service unit 72 is ready to send the next frame 84 on subscriber loop 82. The time at which each frame 84 is sent on subscriber loop 82 is determined by clock signals communicated to adaptive digital service unit 72 on subscriber loop 80.

Loop frame 90 is converted to frame 84 by copying successive bits from loop frame 90 into the data bit fields in the elements of frame 84. The first element of frame 84 contains the 16 bits of the first field 91 of loop frame 90, followed by a "1", followed by the first 10 bits of the second field 92, followed by 5 ECC/CRC bits which are generated from the first 26 bits of the element using a conventional error correcting code. The preferred code is a cyclic code. Cyclic codes are preferred because the error correcting bits may also be used in a cyclic redundancy checking algorithm. Hence, the error correcting bits can also be used by conventional CRC circuitry to detect transmission errors. As will be explained below, some of the telephone system computer network components check for errors without attempting to correct the errors while others actually attempt to correct the errors detected. A cyclic code allows both of these functions to be accomplished with a single error code.

The second element of frame 84 contains the last 6 bits of field 92 plus 10 bits of field 93, followed by a "1", followed by the last 6 bits of field 93 plus the first 4 bits of field 94, followed by the 5 ECC/CRC bits for the second element. Successive elements of frame 84 are generated in a like manner.

Frame 84 then ends with the 16 bits of field 97. No ECC/CRC bits are calculated for this last 16 bit field.

Frame 84 is transmitted to adaptive office control unit 78 on subscriber loop 82. The speed at which data is sent on subscriber loops 80 and 82, referred to as the loop speed, depends on the data rate between computer 70 and adaptive digital service unit 72 and on the communication protocol being used. As explained in detail below, the present invention supports three data protocols. The loop frame and frame formats described above are used for two of these data protocols. A second data protocol is used when the data rate is equal to 64 Kbits/sec. The relationship between the loop speed and the data rate in the preferred embodiment of the present invention is shown in Table I.

As noted above, the number of user data bits that are inserted into frame 84 by adaptive digital service unit 72 depends on the data rate. The number of user data bits so inserted is also shown in Table I. At those data rates for which fewer than 384 bits are accumulated, the remaining bits of field 96 are loaded with ones. At a data rate of 1.2 Kbits/sec, the remaining 192 bits may be filled with a copy of the 192 data bits accumulated from computer 70 instead of ones. This second copy of the user's data provides an additional error correcting capability.

Adaptive office control unit 78 transforms frame 84 into a format that is compatible with a $T_1$ communication link within the telephone system. The $T_1$ communication links in the telephone system consist of two communication paths. The first path 98 is used to transmit data and the second path 99 is used to receive data. Data is transmitted on these paths in 24 time domain multiplexed channels. Each channel operates at a fixed rate of 64 Kbits/sec. The data is communicated in 24-byte $T_1$ frames, one byte of each frame corresponding to each channel. Typical frames are shown at 101 and 103.

The interface between the individual channels and the $T_1$ communication links is accomplished by a channel bank 100 which includes 24 "slots" 102. Each slot provides a means for sending data to and receiving data from a specified $T_1$ channel. In the preferred embodiment of the present invention, two of these slots are utilized by each adaptive office control unit for transmitting frame 84. However, as explained in detail below, if a user wishes to purchase only a subset of the features of the present invention, only one of these slots is actually used. To simplify the following discussion, it will be assumed that only one of these channels is utilized unless otherwise specified.

At a loop speed of 56 Kbits/sec, adaptive office control unit 78 copies frame 84 into the first of these reserved $T_1$ channels by copying successive 7-bit segments of said frame onto the $T_1$ channel during the time period reserved for the $T_1$ channel in question. Each 7-bit segment is augmented by adding a "1" bit to form an 8-bit byte to assure that each byte transmitted on the $T_1$ channel in question contains at least one "1". This byte is then copied to the $T_1$ channel. Two successive bytes created by adaptive office control unit 78 are shown at 105 and 106 respectively. The "d" indicates bits of data from frame 84. The "1"indicates the added "1" bit. Bytes 105 and 106 are copied to the $T_1$ channels shown at 107 and 108 respectively.

The added "1" assures that there is sufficient density of ones on the $T_1$ communication links to maintain synchronization of the $T_1$ system. $T_1$ communication links are used to transmit data over long distances. Hence, they must utilize one or more repeaters. These repeaters must be synchronized to assure the overall synchrony of the $T_1$ system. The repeaters in question utilize transitions between "1" and "0" bits to maintain synchrony. As a result, a long sequences of "0" bits are to be avoided. By adding one "1" per byte, the present invention assures that the minimum density of "1" bits is always present. As noted above, the data rate of a $T_1$ channel is 64 Kbits/sec. The added "1" bit transmitted with each 7 bits of frame data brings the 56 Kbits/sec loop speed up to 64 Kbits/sec, which exactly matches the capacity of a $T_1$ channel.

When the loop speed is less than 56 Kbits/sec, i.e., 28 Kbits/sec, 14 Kbits/sec, 7 Kbits/sec or 3.5 Kbits/sec, the $T_1$ channel is capable of transmitting more data than the telephone system computer network is receiving. In the present invention, this added capacity may be utilized for error correction by repetitively transmitting each byte. When the loop speed is 28 Kbits/sec, each byte, i.e., 7 bits of loop frame data plus the added "1", is transmitted twice on the $T_1$ channel. The second copy of the byte is transmitted in the $T_1$ frame immediately after the $T_1$ frame containing the first copy. Similarly, when the loop speed is 14 Kbits/sec each byte is transmitted four times in four successive $T_1$ frames, and so on.

When two copies of the transmitted byte are present, adaptive office control unit 78 checks for errors by noting disagreement between the two bytes. If the number of copies of each byte is greater than two, an adaptive office control unit 84 receiving the data on the $T_1$ channel can correct for a large fraction of the errors. In the preferred embodiment of the present invention, adaptive office control unit 78 attempts to correct errors using conventional majority decision algorithms in addition to detecting and reporting errors. If only two copies are present, and the copies are not identical, adaptive office control unit 78 only notes an error. As explained below, such error information may be accessed from an adaptive digital service unit connected to the master computer to aid in diagnosing system failures and taking corrective measures.

Adaptive office control unit 78 also receives data from the $T_1$ channel connected thereto on line 99. When data is received, the added "1" bit is stripped and the original frame is reconstructed. This frame is transmitted to adaptive digital service unit 72 on subscriber loop 80. Those errors that can be corrected using the above mentioned majority decision algorithm are corrected; however, no attempt is made to correct errors in user data utilizing the 5 error correcting bits included in each element 73. Errors that can be so corrected are corrected by adaptive digital service unit 72 when it receives the frame.

Upon receiving a frame, adaptive digital service unit 72 unpacks the frame elements 73 and corrects for any errors which can be corrected using the 5 error correcting bits. Adaptive digital service unit 72 then separates the user data from the command data. The user data is then transmitted to computer 70 on serial communication link 74. Any commands intended for adaptive digital service unit 72 are executed by adaptive digital service unit 72.

The adaptive digital service unit that is connected to the master computer in the user's computer network will be referred to as the master adaptive digital service unit. The adaptive digital service units connected to the slave computers in the user's computer network will be referred to as the slave adaptive digital service units. If a slave adaptive digital service unit notes errors, it keeps track of these errors. If the error rate exceeds a predetermined threshold value, the slave adaptive digital service unit in question reports an error condition to the master adaptive digital service unit using one of the commands transmitted in field 92 of the loop frame.

If the adaptive digital service unit is a master adaptive digital service unit, it may send commands to the finite state machines in the telephone system computer network which cause the speed of the computer network to be reduced. These commands are also sent in field 92. By reducing the speed of the telephone system computer network, error rates may be significantly reduced for two reasons. First, reducing the speed at which subscriber loops 80 and 82 operate substantially reduces the error rates on these communication links. Second, as noted above, majority decision algorithms may be used to correct errors on the $T_1$ communication links at lower data rates.

The above description of the present invention has, for the most part, assumed that computer 70 and adaptive digital service unit 72 communicate with each other using a synchronous data communication protocol. In this case, computer 70 utilizes the same clock, i.e., the telephone system clock, to guarantee synchrony. When an asynchronous communication protocol is utilized, such synchrony can not be guaranteed, since the user's computer utilizes its internal clock which may differ in speed by as much as 2% from the telephone system clock. If the computer clock is slower than the telephone system clock, insufficient data will have accumulated in adaptive digital service unit 72 when the time for frame transmission occurs. If the computer clock is faster than the telephone system clock, more data will accumulate in adaptive digital service unit than can be transmitted in the next frame.

To accommodate differences in clock speeds, adaptive digital service unit 72 includes a FIFO buffer, and utilizes a slightly different communication protocol in the asynchronous communication mode. As noted above, loop frame 90 includes field 96 which has space for 384 user data bits. In addition, it contains an 8-bit field 94. In the asynchronous communication mode, user data is transmitted either in the first 376 bits of field 96 or in all 384 bits thereof plus the 8 bits of field 94. In this later case, each frame accommodates 392 user data bits.

The specific format utilized in any given loop frame is specified by the value of one of the bits in field 95 and determined by the state of the FIFO buffer mentioned above. If the FIFO buffer is less than half full when the time occurs for a frame 84 to be constructed, the 376 user data bit mode is used. If the FIFO buffer is more than half full, the 392 user data bit format is utilized.

This aspect of the present invention effectively allows the present invention to match the data rate of the user's computer. When the user's computer is operating at the minimum acceptable data rate, all of the frames 84 have 376 bits of user data. When the user's computer is operating at the maximum acceptable data rate, all of the frames 84 have 392 bits of user data. At intermediate speeds, there is a mix of the two types of frames. The ratio of the number of frames in each format depends on the exact speed of the user's computer.

As noted above, the present invention also supports a communication mode in which user data is transmitted at 64 Kbits/sec. Such high speed data transfer capabilities are increasingly sought in order to implement high speed computer networks. Since the effective bandwidth of subscriber loops 80 and 82 does not permit data transfer at rates greater than 72 Kbits/sec, there is insufficient band width to permit data transfer using the loop frame format described above. As a result, error checking and correction on the subscriber loop links is not available in this communication mode. Error detection and correction may, however, be provided on the data paths utilizing $T_1$ communication links.

When operating in the 64 Kbits/sec communication mode, adaptive digital service unit 72 receives 8-bit data bytes from computer 70 and transmits data in 9 bit words on subscriber loop 82. Each 9-bit word consists of the 8 bits transmitted by computer 70 and a "1". The added "1" is utilized for maintaining synchrony on subscriber loops 80 and 82. Upon receipt by adaptive office control unit 78, the added "1" is stripped, and the 8-bit data byte is then transmitted over the $T_1$ communication link. In the preferred embodiment of the present invention, this transmission utilizes an error correcting code to correct for transmission errors on the $T_1$ communication links.

As noted above, the $T_1$ communication links were originally designed for carrying voice quality data. As a result, the transmission error rates over these communication links are often too great to allow satisfactory transmission of computer data. To reduce the effective error rates on the $T_1$ communication links, both of the $T_1$ channels mentioned above are utilized together with an error correcting code. At lower transmission speeds, such error correction is not so critical, since the insertion of error codes and error correction utilizing these codes are performed by the adaptive digital service units. At the 64 Kbits/sec data rate, error correction by the adaptive digital service units is not available. However, error correction for transmission errors on the $T_1$ communication links is performed by the adaptive office control units.

Conventional error correcting codes are well known in the computer and telephone arts. Hence, these codes will not be discussed in detail here. For the purposes of this discussion, an error correcting code will be defined as a transformation of a D-bit data word to an encrypted Q-bit data word where $Q > D$ and wherein the transformation that decrypts the Q-bit encrypted data word corrects for errors resulting from alterations resulting from as many as N bits being picked or dropped in transmission over the $T_1$ communication links. Here, N is a function of the particular code chosen. In general, codes having higher ratios of Q to D have higher N values.

In the present invention, D is preferably equal to 8; hence, Q must be greater than 8. As noted above, a single $T_1$ channel provides a 64 Kbits/sec data communication facility. Since the user data is arriving at adaptive office control unit 78 at 64 Kbits/sec, and since more than 8 bits must be sent for each 8 bits received, it follows that more than one $T_1$ channel must be utilized. As noted above, each adaptive office control unit 78 is connected to two slots in the $T_1$ channel bank. The above discussion assumed that only one of these slots is utilized. When additional error correction on the $T_1$ communication links is desired, i.e., at the 64 Kbits/sec data rate, both slots are utilized. Since two $T_1$ channels are utilized, the optimum value for Q is 16. Hence, the present invention utilizes a 16-bit error correcting code. That is, each 8-bit user data word is encrypted to form a 16-bit encrypted word which is then divided into two 8-bit transmission words, one such transmission word being transmitted over each of the two $T_1$ channels coupled to adaptive office control unit 78.

Similarly, in the 64 Kbits/sec mode, adaptive office control unit 78 receives two data words from the incoming channels of the channel bank and converts those two words to a 16-bit encrypted word which is then decrypted to form an 8 bit data word which is transmitted on subscriber loop 80 as a 9-bit data word. The 9th bit is a "1" for maintaining synchrony on subscriber loops 80 and 82. Upon receiving the 9-bit data word, adaptive digital service unit 72 strips the 9th bit and transmits the resulting 8-bit data word to computer 70.

In addition to the properties mentioned above, the error correcting code used for correcting errors on the $T_1$ communication links preferably includes one additional property. As noted above, the $T_1$ communication links include repeaters which enable the signals thereon to be transmitted over long distances. These repeaters must remain synchronized. This synchronization in accomplished by observing transitions between "1" and "0" bits on the communication links. Hence, a minimum density of "1" bits is needed. At lower transmission rates, this density was provided by sending 7 data bits and a "1" in each $T_1$ channel. At 64 Kbits/sec, this solution is not possible, since there is insufficient band-width on the $T_1$ lines to transmit the additional "1". As a result, the present invention utilizes an error correcting code that guarantees that each of the 8-bit transmission words has at least one "1".

The error correcting code of the present invention differs from conventional error correcting codes that do not provide at least one "1" in each 8-bit transmission word. In conventional error correcting codes, at least one of the transmission words is 0 for some value of the 8-bit user data word. As a result, conventional error correcting codes are unsatisfactory for use in the 64

Kbits/sec mode of the present invention. The preferred error correcting code is, however, derived from a conventional error correcting code by a transformation that is easily implemented in electronic circuitry and that preserves the full error correcting capability of the conventional error correcting code.

In the 64 Kbits/sec mode of the present invention, an 8-bit user data word is encrypted as follows. First, the 8-bit user data word is encrypted with a conventional cyclic error correcting code shown in Table II to form two encrypted 8-bit words $^1X$ and $^2X$. The error correcting code shown in Table II is a conventional (16,8) BCH code in which the 16-bit encrypted data word has been broken into two 8-bit data words by assigning the first 8 bits of the 16-bit encrypted data word as the first 8-bit encrypted data word, $^1X$, and the second 8 bits of said 16-bit encrypted data word as the second 8-bit encrypted data word, $^2X$.

The present invention transmits two transmission data words $^1Y$ and $^2Y$ in place of $^1X$ and $^2X$. $^1Y$ and $^2Y$ are derived from $^1X$ and $^2X$ by performing a transformation of $^1X$ and $^2X$ to arrive at $^1Y$ and $^2Y$. The transformation in question operates by exchanging the data in various bit positions and by complementing the data in specified bit positions prior to said data being exchanged. This is indicated in Table II by the labels over the various bit positions in $^1X$, $^2X$, $^1Y$, and $^2Y$. The bit positions in $^1X$ are labeled "1" through "8". The bit positions in $^2X$ are labeled "A" through "H". The data used to generate $^1Y$ and $^2Y$ is shown over the columns labeled $^1Y$ and $^2Y$. For example, the first bit of $^1Y$ is obtained by copying the data in the first bit position of $^1X$. The second bit of $^1Y$ is obtained by copying the data in the second bit position of $^1X$. And, the eighth bit of $^1Y$ is obtained by copying the data in the seventh bit position of $^2X$ and then complementing said data, as indicated by the bar over the letter G.

This method for generating the transmission words, $^1Y$ and $^2Y$, is preferred because conventional circuitry for generating $^1X$ and $^2X$ from a user data word x using a BCH code is inexpensive and readily available. The above described transformation is also easily implemented since it can be carried out by placing $^1X$ and $^2X$ in a first set of registers and then copying the data to a second set of registers by connecting the corresponding bit positions by conducting paths. For those bit positions in which the data is to be complemented, inverters are placed in the conducting paths in question.

Similarly, the decryption process may advantageously utilize conventional circuitry for decrypting the BCH code in question. The transmission data words are placed in a first set of registers. The data in these registers is then copied into a second set of registers by connecting corresponding bit positions by conducting paths which include inverters in selected paths. The data in the second set of registers is then decrypted using the conventional BCH hardware.

It should be noted that the transformation in question begins and ends with the conventional BCH code. Hence, it has the same error detecting and correcting capabilities of the conventional code.

Figure 4:
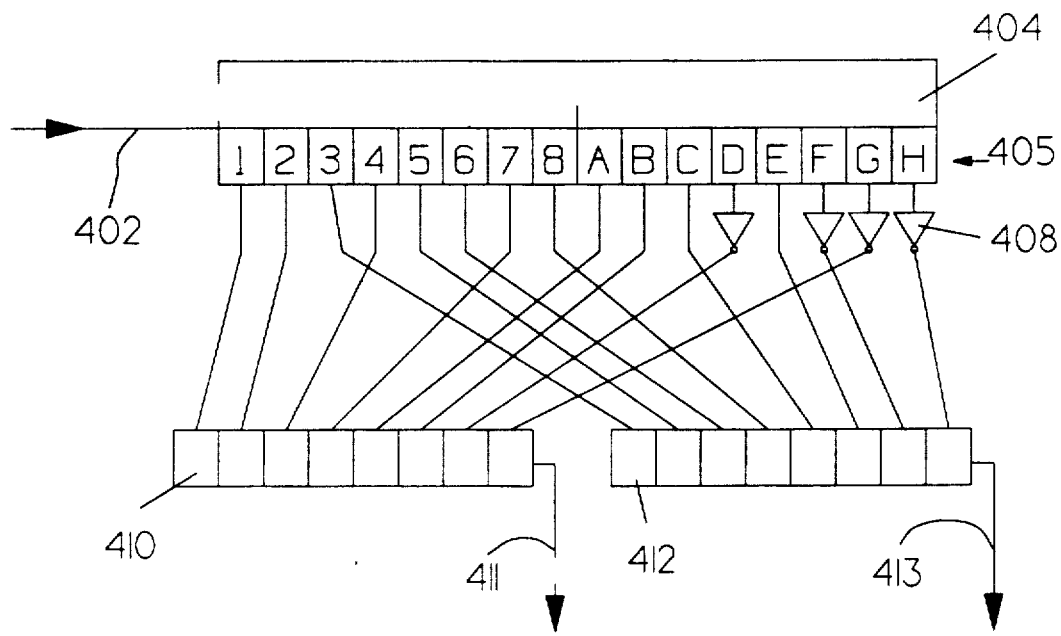
FIG. 4 is a block diagram of the preferred embodiment of the decryption and encryption circuitry used to implement the error correcting code shown in Table II.
Figure 4:
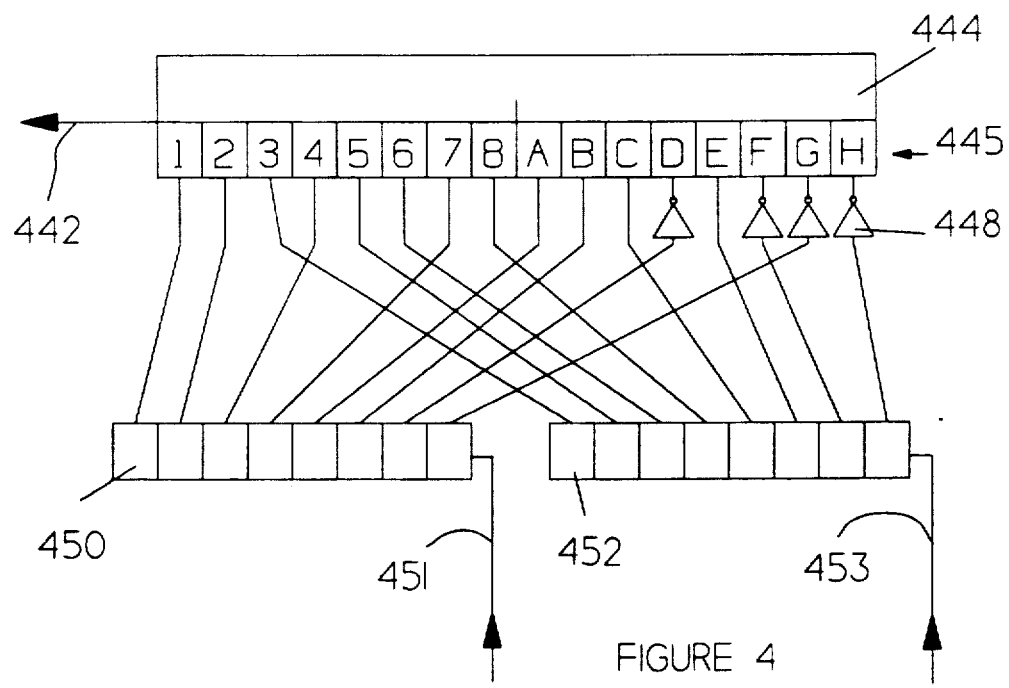

A block diagram of the preferred embodiment of the decryption and encryption circuitry used to implement the error correcting code shown in Table II is shown in FIG. 4. Data to be transmitted through the $T_1$ communication link is received in bit serial form on an input line 402. This data is received by cyclic code generating circuit 404 which converts each 8-bit data word into a 16 bit encrypted word which is stored in a 16 bit register 405. The individual bits of register 405 are labeled 1 through 8 and A through H. These labels correspond to the labels shown in Table II. The 16-bit encrypted word stored in register 405 is transformed into two transmission words by connecting each bit in register 405 to a corresponding bit in one of two shift registers 410 and 412. Those bit positions in register 405 that are to be complemented are connected to the corresponding bit positions in the shift registers through inverters of which inverter 408 is typical. These connections form a hardwired transformation of the conventional error correcting code to an error correcting code according to the present invention.

The transformed error correcting code is then shifted out onto two lines 411 and 413 which are connected to the corresponding two channels of the $T_1$ communication link.

Data is received from the $T_1$ communication links and decoded in an analogous manner. Two bit serial data streams on input lines 451 and 453, one from each of the two channels on the $T_1$ communication link assigned to the digital data user connected to the present invention, are shifted into shift registers 450 and 452, respectively. When these shift registers are full, the data therein is transferred to a 16-bit register 445 in a cyclic code decoding circuit 444. The data in question is transferred by connecting the individual bits of shift registers 450 and 452 to register 445 such that the inverse of the transformation between register 405 and shift registers 410 and 412 is performed. Once loaded, the contents of register 445 are decoded using the conventional cyclic code decoding circuitry. The resulting 8-bit data word is then shifted out onto output line 442.

The various operations involved in controlling the encrypting and decrypting operations are preferable performed by the finite state machine included in the adaptive office control unit.

Although the use of the second channel on the $T_1$ communication link has been described with reference to providing error correction in the 64 Kbits/sec mode, it may also be used at lower data transmission rates. In the preferred embodiment, a user who has purchased this error correcting channel also obtains the benefits thereof at lower data transmission rates. Once activated, the channel is utilized in all transmissions on the $T_1$ communication links. At lower data rates, each of the bytes obtained by combining 7 bits of data from a frame 84 with a "1" is encrypted using the error correcting circuitry and transmitted on both $T_1$ channels. Upon receiving the two encrypted transmission words, an adaptive office control unit according to the present invention decrypts the transmission words to form an 8-bit data word consisting of the original 7 bits from frame 84 plus the added "1". This byte is indistinguishable from the byte that would have been obtained using only one $T_1$ channel.

Hence, the benefits of the error correcting channel may be conveniently implemented at all data transmission rates. At 64 Kbits/sec all 8 bits of each user data byte received are transmitted to the adaptive digital service unit connected to the adaptive office control unit receiving the byte. At lower data rates, only the 7 bits derived from the frame 84 are transmitted, the 8th bit being an added "1".

Figure 5:
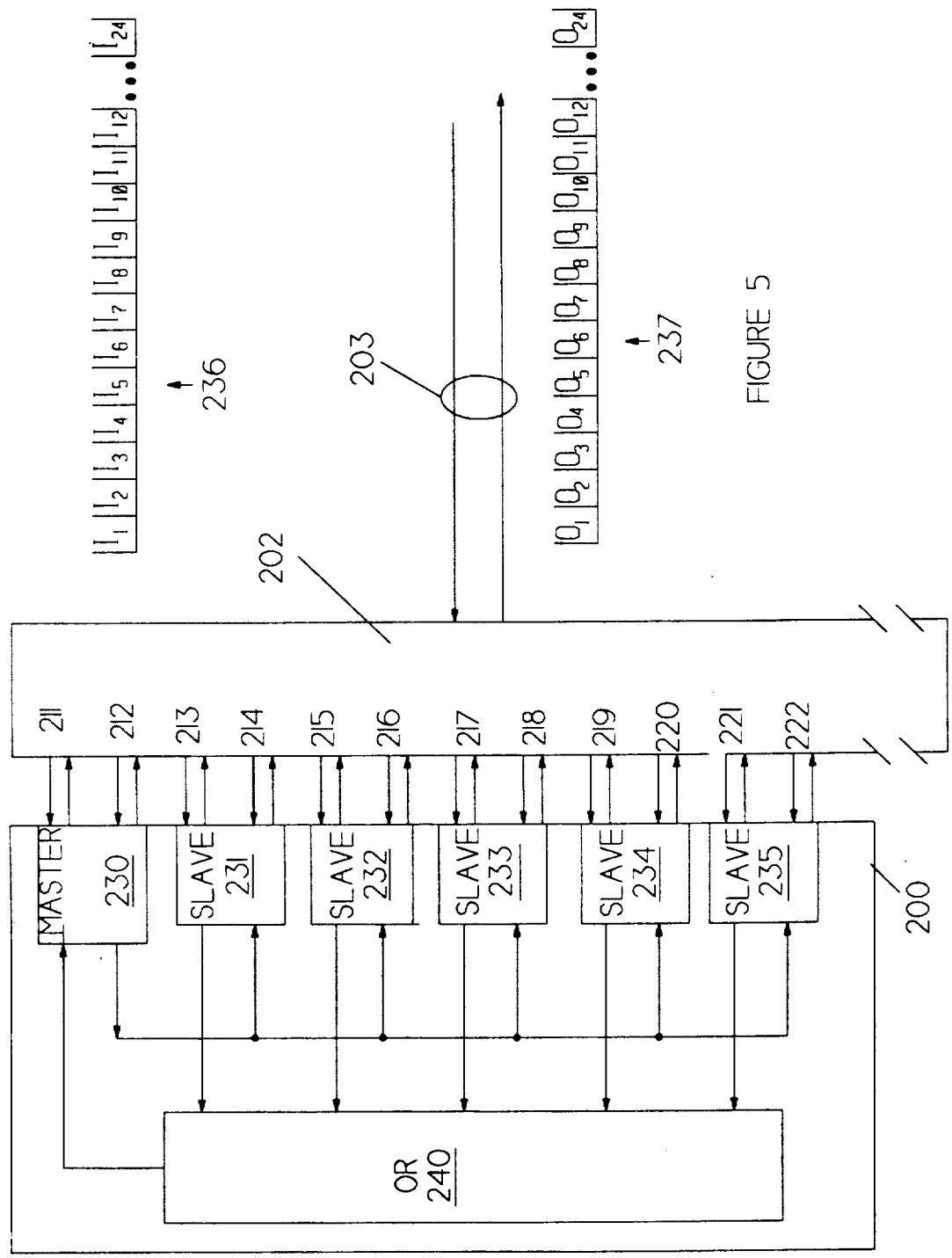
FIG. 5 is a block diagram of an adaptive multijunction unit according to the present invention.

As discussed above, the adaptive multijunction units used in the present invention perform a function analogous to that of multiplexer 18 shown in FIG. 1. A block diagram of an adaptive multijunction unit according to the present invention is shown in FIG. 5 at 200. Adaptive multijunction unit 200 interfaces with the $T_1$ communication links by connecting it to a plurality of channels in a $T_1$ channel bank 202 which interfaces with a $T_1$ communication link 203. A $T_1$ input frame to channel bank 202 is shown at 236 and a $T_1$ output frame leaving channel bank 202 on $T_1$ communication link 203 is shown at 237. Each $T_1$ frame consists of 24 bytes, the bytes in the $T_1$ input frame being labeled $I_1$ through $I_{24}$ and the bytes in the $T_1$ output frame being labeled $O_1$ through $O_{24}$.

In the preferred embodiment of the present invention, adaptive multijunction unit 200 occupies 12 slots in channel bank 202 and provides one master port 230 and 5 slave ports 231-235. The 12 slots in question are labeled 211-222 in FIG. 5. For simplicity, it will be assumed that slots 211-222 receive data bytes $I_1$ through $I_{12}$, respectively, in $T_1$ frame 236 and transmit data bytes $O_1$ through $O_{12}$, respectively, in $T_1$ frame 237. When the error correcting channel described above is not enabled, adaptive multijunction unit 200 utilizes 6 slots in channel bank 202 to perform these functions. These slots are labeled 211-216 in the figure. The remaining 6 slots labeled 217-222 are reserved for use as error correcting channels. If the error correcting channels are not utilized by a given computer network, these 6 additional slots and the $T_1$ channels served thereby may be utilized by other systems in the telephone system.

In error correcting mode of operation, the data input to master port 230, i.e., data bytes $I_1$ and $I_7$, are error corrected and then copied to each of the slave ports 231-235 which output the data bytes in the corresponding channels of frame 237. Hence, $$O_2=O_3=O_4=O_5=O_6=I_1,$$

and $$O_8=O_9=O_{10}=O_{11}=O_{12}=I_7.$$

In the non-error corrected mode, data bytes from $I_1$ enterring through slot 230 are copied to 231-235 and outputed as $O_2$ through $O_6$.

The manner in which data is input from the slave ports 231-235 to master port 230 is handled is somewhat more complicated and depends on the mode in which the telephone system computer network is operating. To simplify this discussion, the case in which the error correcting channels are not utilized will be described first. In this case, the master port and the slave ports each utilize one $T_1$ channel. Each slave port receives one byte of data on the input side of $T_1$ communication link 203. Slave port 231 receives byte $I_2$, slave port 232 receives byte $I_3$, and so on. These data bytes are combined by ORing the corresponding bits in each said byte to form the output byte, $O_1$, which is transmitted by master port 230.

It will be assumed that the telephone system computer network is operating at a transmission rate below 64 Kbits/sec. In this case, the individual data bytes in question consist of 7 "data" 60 bits plus a "1". The seven data bits in question are derived from either one of the elements 73 described above or from the 16-bit data block 75. The data in the elements in question consists of either command data, user data, error correcting bits, or "1" bits in fixed locations. Since the individual bytes received are ORed together, only one of the slave computers in the computer network may communicate with the master computer at any given time. The remaining slave computers must transmit all nulls for their data when these slave computers are not enabled by the master computer. As will be explained below, when a slave computer is not enabled, it sends a frame containing nulls in all of the relevant bit positions. The bit used for the null bit will depend on whether the OR logic is positive or negative. In a positive logic embodiment, the null bit would be a zero. In a negative logic embodiment, the null character is a one, and the OR operation is a negative OR. The preferred embodiment of the present invention utilizes negative logic, since all zeros are to be avoided, because long strings of zeros cause synchronization problems on the various communication links.

If the telephone system computer network is operating at 64 Kbits/sec without the error correcting channels being enabled, the adaptive multijunction units still function properly. In this case, each of the non-selected computers in the user's computer network will be transmitting bytes which are all nulls. Hence, only the byte from the selected computer will be non-null. As a result, the byte obtained by ORing all of the user data bytes will have a value equal to that of the byte transmitted by the selected computer.

When the error correcting channels are enabled, the OR operation is more complicated for two reasons. First, the data is transmitted on two $T_1$ channels. Second, the error correcting code utilized on the $T_1$ lines can interfere with the data ORing operation if the encrypted data words in the $T_1$ channels are merely ORed together. The manner in which this interference is generated may be most easily understood with reference to a system in which the inactive slave computers transmit all zeros.

For example, assume that slave computer 34 shown in FIG. 2 is enabled and that slave computer 36 is not. Furthermore, assume that the error correcting channels are enabled. In this case, slave computer 36 will be sending 8-bit bytes that are 0 at 64 Kbits/sec to the adaptive digital service unit 40 connected to it. This adaptive digital service unit adds a "1" bit in the 9th bit position and transmits the resultant 9-bit word on subscriber loop 47 to adaptive office control unit 52 which strips the 9th bit and encrypts each of these 0 words into two 8 bit transmission words having binary values of 00000011 and 00000011. These transmission words are then sent on two $T_1$ channels in $T_1$ communication link 63 to adaptive multijunction unit 69. For the purposes of this discussion, these channels will be referred to as channels 63a and 63b, respectively.

Assume that slave computer 34 sends a data word consisting of a byte having the decimal value 100 to the adaptive digital service unit 40 connected to it. This data word will be encrypted to two transmission words having the values of 00010000 and 10101011 which will reach adaptive multijunction unit 69 on two $T_1$ channels in $T_1$ communication link 63. For the purposes of this discussion, these channels will be referred to as channels 63c and 63d, respectively.

Adaptive multijunction unit 69 must function such that the resulting data words on the two channels, referred to as 63e and 63f, assigned to the master computer 32 on $T_1$ will contain the transmission words 00010000 and 10101011. If adaptive multijunction unit 69 ORs the bit patterns on channels 63a and 63c to form the bit pattern on channel 63e the result would be 00010011. Similarly, if adaptive multijunction unit 69

ORs the bit patterns on channels 63b and 63d to form the bit pattern on channel 63f, the result would be 10101011. When these two transmission words are decrypted by an adaptive office control unit for transmission back to a computer in the user's computer network, a transmission error will be indicated, since no value of x can properly give rise to $^1Y=00010011$ and $^2Y=10101011$.

This problem is overcome in the present invention by including encrypting and decrypting circuitry in each slave port. This circuitry is utilized when the error correcting channels are enabled. As described above, adaptive multijunction unit 200 shown in FIG. 5 is preferably connected to 12 channels in channel bank 202. The additional slots in channel bank 202 are slots 217-222. The input to each pair of channels is decrypted using decrypting circuitry such as that shown in FIG. 4. For example, when input data bytes $I_2$ and $I_8$ are received by slave port 231, these bytes are decrypted to form a single 8-bit data word which is communicated to OR circuit 240. Similarly, slave port 232 decrypts the two input data bytes $I_3$ and $I_9$ and sends the resulting 8-bit data word to OR circuit 240, and so on. OR circuit 240 ORs the individual data words in question and then encrypts the resulting data word using circuitry such as that shown in FIG. 4. The encryption process produces two 8-bit data words, $O_1$ and $O_7$, which are transmitted by slots 211 and 217, respectively. The various encrypting and decrypting operations are preferably carried out under the control of the finite state machine included in each adaptive multijunction unit. The finite state machine in question has been omitted from the drawings for clarity.

The above description of the adaptive multijunction units has referred to ORing the corresponding data words. It will be apparent to those skilled in the art that this ORing operation has the effect of ORing the frames 84 input from each slave computer.

Another advantageous feature of the present invention is the ability to reconfigure the user's computer network without the need to send technicians to the various geographical areas serviced by the network. This capability is provided by the telephone switching system 48 shown in FIG. 2 and the finite state machines that are part of the adaptive digital service units, adaptive office control units, and adaptive multijunction units. By sending commands to the telephone switching system, the various components that are internal to the telephone system can, in effect, be reconnected in a new topological arrangement. Such reconfiguration can be accomplished by commands to the telephone system computers that control the telephone switching system. These computers may be programmed such that they automatically rearrange the telephone system computer network at specific times, or the user may place a request with telephone company for a particular rearrangement.

For example, the ability to reconfigure the telephone system computer network such that the computer that is designated as the master computer changes with time of day is highly advantageous, particularly in computer networks which span geographic areas in different time zones. In such systems, the functions of the master computer and one of the slave computers can be interchanged at the close of business in one of the time zones, control being transferred to a computer in a time zone in which business is still being conducted.

In the present invention, this is accomplished by switching the computers that are connected to the various ports of an adaptive multijunction unit in the telephone system computer network and by changing the internal status of the adaptive digital service unit connected to the old and new master computers. The channels that were originally connected to the master port of the adaptive multijunction unit are rerouted through the telephone system such that these channels are now connected to one of the slave ports. An internal flag in the adaptive digital service unit connected to the computer that was previously the master computer is changed so that the adaptive digital service unit in question responds as a "slave" adaptive digital service unit. The differences in the functions carried out by slave and master adaptive digital service units will be described in more detail below. Finally, the channels serving the slave computer that is to become the new master computer are then re-routed to the master port of the adaptive multijunction unit, and the adaptive digital service unit connected to the new master computer is set to be a master adaptive digital service unit.

As noted above, field 97 of the loop frame format contains 16 bits which are not assigned to the functions described above. In the preferred embodiment of the present invention, field 97 is used to implement a second communication channel which operates at a much slower data rate than the primary channel which transmits user data in field 96. The effective data rate of the secondary channel is approximately 4% of that of the primary channel. The secondary channel provides a communication path for a non-selected slave computer to communicate with the master computer without interfering with the communications in the primary channel. For example, the secondary channel may be used to send a request to interrupt the communications between the master computer and the currently selected slave computer. For the adaptive multijunction units to function properly, however, only one slave computer can communicate on this secondary channel at any given time.

Another advantageous feature of the present invention is its ability to automatically reduce the data transmission rates when error rates exceeding a predetermined threshold are encountered. As noted above, the error rates in the system may be dramatically reduced by reducing the network speed. When the network is set up, the maximum acceptable error rate is programmed. This error threshold is programmed by sending commands through the system control port of an adaptive digital service unit, adaptive office control unit, or adaptive multijunction unit. Different error threshold values may be sent to different adaptive digital service units in the computer network if different error tolerances are present in the particular computer network implemented with the present invention.

When the present invention is operating in the adaptive mode, an adaptive digital service unit, upon encountering an error rate above a programmed threshold, sends a signal to the adaptive digital service unit connected to the master computer the next time the adaptive digital service unit observing said error rate is used to communicate data to the master computer. Upon receiving this signal, the adaptive digital service unit connected to the master computer sends commands to the adaptive digital service units, adaptive office control units, and adaptive multijunction units in the telephone system computer network. These commands cause these devices to lower the data rates in the telephone system computer network. When the condition leading to the high error rates subsides as evidenced by low observed error rates in the system, the adaptive digital service unit connected to the master computer sends commands instructing these devices to increase the data rates.

When operating in a non-adaptive mode, the various finite state machines in the telephone system computer network merely report error rates to the adaptive digital service unit connected to the master computer. This information is available through a system control port on the adaptive digital service unit connected to the master computer. The error rates observed by the adaptive digital service unit connected to the slave computers may also be accessed through the system control ports of the adaptive digital service units in question.

SYSTEM COMMANDS

The adaptive digital service units, adaptive office control units, and adaptive multijunction units are all capable of executing a number of commands that are useful in setting the data transmission mode and data transmission rate, and in diagnosing errors in the computer network. By utilizing these commands, the computer network user can control key features of the network and can diagnose problems without the intervention of telephone company personnel. By restricting the commands that may be executed by the computer network user, the telephone company can restrict the user to prearranged data rates and services. This provides the telephone company with the ability to market more restrictive network capabilities at lower user rates. The manner in which system commands are restricted will now be described.

To simplify the following discussion, the adaptive digital service units, adaptive office control units, and adaptive multijunction units will be referred to alternatively as network units when describing the functions provided by all such devices. The telephone system computer network includes a plurality of network units coupled by communication links, i.e., the subscriber loops and $T_1$ communication links described above. Each network unit includes circuitry for transmitting and receiving digital data in a first mode in which said data is organized into frames on these communication links. Each said frame includes synchronization data, command data, error correcting data, and user data. Each network unit can also transmit and receive data on this circuitry in a second mode, the 64 Kbits/sec mode described above.

When operating in the first mode, each network unit unpacks the data in a frame 84 received thereby and extracts the synchronization data described with reference to field 91 of loop frame 90. The network unit also extracts the command and address data. Some of the commands utilize other data fields of loop frame 90 to communicate further data needed by the command. If the command in question utilizes this additional data, the data in the fields in question is also extracted. Some of these commands may not be given when the user is transmitting data on the computer network, since the commands utilize the fields reserved for user data.

Each network unit includes a register for storing an address identifying the network unit in question. When a command is received by a network unit, it checks the address specified in the received frame 84 to determine if the command is to be executed by the network unit in question.

Each network unit also includes circuitry for generating command data in response to a received command. This data is inserted in the command data fields in the next frame transmitted by the network unit. Each network unit also includes a command port analogous to that described above with reference to the adaptive digital service units. Commands entered on this command port are also inserted into the command data of the next frame 84 transmitted by the network unit.

The various commands and their functions will now be described.

Secure Commands

The present invention provides a security mechanism to insure that network commands that originated from an adaptive digital service unit are restricted such that a user cannot use an option that is not subscribed or change the network configuration in a manner which might introduce problems into the telephone system. The mechanism in question utilizes the first bit in field 95 which is referred to as the security bit. When this bit is a "1", the adaptive office control units and adaptive multijunction units are restricted from executing the commands specified in field 92 of the loop frame. To assure that a user can not set the security bit to a "0", the adaptive office control units force this bit to a "1" when the adaptive digital service unit blocked data is passed through an adaptive office control unit. Secure commands, i.e., those which require a security bit of "0", can only be sent from internal devices (adaptive office control units and adaptive multijunction units) in the telephone system computer network. Whenever an internal device receives a command from its system control port, the device sets the security bit to "0" for the frame containing the command in question.

If an adaptive digital service unit inserts a secure command into a loop frame in response to commands on its system control port, the internal devices in the telephone system computer network will not execute the command, since even if the adaptive digital service unit changes the security bit to a "0", the adaptive office control unit receiving the loop frame information forces the security bit to a "1". However, an adaptive digital service unit receiving a secure command will execute the command, since adaptive digital service units do not check the security bit. Hence, the user can always check the observed data rates through the entire system, since this information is available from the far end adaptive digital service unit.

Examples of secure commands are commands that reset the internal devices in the telephone system, commands that enable the 64 kbits/sec transmission mode, and commands that enable a second group of commands that are referred to as conditionally secure commands. If a user wishes to utilize the conditionally secure commands, the user must do so by transmitting the request to the telephone company. A telephone system technician then issues a secure command that enables the commands in question.

Conditionally secure commands are commands that may be enabled for a given network by the telephone company. Once enabled, the user can use these commands. Such commands are useful for restricting service to computer networks that have subscribed to only part of the available computer network services. Examples of such commands are commands that read the status of various internal devices, e.g., adaptive office control units and adaptive multijunction units, commands that place the various internal devices in loop-back modes for testing, and commands that reconfigure the adaptive multijunction units for testing purposes. This last group of commands will be discussed in more detail below.

Conditionally secure commands are implemented utilizing the above discussed security bit and a security flag in each network unit. Each network unit has a security flag consisting of a one-bit storage cell. There is one such flag for each feature that may be triggered by a conditionally secure command. If a network unit's security flag for a particular option is set to a "1", the network unit will ignore a conditionally secure command sent to it. If the security flag is a "0", the command will be executed. The security flags of the various network units are set and reset by a set of secure commands. Hence, when a user subscribes to a particular service such as user enabled testing, a secure command enabling the security flag in the relevant internal devices is sent by a telephone company technician.

Programming the Computer Network

The manner in which these instructions are used in the present invention to set up and operate a computer network will now be discussed in detail with reference to FIG. 6 which is a block diagram of a simple computer network 400 having the same topology as computer network 10 shown in FIG. 1. For the purposes of this discussion, it is assumed that computer network 400 is not operating in the 64 Kbits/sec mode. The manner in which computer network enters and exits from the 64 Kbits/sec mode will be discussed in detail below.

Computer network 400 includes a master computer 432 and two slave computers 434 and 436. Master computer 432 is coupled to the computer network by adaptive digital service unit 440 which communicates with adaptive office control unit 461. Similarly, slave computer 434 is coupled to adaptive digital service unit 441 which communicates with adaptive office control unit 462, and slave computer 436 is coupled to adaptive digital service unit 463 which communicates with adaptive office control unit 464.

Communications between master computer 432 and slave computers 434 and 436 are multiplexed through adaptive multijunction unit 470 which provides a fanout of 5 as shown. Adaptive multijunction unit 70 has an upstream data port 471 and 5 downstream data ports 472-476. Data leaving upstream data port 471 is received by master computer 434. Data leaving downstream data port 472 is received by slave computer 434 and data leaving downstream data port 473 is received by slave computer 36. Downstream data ports 474-476 are not connected. The terms upstream and downstream data ports are preferred because, in more complex computer networks having multiple adaptive multijunction units, an upstream data port may be connected to a downstream data port of another adaptive multijunction unit. Hence, data ports are more aptly referred to in terms of the direction in which data leaving the data port in question moves relative to the master computer.

Computer network 400 also includes a network controller 490 which is coupled to the command port 477 of adaptive multijunction unit 470. Network controller 490 is used to introduce secure commands into computer network 400 and is under the control of the telephone company.

Figure 6:
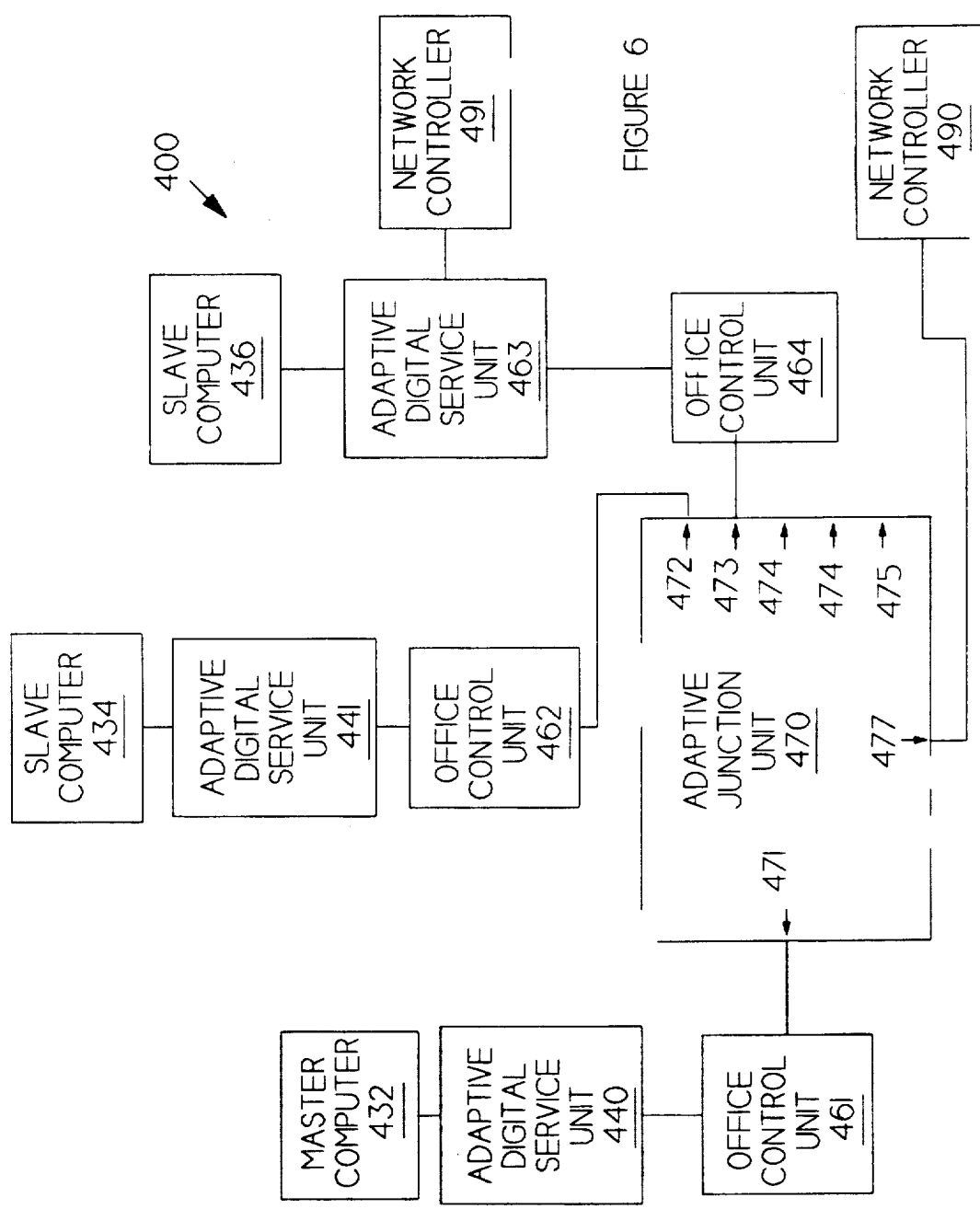
FIG. 6 is a block diagram of a simple computer network having the same topology as computer network shown in FIG. 1.

The connections to the telephone switching system have been omitted from FIG. 6 to simplify the drawing. However, it is to be understood that the internal communication lines between the adaptive office control units and the adaptive multijunction unit may include branches that are routed through the telephone cross-connect switching system.

Rules Governing the Execution of Network commands

The various network units in computer network 400, i.e., the adaptive digital service units, the adaptive multijunction unit, and the adaptive office control units, must remain synchronized for computer network 400 to operate correctly. To reduce the chance that erroneous commands cause one or more to the devices to operate in a mode that will destroy this synchrony, the following three rules are observed. First, a network unit ignores all undefined or inappropriate commands. The network unit also ignores any command that might have been modified by a transmission error. If the 5 error correcting bits in the element 73 (see FIG. 2) containing the command indicate that a transmission error has occurred during the transmission of said element, the command is ignored.

Second, the time at which a given command is executed is determined by a finite state machine present in the network unit. The finite state machine is preferably a conventional microprocessor. Two commands, ACTIVATE and DEACTIVATE, must be executed as soon as possible after the command and address bytes are received. All other commands must wait until the complete frame is received before executing the commands. These commands are used to activate and deactivate the network unit whose address is contained therein.

Finally, command operations are acknowledged at the network controller level by the network controller requesting a network unit's status and verifying that the operation was performed. When a command is sent by network controller 490, it is followed by a STATUS command directed to the network unit that was to be the recipient of the original command. If the original command was properly executed, the network unit in question will respond to the STATUS command with an ACK command providing data about its current status. This data is checked against the expected data for this network unit.

As described with reference to FIG. 2, each network unit in computer network 400 is identified by a unique 16 bit address. Addresses are defined in accordance with the following three rules. First, an address of zero is reserved. This address is never used on computer network 400 during normal operations. A network unit uses an address of zero in communicating with network controller 490 to indicate that no address has been assigned to said network unit.

Second, an address of all ones, i.e., FFFF in hexadecimal, is reserved. It is used on computer network 400 within a frame to indicate that the frame is addressed to no network unit.

Finally, an address of 0FC0 in hexadecimal, referred to as the SALVO address, is used to address any or all network units in computer network 400. The SALVO address is a generalized broadcast address.

Network Initialization

The manner in which the network is initialized will now be described. It is assumed that all network units are in a reset condition, i.e., no network address has been assigned to the network units. The process starts the network controller sending a RESET command with an address of SALVO. This resets all network units to the no-address condition and forces all network units into a listening state at a default data transmission rate which is preferably 2.4 Kbits/sec. This command also blocks all branches of adaptive multijunction unit 470, i.e., data will not be transmitted in either the upstream or downstream direction.

Next, adaptive multijunction unit 470 is assigned an address using the ADDR_ASSIGN command. For the purposes of this discussion, the address 100 is assigned. An ADDR_ASSIGN command is executed by any network unit receiving it that does not currently have an address. Hence, care must be taken to assure that only one unassigned network unit receives this command. Network controller 490 verifies the assignment by sending a READ_STATUS command to network unit 100 which responds by sending an ACK command indicating that it is an adaptive multijunction unit with address 100.

Next, the upstream data port is unblocked. The various data ports on adaptive multijunction unit 470 have different addresses which are assigned in sequence with reference to the address of the adaptive multijunction unit. Once the adaptive multijunction unit has been assigned an address, this address is used as the base address for the various ports. In the preferred embodiment of the present invention, the upstream port has an address equal to the base address, and the downstream ports have addresses equal to the base address plus the port number. After an UNBLOCK to address 100, i.e., the upstream port, is executed, any command inputted on network controller 490 will be transmitted upstream where it will terminate on adaptive office control unit 461, since adaptive office control unit 461 is still in a reset state, and hence, is blocked from transmitting commands to the network units connected to it.

Adaptive office control unit 461 is then assigned an address of 1000 by an ADDR_ASSIGN command sent to it via port 477 on adaptive multijunction unit 470. The command is verified by a READ_STATUS command directed to address 1000 which is acknowledged by an ACK command indicating that network unit 1000 is an adaptive office control unit. Upon receiving its address assignment, adaptive office control unit 461 is unblocked allowing adaptive digital service unit 440 to receive the next ADDR_ASSIGN command. For the purposes of this discussion, it will be assumed that adaptive digital service unit 440 is then assigned an address of 10000. The address assignment is verified in a manner analogous to that described above.

At this point, all of the network units on the upstream branch of telephone system computer network 400 have been assigned addresses. Next, the network units connected to downstream branch 472 are assigned addresses in an analogous manner. First, an UNBLOCK command is directed to address 101 which corresponds to the first branch of adaptive multijunction unit 470. This allows ADDR_ASSIGN commands inputted through command port 477 to be sent downstream along branch 472 as well as upstream along branch 471. Since all of the network units connected to adaptive multijunction unit port 471 are assigned addresses, none of these devices will respond to the ADDR_ASSIGN command. Further, since, adaptive office control unit 462 is reset, and hence, blocked, any command send on downstream port 472 will terminate on adaptive office control unit 462. Since adaptive office control unit 462 is the only network unit on this branch without an address, an ADDR_ASSIGN command with an address of 1001 will cause adaptive office control unit 462 to assume an address of 1001. Next, adaptive digital service unit 441 is assigned an address of 10001 in an analogous manner. This completes the assignment of addresses on the branch serviced by downstream data port 472.

Finally, the network units accessed by downstream data port 473 are assigned addresses in an analogous manner. Downstream data port 473 is unblocked, and the next network unit on the branch is assigned an address, e.g., adaptive office control unit 464 is assigned an address of 1002. This operation unblocks adaptive office control unit 464 which allows adaptive digital service unit 463 to be assigned an address of 10002.

It should be noted that, with the exception of the RESET command, all of the commands used in the above described procedure can be executed from the command port of any device in computer network 400. Hence, a user can ascertain the topology and addresses assigned within computer network 400 at any time, assuming that the user has been given access to this service, i.e., the security flags in the various devices have been appropriately set by network controller 490. Furthermore, the user can assign his own addresses to the network units within the telephone system computer network if the user so desires. This feature is particularly well suited to users who maintain their own network using software executed from an adaptive digital service unit within the network.

Data Rate Changes

In the preferred embodiment of the present invention, there are three modes of operation for data rates within the telephone system computer network. These modes are controlled by two network commands SET_RATE and SET_LIMIT. The manner in which each of these commands affects the telephone system computer network depends on whether the command is generated in an adaptive digital service unit by a customer or in an internal device by the network controller.

The first mode supported in the present invention is referred to as the fixed mode. In this mode, the data rates within the telephone system are fixed by the telephone company. The user can not modify the data rates in this mode.

The second mode is referred to as the selectable rate mode. In this mode, the user can select the data transmission rate up to a predetermined limit which is specified by the telephone company.

The third mode is referred to as the adaptive mode. In this mode, network units select the rate being used at any given time. The rate selected is controlled by the error rates observed within the telephone system computer network. Data rates of 1.2 Kbits/sec and 32 Kbits/sec are not supported in the adaptive mode, since these rates use the same internal data rates as the 2.4 kbits/sec and 38.4 Kbits/sec modes, respectively. If the telephone system computer network does not operate satisfactorily at 2.4 Kbits/sec, lowering the rate to 1.2 Kbits/sec will not improve the error rates. The same reasoning applies at 38.4 Kbits/sec. If unsatisfactory error rates are observed at 38.4 Kbits/sec, the rate must be lowered to 19.2 Kbits/sec.

If the user's computers are sending data at rates above the current data rate of the telephone system computer network, the adaptive digital service units will provide busy signals whenever data backs up.

The user may purchase either a fixed mode service or an adaptive mode service. Having purchased the adaptive mode service, the user can switch between modes two and three as the user sees fit.

It should be noted that after a network unit has been reset by a RESET command or by being powered up, the device defaults to the fixed mode at a rate of 2.4 Kbits/sec.

A telephone system employee can establish a new fixed rate for computer network 400 by sending a SET_RATE command through the command port of any internal network unit in the telephone system computer network, i.e., an adaptive office control unit or an adaptive multijunction unit. Hence, network controller 490 can send such a command to telephone system computer network 400. The command will be relayed both upstream and downstream from adaptive multijunction unit 470. Upon receiving the command, each network unit relays the command and then changes its internal hardware to transmit and receive at the new rate. At this stage, the network unit in question will lose synchronization. Synchronization will be reestablished when the master adaptive digital service unit 440 switches to the new data rate and the various network units receive data frames therefrom at the new rate.

A telephone system employee can enable the adaptive mode as follows. It is assumed that all network units within the telephone system computer network have been assigned an address and that all network units are operating at the same speed. The employee first sends a command specifying the error threshold. The command in question is referred to as SET_THRESHOLD and is preferably addressed to all devices in the computer network, i.e., an address of SALVO. The command also includes a threshold value which is preferably an integer specifying the error rate at which the telephone system computer network speed should be lowered. For example, an error rate of 3 in the preferred embodiment of the present invention indicates that the speed should be lowered if an error rate greater than $10^{-3}$ is observed.

Upon receiving this command, adaptive multijunction unit 470 records the new threshold value and then transmits the command both upstream and downstream. Similarly, the other network units, upon receiving the command, record the new threshold value and relay the command through the network.

Once the new error rate has been set, the employee gives a SET_LIMIT command with an address of SALVO specifying the maximum rate at which data may be sent in the network. As noted above, this command is a secure command and must, therefore, be sent from an internal network unit in the telephone system computer network. The SET_LIMIT command is relayed throughout the network in a manner analogous to that described above with reference to the SET_THRESHOLD command. Each network unit receiving the command transmits the command to the network units connected to it. All of the network units retain the new limit; however, none of the network units change their current rate unless the limit is lower than their current rate.

At this point, a customer or a technician can enable the adaptive mode by a SET_RATE command specifying the adaptive rate with an address of SALVO. After the adaptive digital service units receive this command, they are free to adaptively change their rates according to the rules described below. Similarly, the customer can change back to a fixed rate at any time by giving the appropriate SET_RATE command.

Once the telephone system computer network is in the adaptive mode, the network can adaptively fall back to a lower operating speed. Each adaptive digital service unit tests for transmission errors using the error correcting bits contained in each element 73 described above. If any adaptive digital service unit detects an error rate greater than the error threshold programmed therein, action is taken to reduce the operating rate.

If the adaptive digital service unit in question is connected to a slave computer, it transmits a fall-back request to the adaptive digital service unit connected to the master computer. The adaptive digital service unit connected to the master computer will be referred to as the master adaptive digital service unit. The fall-back message is inserted into the command space of the next frame sent to the master computer from the adaptive digital service unit in question. The master adaptive digital service unit then causes the actual rate change by issuing a command instructing all devices to lower their speed to the next lowest speed. As noted above, the telephone system computer network will never fall back to the 1.2 or 32 Kbits/sec rate, since these rates use the same loop formats and speeds as the 2.4 and 38.4 Kbits/sec rates, respectively.

In the preferred embodiment of the present invention, the criteria for the bit error rate to exceed the threshold uses the following algorithm. Initially, the adaptive digital service unit waits 15 seconds after a rate change before collecting bit error rate information. This provides sufficient time to assure that all of the internal devices in the telephone system computer network are now synchronized at the new rate. As noted above, when the telephone system computer network changes rate, the internal network units lose synchronization. Synchronization is recovered when these network units receive data frames from the master adaptive digital service unit at the new rate. During these times, user data is not accepted for transmission on the telephone system computer network, i.e., the adaptive digital service units signal the computers connected thereto that they are busy.

The adaptive digital service unit divides a time interval into one second intervals to compute an error rate. If any error is detected during a given one second interval, a count is added to an internal register. If the count in this internal register exceeds a predetermined threshold value at the close of the first time interval, the error threshold is deemed to have been exceeded. The predetermined threshold value and length of the time interval in question are set by a SET_THRESHOLD command which specifies one of a predetermined plurality of possible threshold value and time interval combinations. Each combination corresponds to a different error rate.

If the master adaptive digital service unit detects an error rate above its threshold, it does not need to wait until the computer attached thereto sends data. In this case, the master adaptive digital service unit immediately transmits the new rate to the devices in the computer network.

A telephone system computer network according to the present invention can also increase its speed if low error rates are detected while operating in the adaptive mode. If any adaptive digital service unit other than the master adaptive digital service unit operates for a predetermined time interval without observing any errors, it will transmit a request to the master adaptive digital service unit to increase the network speed. The request is inserted in the next frame sent from the adaptive digital service unit in question. Upon receiving this request, the master computer stores an indicator to this effect. In addition, if the master adaptive digital service unit also receives error free data the time interval in question, it stores an indicator to this effect. When the master adaptive digital service unit and at least one adaptive digital service unit connected to a slave computer have received error free data for the time interval in question, the master adaptive digital service unit sends a command to shift to the next higher data rate, provided such a data rate exists. This procedure is referred to as a "jumpup".

The time interval in question is set by a SET_THRESHOLD command which specifies one of a predetermined plurality of time interval settings.

The telephone system computer network will never jumpup to 32 or 64 Kbits/sec. As noted above, 32 and 38.4 Kbits/sec use the same loop format. Hence, if the network will run satisfactorily at 32 Kbits/sec it will also run satisfactorily at 38.4 Kbits/sec. The 64 Kbits/sec data rate is not supported in the adaptive mode because it uses a different data formatting technique.

To change the telephone system computer network to the 64 Kbits/sec mode, the user executes a conditionally secure command from an adaptive digital service unit in the computer network. This command is executed in a manner analogous to any other command. That is, the command, addressed to all devices, is placed in field 92 of the loop frame data.

To change from the 64 Kbits/sec mode to a lower rate, a command is also entered using the command port of a user adaptive digital service unit. However, since the data formats utilized in the 64 Kbits/sec mode are different from those utilized in the other modes, a different signaling format must be used. In this case, a specific sequence of bytes is placed in the data stream. Each network unit in the telephone system computer network scans for the sequence in question when the telephone system computer network is in the 64 Kbits/sec mode. Upon finding the sequence, the network unit in question returns to the lower data rate format at the default system transmission rate.

Synchronization

Since there are a number of possible operating speeds in the telephone system computer network, a network unit according to the present invention can determine the operating speed of the telephone system computer network and resynchronize with it. The problem of network units operating at different speeds arise when a network unit receives a SET_RATE or SET_LIMIT command that is garbled by noise. This problem can also arise if the master adaptive digital service unit causes a jumpup and there is excessive noise. Although this problem is primarily encountered when the telephone system computer network is operating in the adaptive mode, it can also occur in other modes, i.e., when a new network unit is plugged into the telephone system computer network while the computer network is operating at a fixed rate.

In the present invention, this problem is solved as follows. All network units determine the system rate, i.e., the rate of the master adaptive digital service unit, and adjust themselves to that rate. When a network unit is out of synchronization for a predetermined period of time, it begins a scanning process to determine the system rate. The source of data which the network unit scans in its attempt to determine the system rate depends on the type of network unit and whether the network unit is coupled to the master computer in the computer network. If the device is an adaptive multijunction unit, it continues to pass data as it had before, and after detecting that it does not know the system rate, it searches for the new rate until it resynchronizes using the algorithm described below. The adaptive multijunction unit scans on its upstream channel, i.e., port 471 shown in FIG. 6.

If the network unit that gets lost is an adaptive office control unit connected to a slave computer, the adaptive office control unit scans the data coming in from the $T_1$ interface, since this is the direction that the reference system rate will come from. Until it resynchronizes, the adaptive office control unit operates under its own control to search for the new rate.

If the network unit that gets lost is a adaptive digital service unit connected to a slave computer, the adaptive digital service unit will loses Barker Synchronization, i.e., it will is not able to find the Barker code that begins each frame. The adaptive digital service unit then scans incoming data, as described below, until it regains synchronization. In addition, the adaptive digital service unit signals the computer coupled to it in the user's computer network that it is busy, so that user data will not be lost.

If the network unit that gets lost is a master adaptive office control unit, i.e., the adaptive office control unit connected to the master adaptive digital service unit, the adaptive office control unit scans the data on the subscriber loop side, since this carries data from the master adaptive digital service unit which sets the rate for the entire system.

Finally, it should be noted that the master adaptive digital service unit never gets lost. The master adaptive digital service unit provides the system rate for the entire telephone system computer network.

The data source that each device scans to determine the correct system rate is specified by an internal flag in the device. This flag is set by system commands that may be given either from an adaptive digital service unit control port or a control port on an internal network unit. When the telephone system computer network is initially configured these bits are set. If the configuration of the telephone system computer network is changed, the appropriate flags must also be reset.

A network unit detects that it does not know the system rate after the following events occur. Barker synchronization is lost. Each network unit utilizes the Barker code contained in the first element 73 of each frame to identify the beginning of a frame. When a network unit has seen a sufficient number of data bytes to conclude that it should have seen the Barker code if the system speed was correct, it assumes that synchronization has been lost. The number of data bytes searched may differ for different data rates. Typically, this number is at least 3000 bytes in the preferred embodiment of the present invention.

Once a network unit detects that it does not know the system rate, it performs a searches at the various possible system rates until it finds the Barker code at one of them. At each new rate, the network unit searches for the Barker code. After a predetermined number of bytes have been examined without finding the Barker code, the device selects the next lowest speed and repeats the process. If it is already at the lowest speed, it selects 38.4 Kbits/sec for the next speed.

When an adaptive digital service unit changes its rate, the following external RS232 signals change. First, CD is lowered, and stays low until Barker Synchronization occurs. CTS is lowered and stays low until Barker Synchronization occurs, or until a predetermined time period has elapsed. Third, DSR stays high. The Receive-CLOCK and Transmit-CLOCK lines, if used, change to the new clock rate. Finally, RD is at a constant MARK state.

Polling

The present invention supports instructions permitting either the computer network user or the telephone company to determine the current computer network configuration. These instructions are referred to as "polling" instructions. The use of these instructions may be most easily understood with reference to the computer network shown in FIG. 6. It will be assumed that a network control computer 491, connected to the control port of adaptive digital service unit 442 is being utilized to determine the configuration on the computer network 400. This exemplary configuration has been chosen because it represents the most complex problems in determining the network configuration. It will be assumed that each network unit has been assigned an address as described above and that all network units are running in a non-adaptive mode other than the 64 Kbits/sec mode described above.

Each ntwork unit in the computer network includes a flag, referred to as the POLL_FLAG which is utilized in carrying out polling commands. The POLL_FLAG is cleared by a START_POLL command directed to the network unit in question. When a network unit receives a START POLL_command, it passes the command on to the other network units connected to it, clears its POLL_FLAG, and then enters the polling state. Any loopbacks that are set in the network unit are unlatched upon entering the POLL state.

Control computer 491 initializes the network for polling by giving a START_POLL command with an address of SALVO. When adaptive digital service unit 463 receives this command, it transmits it to adaptive office control unit 464 in the next frame. After the frame is transmitted, it clears its POLL_FLAG, and enters the POLL mode.

The START_POLL command is relayed through the network from network unit to network unit in a similar manner. Upon receiving the START_POLL command, adaptive office control unit 464 retransmits the command to adaptive multijunction unit 470 and enters the POLL mode. Similarly, adaptive multijunction unit 470 receives the START_POLL command and transmits it both upstream and downstream. Adaptive multijunction unit 470 then enters the POLL mode. Adaptive multijunction unit 470 does not change the state of blocking on its various branches, i.e., branches 474–476 which are unused remain blocked.

When the START_POLL command has propagated to all of the network units in the telephone system computer network, each network unit will be left in the POLL state, with its POLL_FLAG cleared, waiting for one of the above-mentioned commands. Control computer 491 then sends a series of POLL commands. Each POLL command is answered by an ACK command sent from a network unit in the telephone system computer network. The ACK command provides information about the address of the network unit answering the command and the type of network unit.

Each network unit is identified as follows. Control computer 491 sends a POLL command with an address of SALVO. If the network unit receiving the command has its POLL_FLAG set, the network unit merely passes the command on to the network unit connected to it. If the POLL_FLAG in the network unit receiving the command is clear, the network unit sets its POLL_FLAG and then responds to the command with an ACK command giving its address and network unit type. In this case, the command is not passed on.

Hence, the first POLL command will be answered by adaptive digital service unit 463. Since it will set its POLL_FLAG before responding, the next POLL command will be passed to adaptive office control unit 464, which will set its POLL_FLAG and then respond, and so on.

When the POLL command reaches adaptive multijunction unit 471, its ACK command specifies the base address of the adaptive multijunction unit and the branch on which the command was received, in addition to the type of network unit. The control computer then sends a READ_STATUS command to adaptive multijunction unit 471 using the base address sent in the ACK command to ascertain whether the master port 471 is blocked. In this case, it is not blocked. Hence, control computer 491 continues to send POLL commands to ascertain the network units connected through the master port 471, i.e., adaptive office control unit 461 and adaptive digital service unit 440.

When control computer 491 receives an ACK from an adaptive digital service unit, it knows that it has reached the end of a branch in the telephone system computer network. Control computer 491 must now determine the status and configuration of any other branches that are connected through the other slave ports of adaptive multijunction unit 470.

The status of each slave port, i.e., BLOCKED or UNBLOCKED, is ascertained by directing READ_STATUS commands to the port in question. For example, to read the status of slave port 473, which is the second slave port on adaptive multijunction unit 470, the master computer sends a READ_STATUS command directed to address 102 (adaptive multijunction unit address plus port number). In the present example, the results of these READ_STATUS commands will indicate that slave ports 3, 4, and 5 are BLOCKED. Control computer 470 will then assume that there are no network branches connected to these slave ports.

To ascertain the configuration of computer network 400 on the branches connected to slave ports 472 and 473, control computer 491 must be able to send commands down these branches and receive replies therefrom. However, these branches are set up to communicate with the master adaptive digital service unit 440.

This problem is solved by latching a loopback in adaptive digital service unit 440. Loopbacks will be discussed in detail below. For the purpose of this discussion, it is sufficient to note that in response to a LOOPBACK command addressed to adaptive digital service unit 440, adaptive digital service unit 440 will enter a mode in which all data input to it from adaptive office control unit 461 will be repeated back to adaptive office control unit 461. Hence, the next POLL command sent by control computer 491 will be forwarded to adaptive digital service unit 440 where the loopback will cause it to be propagated back to the master port 471 of adaptive multijunction unit 470. Adaptive multijunction unit 470 will then propagate the command down the branches of computer network 400 connected to slave ports 472 and 473. However, all of the network units on the branch connected to slave port 473 have POLL_FLAG set, since each of these network units has already answered a POLL command. As a result, the POLL command will only be acknowledged by network units on the branch connected to slave port 472. These network units will acknowledge successive POLL commands in a manner analogous to that described above.

When control computer has finally received ACK commands from all network units in computer network 400, it sends an END_POLL command. The END_POLL command is propagated to all network units in computer network 400 in a manner analogous to the propagation of the START_POLL command. Upon receiving an END_POLL command, all network units unlatch any loopbacks and adaptive multijunction units restore the slave channels to the status they had before polling was commenced, i.e., the channels will be blocked or unblocked in accordance with their state prior to polling.

Loopbacks

Each of the network units in the telephone system computer network includes loopback capabilities in the preferred embodiment of the present invention. When placed in loopback mode, data entering the network unit on an input line thereto is copied to an output line thereof. In the case of adaptive digital service unit or adaptive office control unit, four different loopback configurations are possible. These are identified by two indices. The first index corresponds to the direction of the data in the telephone system computer network. The second index corresponds to the location in the network unit at which the copy operation is carried out.

For example, an adaptive digital service unit can be placed in a loopback mode in which data from the user's computer is copied back to the user's computer at the point at which the data in question enters the adaptive digital service unit. Alternatively, the data could be copied back as it leaves the adaptive digital service unit in route to an adaptive office control unit. If the system responds differently in these two cases, a malfunction is likely in the adaptive digital service unit.

Similarly, the adaptive digital service unit could be placed in a loopback mode in which data from the adaptive office control unit is copied back to the adaptive office control unit. Again the loopback could be at the entrance to the adaptive digital service unit from the adaptive office control unit side or at the side of the adaptive digital service unit connected to the user's computer. Four analogous modes are supported for adaptive office control units.

In the case of an adaptive multijunction unit, the modes from the master port are analogous to those mentioned above. Data entering the master port is copied back to the output line from the master port. The data can be copied at the point at which it enters the master port or at the point at which leaves the adaptive multijunction unit from one of the slave ports.

Similarly, a set of analogous loopbacks can be provided for each slave port. That is, data entering the slave port in question is copied back to the output line of the slave port. The copy operation could be provided at the entrance to the slave port or at the exit from the master port. However, for simplicity, the preferred embodiment of the present invention only provides a mode in which the data is copied at the entrance to the master port. The more complex loopback format described above can be accomplished by providing a loopback in the adaptive office control unit connected to the master port.

Setting Customer Purchased Options

As indicated above, one advantageous features of the present invention is its ability to allow a customer to purchase a limited set of system options at a reduced rate. The secure commands described above are used for enabling particular options. For example, the error correcting channel on the adaptive office control units and adaptive multijunction units is enabled by a secure command referred to as SET_ECC_CHAN.

In addition, a number of conditionally secure commands can be enabled by setting a security flag in each of the relevant network units. The security flag has two values, one in which the customer is prevented from executing the commands in question and one in which the network unit will respond to a conditionally secure command.

In the preferred embodiment of the present invention, space is provided for up to seven options which may be purchased by the customer are as follows. The first option is polling. That is, the customer is allowed to execute polling commands of the type described above. The second option allows the customer to introduce commands to block and unblock various adaptive multijunction unit channels. The third option allows the customer to originate ENABLE and DISABLE COMMANDS which enable or disable transmission on the telephone system computer network. The fourth option allows the customer to send loopback commands. The fifth option allows the customer to perform his own address assignments within the computer network. The sixth option allows the customer to replace bytes which are zero with FF in hexadecimal. Finally, the seventh option allows the customer to change synchronization modes as described below.

Setting Network Configuration

As noted above, the adaptive digital service unit serving the master computer performs differently from adaptive digital service units connected to slave computers. Whether or not a particular adaptive digital service unit is a "master" or "slave" is determined by the state of an internal flag. This flag is set by one of the secure commands.

Synchronization Modes

The preferred embodiment of the present invention provides two synchronization modes, referred to as fast synchronization and normal synchronization. Fast synchronization provides the minimum response time for point to point or multipoint operations. In this mode, data frames are turned on and off by the CTS (clear to send) signal of the users computing equipment. When the CTS is turned off (i.e., no data to send), the adaptive digital service unit sends all ones, and when the CTS is turned on, the adaptive digital service unit sends data frames. The advantage of fast synchronization is that the receiving unit can respond quickly to the start of a stream of data.

Normal synchronization provides a slower response time, but is more immune to noise accumulation. In large computer networks, each adaptive multijunction unit has the potential of adding noise to the signal sent to the master adaptive digital service unit. Since each adaptive digital service unit ORs the data on all of the slave legs thereof, once a noise error is introduced, it will be propagated to the master adaptive digital service unit. In the fast synchronization mode, data is always being ORed together, even when no frames are being transmitted on a slave leg of as adaptive multijunction unit. Hence, the potential for noise accumulation is significant.

In normal Synchronization mode, data frames are continually being sent from the adaptive digital service unit connected to each of the slave computers. ACTIVATE and DEACTIVATE commands track the on and off states of the CTS signal from the user's computing equipment. When the CTS is turned off (no data to send), the adaptive digital service unit sends a frame with all ones for the user data and a DEACTIVATE command in the command portion of the frame. When the CTS is turned on, the adaptive digital service unit sends a frame with an ACTIVATE command in the command portion of the frame.

When an adaptive multijunction unit receives a DEACTIVATE command, it places all ones on its internal signal bus for the slave port in question. Furthermore, if an adaptive multijunction unit detects that all legs are so deactivated, it constructs an outgoing frame which also consists of all ones and a DEACTIVATE command. Hence, for noise to get through an adaptive multijunction unit in normal synchronization mode, it must duplicate an ACTIVATE command which is highly unlikely.

Accordingly, there has been described herein a novel computer network utilizing the telephone system. Various modifications to the present invention will become apparent to those skilled in the art from the foregoing description and accompanying drawings. For example, time domain multiplexed transmission links other than $T_1$ communications links may be utilized in a computer network according to the present invention. The key feature of the present invention in this regard is the matching of the data rates between the subscriber loops and the time domain multiplexed communication links. Similarly, different transmission rates may be provided without departing from the scope of the present invention. In addition, different instructions sets will be apparent to those skilled in the art. Hence, the present invention is to be limited solely by the scope of the following claims.

TABLE I

| Data Rate (Kbits/sec) | Data Bits | Loop Speed (Kbits/sec) |
|---|---|---|
| 1.2 | 192 | 3.5 |
| 2.4 | 384 | 3.5 |
| 4.8 | 384 | 7.0 |
| 9.6 | 384 | 14.0 |
| 19.2 | 384 | 28.0 |
| 32.0 | 320 | 56.0 |
| 38.4 | 384 | 56.0 |

TABLE II

| DATA WORD | STANDARD ERROR CORRECTING CODE | | | | | | | | | | | | | | | |
|---|---|---|---|---|---|---|---|---|---|---|---|---|---|---|---|---|
| | $^1$X | | | | | | | | $^2$X | | | | | | | |
| x | 1 | 2 | 3 | 4 | 5 | 6 | 7 | 8 | A | B | C | D | E | F | G | H |
| 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 1 | 0 | 0 | 1 | 1 | 1 | 0 | 0 |
| 2 | 0 | 1 | 0 | 0 | 0 | 0 | 0 | 0 | 0 | 1 | 0 | 0 | 1 | 1 | 1 | 0 |
| 3 | 1 | 1 | 0 | 0 | 0 | 0 | 0 | 0 | 1 | 1 | 0 | 1 | 0 | 0 | 1 | 0 |
| 4 | 0 | 0 | 1 | 0 | 0 | 0 | 0 | 0 | 0 | 0 | 1 | 0 | 0 | 1 | 1 | 1 |
| 5 | 1 | 0 | 1 | 0 | 0 | 0 | 0 | 0 | 1 | 0 | 1 | 1 | 1 | 0 | 1 | 1 |
| 6 | 0 | 1 | 1 | 0 | 0 | 0 | 0 | 0 | 0 | 1 | 1 | 0 | 1 | 0 | 0 | 1 |
| 7 | 1 | 1 | 1 | 0 | 0 | 0 | 0 | 0 | 1 | 1 | 1 | 1 | 0 | 1 | 0 | 1 |
| 8 | 0 | 0 | 0 | 1 | 0 | 0 | 0 | 0 | 1 | 0 | 0 | 0 | 1 | 1 | 1 | 1 |
| 9 | 1 | 0 | 0 | 1 | 0 | 0 | 0 | 0 | 0 | 0 | 0 | 1 | 0 | 0 | 1 | 1 |
| 10 | 0 | 1 | 0 | 1 | 0 | 0 | 0 | 0 | 1 | 1 | 0 | 0 | 0 | 0 | 0 | 1 |
| 11 | 1 | 1 | 0 | 1 | 0 | 0 | 0 | 0 | 0 | 1 | 0 | 1 | 1 | 1 | 0 | 1 |
| 12 | 0 | 0 | 1 | 1 | 0 | 0 | 0 | 0 | 1 | 0 | 1 | 0 | 1 | 0 | 0 | 0 |
| 13 | 1 | 0 | 1 | 1 | 0 | 0 | 0 | 0 | 0 | 0 | 1 | 1 | 0 | 1 | 0 | 0 |
| 14 | 0 | 1 | 1 | 1 | 0 | 0 | 0 | 0 | 1 | 1 | 1 | 0 | 0 | 1 | 1 | 0 |
| 15 | 1 | 1 | 1 | 1 | 0 | 0 | 0 | 0 | 0 | 1 | 1 | 1 | 1 | 0 | 1 | 0 |
| 16 | 0 | 0 | 0 | 0 | 1 | 0 | 0 | 0 | 1 | 1 | 0 | 1 | 1 | 0 | 1 | 1 |
| 17 | 1 | 0 | 0 | 0 | 1 | 0 | 0 | 0 | 0 | 1 | 0 | 0 | 0 | 1 | 1 | 1 |
| 18 | 0 | 1 | 0 | 0 | 1 | 0 | 0 | 0 | 1 | 0 | 0 | 1 | 0 | 1 | 0 | 1 |
| 19 | 1 | 1 | 0 | 0 | 1 | 0 | 0 | 0 | 0 | 0 | 0 | 0 | 1 | 0 | 0 | 1 |
| 20 | 0 | 0 | 1 | 0 | 1 | 0 | 0 | 0 | 1 | 1 | 1 | 1 | 1 | 1 | 0 | 0 |
| 21 | 1 | 0 | 1 | 0 | 1 | 0 | 0 | 0 | 0 | 1 | 1 | 0 | 0 | 0 | 0 | 0 |
| 22 | 0 | 1 | 1 | 0 | 1 | 0 | 0 | 0 | 1 | 0 | 1 | 1 | 0 | 0 | 1 | 0 |
| 23 | 1 | 1 | 1 | 0 | 1 | 0 | 0 | 0 | 0 | 0 | 1 | 0 | 1 | 1 | 1 | 0 |
| 24 | 0 | 0 | 0 | 1 | 1 | 0 | 0 | 0 | 0 | 1 | 0 | 1 | 0 | 1 | 0 | 0 |
| 25 | 1 | 0 | 0 | 1 | 1 | 0 | 0 | 0 | 1 | 1 | 0 | 0 | 1 | 0 | 0 | 0 |
| 26 | 0 | 1 | 0 | 1 | 1 | 0 | 0 | 0 | 0 | 0 | 0 | 1 | 1 | 0 | 1 | 0 |
| 27 | 1 | 1 | 0 | 1 | 1 | 0 | 0 | 0 | 1 | 0 | 0 | 0 | 0 | 1 | 1 | 0 |
| 28 | 0 | 0 | 1 | 1 | 1 | 0 | 0 | 0 | 0 | 1 | 1 | 1 | 0 | 0 | 1 | 1 |
| 29 | 1 | 0 | 1 | 1 | 1 | 0 | 0 | 0 | 1 | 1 | 1 | 0 | 1 | 1 | 1 | 1 |
| 30 | 0 | 1 | 1 | 1 | 1 | 0 | 0 | 0 | 0 | 0 | 1 | 1 | 1 | 1 | 0 | 1 |
| 31 | 1 | 1 | 1 | 1 | 1 | 0 | 0 | 0 | 1 | 0 | 1 | 0 | 0 | 0 | 0 | 1 |
| 32 | 0 | 0 | 0 | 0 | 0 | 1 | 0 | 0 | 1 | 1 | 1 | 1 | 0 | 0 | 0 | 1 |
| 33 | 1 | 0 | 0 | 0 | 0 | 1 | 0 | 0 | 0 | 1 | 1 | 0 | 1 | 1 | 0 | 1 |
| 34 | 0 | 1 | 0 | 0 | 0 | 1 | 0 | 0 | 1 | 0 | 1 | 1 | 1 | 1 | 1 | 1 |

TABLE II-continued

| | | | | | | | | | | | | | | | | |
|---|---|---|---|---|---|---|---|---|---|---|---|---|---|---|---|---|
| 35 | 1 | 1 | 0 | 0 | 0 | 1 | 0 | 0 | 0 | 0 | 1 | 0 | 0 | 0 | 1 | 1 |
| 36 | 0 | 0 | 1 | 0 | 0 | 1 | 0 | 0 | 1 | 1 | 0 | 1 | 0 | 1 | 1 | 0 |
| 37 | 1 | 0 | 1 | 0 | 0 | 1 | 0 | 0 | 0 | 1 | 0 | 0 | 1 | 0 | 1 | 0 |
| 38 | 0 | 1 | 1 | 0 | 0 | 1 | 0 | 0 | 1 | 0 | 0 | 1 | 1 | 0 | 0 | 0 |
| 39 | 1 | 1 | 1 | 0 | 0 | 1 | 0 | 0 | 0 | 0 | 0 | 0 | 0 | 1 | 0 | 0 |
| 40 | 0 | 0 | 0 | 1 | 0 | 1 | 0 | 0 | 0 | 1 | 1 | 1 | 1 | 1 | 1 | 0 |
| 41 | 1 | 0 | 0 | 1 | 0 | 1 | 0 | 0 | 1 | 1 | 1 | 0 | 0 | 0 | 1 | 0 |
| 42 | 0 | 1 | 0 | 1 | 0 | 1 | 0 | 0 | 0 | 0 | 1 | 1 | 0 | 0 | 0 | 0 |
| 43 | 1 | 1 | 0 | 1 | 0 | 1 | 0 | 0 | 1 | 0 | 1 | 0 | 1 | 1 | 0 | 0 |
| 44 | 0 | 0 | 1 | 1 | 0 | 1 | 0 | 0 | 0 | 1 | 0 | 1 | 1 | 0 | 0 | 1 |
| 45 | 1 | 0 | 1 | 1 | 0 | 1 | 0 | 0 | 1 | 1 | 0 | 0 | 0 | 1 | 0 | 1 |
| 46 | 0 | 1 | 1 | 1 | 0 | 1 | 0 | 0 | 0 | 0 | 0 | 1 | 0 | 1 | 1 | 1 |
| 47 | 1 | 1 | 1 | 1 | 0 | 1 | 0 | 0 | 1 | 0 | 0 | 0 | 1 | 0 | 1 | 1 |
| 48 | 0 | 0 | 0 | 0 | 1 | 1 | 0 | 0 | 0 | 0 | 1 | 0 | 1 | 0 | 1 | 0 |
| 49 | 1 | 0 | 0 | 0 | 1 | 1 | 0 | 0 | 1 | 0 | 1 | 1 | 0 | 1 | 1 | 0 |
| 50 | 0 | 1 | 0 | 0 | 1 | 1 | 0 | 0 | 0 | 1 | 1 | 0 | 0 | 1 | 0 | 0 |
| 51 | 1 | 1 | 0 | 0 | 1 | 1 | 0 | 0 | 1 | 1 | 1 | 1 | 1 | 0 | 0 | 0 |
| 52 | 0 | 0 | 1 | 0 | 1 | 1 | 0 | 0 | 0 | 0 | 0 | 0 | 1 | 1 | 0 | 1 |
| 53 | 1 | 0 | 1 | 0 | 1 | 1 | 0 | 0 | 1 | 0 | 0 | 1 | 0 | 0 | 0 | 1 |
| 54 | 0 | 1 | 1 | 0 | 1 | 1 | 0 | 0 | 0 | 1 | 0 | 0 | 0 | 0 | 1 | 1 |
| 55 | 1 | 1 | 1 | 0 | 1 | 1 | 0 | 0 | 1 | 1 | 0 | 1 | 1 | 1 | 1 | 1 |
| 56 | 0 | 0 | 0 | 1 | 1 | 1 | 0 | 0 | 1 | 0 | 1 | 0 | 0 | 1 | 0 | 1 |
| 57 | 1 | 0 | 0 | 1 | 1 | 1 | 0 | 0 | 0 | 0 | 1 | 1 | 1 | 0 | 0 | 1 |
| 58 | 0 | 1 | 0 | 1 | 1 | 1 | 0 | 0 | 1 | 1 | 1 | 0 | 1 | 0 | 1 | 1 |
| 59 | 1 | 1 | 0 | 1 | 1 | 1 | 0 | 0 | 0 | 1 | 1 | 1 | 0 | 1 | 1 | 1 |
| 60 | 0 | 0 | 1 | 1 | 1 | 1 | 0 | 0 | 1 | 0 | 0 | 0 | 0 | 0 | 1 | 0 |
| 61 | 1 | 0 | 1 | 1 | 1 | 1 | 0 | 0 | 0 | 0 | 0 | 1 | 1 | 1 | 1 | 0 |
| 62 | 0 | 1 | 1 | 1 | 1 | 1 | 0 | 0 | 1 | 1 | 0 | 0 | 1 | 1 | 0 | 0 |
| 63 | 1 | 1 | 1 | 1 | 1 | 1 | 0 | 0 | 0 | 1 | 0 | 1 | 0 | 0 | 0 | 0 |
| 64 | 0 | 0 | 0 | 0 | 0 | 0 | 1 | 0 | 1 | 1 | 1 | 0 | 0 | 1 | 0 | 0 |
| 65 | 1 | 0 | 0 | 0 | 0 | 0 | 1 | 0 | 0 | 1 | 1 | 1 | 1 | 0 | 0 | 0 |
| 66 | 0 | 1 | 0 | 0 | 0 | 0 | 1 | 0 | 1 | 0 | 1 | 0 | 1 | 0 | 1 | 0 |
| 67 | 1 | 1 | 0 | 0 | 0 | 0 | 1 | 0 | 0 | 0 | 1 | 1 | 0 | 1 | 1 | 0 |
| 68 | 0 | 0 | 1 | 0 | 0 | 0 | 1 | 0 | 1 | 1 | 0 | 0 | 0 | 0 | 1 | 1 |
| 69 | 1 | 0 | 1 | 0 | 0 | 0 | 1 | 0 | 0 | 1 | 0 | 1 | 1 | 1 | 1 | 1 |
| 70 | 0 | 1 | 1 | 0 | 0 | 0 | 1 | 0 | 1 | 0 | 0 | 0 | 1 | 1 | 0 | 1 |
| 71 | 1 | 1 | 1 | 0 | 0 | 0 | 1 | 0 | 0 | 0 | 0 | 1 | 0 | 0 | 0 | 1 |
| 72 | 0 | 0 | 0 | 1 | 0 | 0 | 1 | 0 | 0 | 1 | 1 | 0 | 1 | 0 | 1 | 1 |
| 73 | 1 | 0 | 0 | 1 | 0 | 0 | 1 | 0 | 1 | 1 | 1 | 1 | 0 | 1 | 1 | 1 |
| 74 | 0 | 1 | 0 | 1 | 0 | 0 | 1 | 0 | 0 | 0 | 1 | 0 | 0 | 1 | 0 | 1 |
| 75 | 1 | 1 | 0 | 1 | 0 | 0 | 1 | 0 | 1 | 0 | 1 | 1 | 1 | 0 | 0 | 1 |
| 76 | 0 | 0 | 1 | 1 | 0 | 0 | 1 | 0 | 0 | 1 | 0 | 0 | 1 | 1 | 0 | 0 |
| 77 | 1 | 0 | 1 | 1 | 0 | 0 | 1 | 0 | 1 | 1 | 0 | 1 | 0 | 0 | 0 | 0 |
| 78 | 0 | 1 | 1 | 1 | 0 | 0 | 1 | 0 | 0 | 0 | 0 | 0 | 0 | 0 | 1 | 0 |
| 79 | 1 | 1 | 1 | 1 | 0 | 0 | 1 | 0 | 1 | 0 | 0 | 1 | 1 | 1 | 1 | 0 |
| 80 | 0 | 0 | 0 | 0 | 1 | 0 | 1 | 0 | 0 | 0 | 1 | 1 | 1 | 1 | 1 | 1 |
| 81 | 1 | 0 | 0 | 0 | 1 | 0 | 1 | 0 | 1 | 0 | 1 | 0 | 0 | 0 | 1 | 1 |
| 82 | 0 | 1 | 0 | 0 | 1 | 0 | 1 | 0 | 0 | 1 | 1 | 1 | 0 | 0 | 0 | 1 |
| 83 | 1 | 1 | 0 | 0 | 1 | 0 | 1 | 0 | 1 | 1 | 1 | 1 | 0 | 1 | 0 | 1 |
| 84 | 0 | 0 | 1 | 0 | 1 | 0 | 1 | 0 | 0 | 0 | 0 | 1 | 1 | 0 | 0 | 0 |
| 85 | 1 | 0 | 1 | 0 | 1 | 0 | 1 | 0 | 1 | 0 | 0 | 0 | 0 | 1 | 0 | 0 |
| 86 | 0 | 1 | 1 | 0 | 1 | 0 | 1 | 0 | 0 | 1 | 0 | 1 | 0 | 1 | 1 | 0 |
| 87 | 1 | 1 | 1 | 0 | 1 | 0 | 1 | 0 | 1 | 1 | 0 | 0 | 1 | 0 | 1 | 0 |
| 88 | 0 | 0 | 0 | 1 | 1 | 0 | 1 | 0 | 1 | 0 | 1 | 1 | 0 | 0 | 0 | 0 |
| 89 | 1 | 0 | 0 | 1 | 1 | 0 | 1 | 0 | 0 | 0 | 1 | 0 | 1 | 1 | 0 | 0 |
| 90 | 0 | 1 | 0 | 1 | 1 | 0 | 1 | 0 | 0 | 1 | 1 | 1 | 1 | 1 | 1 | 0 |
| 91 | 1 | 1 | 0 | 1 | 1 | 0 | 1 | 0 | 0 | 1 | 1 | 0 | 0 | 0 | 1 | 0 |
| 92 | 0 | 0 | 1 | 1 | 1 | 0 | 1 | 0 | 1 | 0 | 0 | 1 | 0 | 1 | 1 | 1 |
| 93 | 1 | 0 | 1 | 1 | 1 | 0 | 1 | 0 | 0 | 0 | 0 | 0 | 1 | 0 | 1 | 1 |
| 94 | 0 | 1 | 1 | 1 | 1 | 0 | 1 | 0 | 1 | 1 | 0 | 1 | 1 | 0 | 0 | 1 |
| 95 | 1 | 1 | 1 | 1 | 1 | 0 | 1 | 0 | 0 | 1 | 0 | 0 | 0 | 1 | 0 | 1 |
| 96 | 0 | 0 | 0 | 0 | 0 | 1 | 1 | 0 | 0 | 0 | 0 | 1 | 0 | 1 | 0 | 1 |
| 97 | 1 | 0 | 0 | 0 | 0 | 1 | 1 | 0 | 1 | 0 | 0 | 0 | 1 | 0 | 0 | 1 |
| 98 | 0 | 1 | 0 | 0 | 0 | 1 | 1 | 0 | 0 | 1 | 0 | 1 | 1 | 0 | 1 | 1 |
| 99 | 1 | 1 | 0 | 0 | 0 | 1 | 1 | 0 | 1 | 1 | 0 | 0 | 0 | 1 | 1 | 1 |
| 100 | 0 | 0 | 1 | 0 | 0 | 1 | 1 | 0 | 0 | 0 | 1 | 1 | 0 | 0 | 1 | 0 |
| 101 | 1 | 0 | 1 | 0 | 0 | 1 | 1 | 0 | 1 | 0 | 1 | 0 | 1 | 1 | 1 | 0 |
| 102 | 0 | 1 | 1 | 0 | 0 | 1 | 1 | 0 | 0 | 1 | 1 | 1 | 1 | 1 | 0 | 0 |
| 103 | 1 | 1 | 1 | 0 | 0 | 1 | 1 | 0 | 1 | 1 | 1 | 0 | 0 | 0 | 0 | 0 |
| 104 | 0 | 0 | 0 | 1 | 0 | 1 | 1 | 0 | 1 | 0 | 0 | 1 | 1 | 0 | 1 | 0 |
| 105 | 1 | 0 | 0 | 1 | 0 | 1 | 1 | 0 | 0 | 0 | 0 | 0 | 0 | 1 | 1 | 0 |
| 106 | 0 | 1 | 0 | 1 | 0 | 1 | 1 | 0 | 1 | 1 | 0 | 1 | 0 | 1 | 0 | 0 |
| 107 | 1 | 1 | 0 | 1 | 0 | 1 | 1 | 0 | 0 | 1 | 0 | 0 | 1 | 0 | 0 | 0 |
| 108 | 0 | 0 | 1 | 1 | 0 | 1 | 1 | 0 | 1 | 0 | 1 | 1 | 1 | 1 | 0 | 1 |
| 109 | 1 | 0 | 1 | 1 | 0 | 1 | 1 | 0 | 0 | 0 | 1 | 0 | 0 | 0 | 0 | 1 |
| 110 | 0 | 1 | 1 | 1 | 0 | 1 | 1 | 0 | 0 | 1 | 1 | 1 | 1 | 0 | 0 | 1 |
| 111 | 1 | 1 | 1 | 1 | 0 | 1 | 1 | 0 | 0 | 1 | 1 | 0 | 1 | 1 | 1 | 1 |
| 112 | 0 | 0 | 0 | 0 | 1 | 1 | 1 | 0 | 1 | 1 | 0 | 0 | 1 | 1 | 1 | 0 |
| 113 | 1 | 0 | 0 | 0 | 1 | 1 | 1 | 0 | 0 | 1 | 0 | 1 | 0 | 0 | 1 | 0 |
| 114 | 0 | 1 | 0 | 0 | 1 | 1 | 1 | 0 | 1 | 0 | 0 | 0 | 0 | 0 | 0 | 0 |
| 115 | 1 | 1 | 0 | 0 | 1 | 1 | 1 | 0 | 0 | 0 | 0 | 1 | 1 | 1 | 0 | 0 |
| 116 | 0 | 0 | 1 | 0 | 1 | 1 | 1 | 0 | 1 | 1 | 1 | 0 | 1 | 0 | 0 | 1 |

TABLE II-continued

| | | | | | | | | | | | | | | | | |
|---|---|---|---|---|---|---|---|---|---|---|---|---|---|---|---|---|
| 117 | 1 | 0 | 1 | 0 | 1 | 1 | 1 | 0 | 0 | 1 | 1 | 1 | 0 | 1 | 0 | 1 |
| 118 | 0 | 1 | 1 | 0 | 1 | 1 | 1 | 0 | 1 | 0 | 1 | 0 | 0 | 1 | 1 | 1 |
| 119 | 1 | 1 | 1 | 0 | 1 | 1 | 1 | 0 | 0 | 0 | 1 | 1 | 1 | 0 | 1 | 1 |
| 120 | 0 | 0 | 0 | 1 | 1 | 1 | 1 | 0 | 0 | 1 | 0 | 0 | 0 | 0 | 0 | 1 |
| 121 | 1 | 0 | 0 | 1 | 1 | 1 | 1 | 0 | 1 | 1 | 0 | 1 | 1 | 1 | 0 | 1 |
| 122 | 0 | 1 | 0 | 1 | 1 | 1 | 1 | 0 | 0 | 0 | 0 | 0 | 1 | 1 | 1 | 1 |
| 123 | 1 | 1 | 0 | 1 | 1 | 1 | 1 | 0 | 1 | 0 | 0 | 1 | 0 | 0 | 1 | 1 |
| 124 | 0 | 0 | 1 | 1 | 1 | 1 | 1 | 0 | 0 | 1 | 1 | 0 | 0 | 1 | 1 | 0 |
| 125 | 1 | 0 | 1 | 1 | 1 | 1 | 1 | 0 | 1 | 1 | 1 | 1 | 1 | 0 | 1 | 0 |
| 126 | 0 | 1 | 1 | 1 | 1 | 1 | 1 | 0 | 0 | 0 | 1 | 0 | 1 | 0 | 0 | 0 |
| 127 | 1 | 1 | 1 | 1 | 1 | 1 | 1 | 0 | 1 | 0 | 1 | 1 | 0 | 1 | 0 | 0 |
| 128 | 0 | 0 | 0 | 0 | 0 | 0 | 0 | 1 | 0 | 1 | 1 | 1 | 0 | 0 | 1 | 0 |
| 129 | 1 | 0 | 0 | 0 | 0 | 0 | 0 | 1 | 1 | 1 | 1 | 0 | 1 | 1 | 1 | 0 |
| 130 | 0 | 1 | 0 | 0 | 0 | 0 | 0 | 1 | 0 | 0 | 1 | 1 | 1 | 1 | 0 | 0 |
| 131 | 1 | 1 | 0 | 0 | 0 | 0 | 0 | 1 | 1 | 0 | 1 | 0 | 0 | 0 | 0 | 0 |
| 132 | 0 | 0 | 1 | 0 | 0 | 0 | 0 | 1 | 0 | 1 | 0 | 1 | 0 | 1 | 0 | 1 |
| 133 | 1 | 0 | 1 | 0 | 0 | 0 | 0 | 1 | 1 | 1 | 0 | 0 | 1 | 0 | 0 | 1 |
| 134 | 0 | 1 | 1 | 0 | 0 | 0 | 0 | 1 | 0 | 0 | 0 | 1 | 1 | 0 | 1 | 1 |
| 135 | 1 | 1 | 1 | 0 | 0 | 0 | 0 | 1 | 1 | 0 | 0 | 0 | 0 | 1 | 1 | 1 |
| 136 | 0 | 0 | 0 | 1 | 0 | 0 | 0 | 1 | 1 | 1 | 1 | 1 | 1 | 1 | 0 | 1 |
| 137 | 1 | 0 | 0 | 1 | 0 | 0 | 0 | 1 | 0 | 1 | 1 | 0 | 0 | 0 | 0 | 1 |
| 138 | 0 | 1 | 0 | 1 | 0 | 0 | 0 | 1 | 1 | 0 | 1 | 1 | 0 | 0 | 1 | 1 |
| 139 | 1 | 1 | 0 | 1 | 0 | 0 | 0 | 1 | 0 | 0 | 1 | 0 | 1 | 1 | 1 | 1 |
| 140 | 0 | 0 | 1 | 1 | 0 | 0 | 0 | 1 | 1 | 1 | 0 | 1 | 1 | 0 | 1 | 0 |
| 141 | 1 | 0 | 1 | 1 | 0 | 0 | 0 | 1 | 0 | 1 | 0 | 0 | 0 | 1 | 1 | 0 |
| 142 | 0 | 1 | 1 | 1 | 0 | 0 | 0 | 1 | 1 | 0 | 0 | 1 | 0 | 1 | 0 | 0 |
| 143 | 1 | 1 | 1 | 1 | 0 | 0 | 0 | 1 | 0 | 0 | 0 | 1 | 0 | 0 | 0 | 0 |
| 144 | 0 | 0 | 0 | 0 | 1 | 0 | 0 | 1 | 1 | 0 | 1 | 0 | 1 | 0 | 0 | 1 |
| 145 | 1 | 0 | 0 | 0 | 1 | 0 | 0 | 1 | 0 | 0 | 1 | 1 | 0 | 1 | 0 | 1 |
| 146 | 0 | 1 | 0 | 0 | 1 | 0 | 0 | 1 | 1 | 1 | 1 | 0 | 0 | 1 | 1 | 1 |
| 147 | 1 | 1 | 0 | 0 | 1 | 0 | 0 | 1 | 0 | 1 | 1 | 1 | 1 | 0 | 1 | 1 |
| 148 | 0 | 0 | 1 | 0 | 1 | 0 | 0 | 1 | 1 | 0 | 0 | 0 | 1 | 1 | 1 | 0 |
| 149 | 1 | 0 | 1 | 0 | 1 | 0 | 0 | 1 | 0 | 0 | 0 | 1 | 0 | 0 | 1 | 0 |
| 150 | 0 | 1 | 1 | 0 | 1 | 0 | 0 | 1 | 1 | 1 | 0 | 0 | 0 | 0 | 0 | 0 |
| 151 | 1 | 1 | 1 | 0 | 1 | 0 | 0 | 1 | 0 | 1 | 0 | 1 | 1 | 1 | 0 | 0 |
| 152 | 0 | 0 | 0 | 1 | 1 | 0 | 0 | 1 | 0 | 0 | 1 | 0 | 0 | 1 | 1 | 0 |
| 153 | 1 | 0 | 0 | 1 | 1 | 0 | 0 | 1 | 1 | 0 | 1 | 1 | 1 | 0 | 1 | 0 |
| 154 | 0 | 1 | 0 | 1 | 1 | 0 | 0 | 1 | 0 | 1 | 1 | 0 | 1 | 0 | 0 | 0 |
| 155 | 1 | 1 | 0 | 1 | 1 | 0 | 0 | 1 | 1 | 1 | 1 | 1 | 0 | 1 | 0 | 0 |
| 156 | 0 | 0 | 1 | 1 | 1 | 0 | 0 | 1 | 0 | 0 | 0 | 0 | 0 | 0 | 0 | 1 |
| 157 | 1 | 0 | 1 | 1 | 1 | 0 | 0 | 1 | 1 | 0 | 0 | 1 | 1 | 1 | 0 | 1 |
| 158 | 0 | 1 | 1 | 1 | 1 | 0 | 0 | 1 | 0 | 1 | 0 | 0 | 1 | 1 | 1 | 1 |
| 159 | 1 | 1 | 1 | 1 | 1 | 0 | 0 | 1 | 1 | 1 | 0 | 1 | 0 | 0 | 1 | 1 |
| 160 | 0 | 0 | 0 | 0 | 0 | 1 | 0 | 1 | 1 | 0 | 0 | 0 | 0 | 0 | 1 | 1 |
| 161 | 1 | 0 | 0 | 0 | 0 | 1 | 0 | 1 | 0 | 0 | 0 | 1 | 1 | 1 | 1 | 1 |
| 162 | 0 | 1 | 0 | 0 | 0 | 1 | 0 | 1 | 1 | 1 | 0 | 0 | 1 | 1 | 0 | 1 |
| 163 | 1 | 1 | 0 | 0 | 0 | 1 | 0 | 1 | 0 | 1 | 0 | 1 | 0 | 0 | 0 | 1 |
| 164 | 0 | 0 | 1 | 0 | 0 | 1 | 0 | 1 | 1 | 0 | 1 | 0 | 0 | 1 | 0 | 0 |
| 165 | 1 | 0 | 1 | 0 | 0 | 1 | 0 | 1 | 0 | 0 | 1 | 1 | 1 | 0 | 0 | 0 |
| 166 | 0 | 1 | 1 | 0 | 0 | 1 | 0 | 1 | 1 | 1 | 1 | 0 | 1 | 0 | 1 | 0 |
| 167 | 1 | 1 | 1 | 0 | 0 | 1 | 0 | 1 | 0 | 1 | 1 | 1 | 0 | 1 | 1 | 0 |
| 168 | 0 | 0 | 0 | 1 | 0 | 1 | 0 | 1 | 0 | 0 | 0 | 0 | 1 | 1 | 0 | 0 |
| 169 | 1 | 0 | 0 | 1 | 0 | 1 | 0 | 1 | 1 | 0 | 0 | 1 | 0 | 0 | 0 | 0 |
| 170 | 0 | 1 | 0 | 1 | 0 | 1 | 0 | 1 | 0 | 1 | 0 | 0 | 0 | 0 | 1 | 0 |
| 171 | 1 | 1 | 0 | 1 | 0 | 1 | 0 | 1 | 1 | 1 | 0 | 1 | 1 | 1 | 1 | 0 |
| 172 | 0 | 0 | 1 | 1 | 0 | 1 | 0 | 1 | 0 | 0 | 1 | 0 | 1 | 0 | 1 | 1 |
| 173 | 1 | 0 | 1 | 1 | 0 | 1 | 0 | 1 | 1 | 0 | 1 | 1 | 0 | 1 | 1 | 1 |
| 174 | 0 | 1 | 1 | 1 | 0 | 1 | 0 | 1 | 0 | 1 | 1 | 0 | 0 | 1 | 0 | 1 |
| 175 | 1 | 1 | 1 | 1 | 0 | 1 | 0 | 1 | 1 | 1 | 1 | 1 | 1 | 0 | 0 | 1 |
| 176 | 0 | 0 | 0 | 0 | 1 | 1 | 0 | 1 | 0 | 1 | 0 | 1 | 1 | 0 | 0 | 0 |
| 177 | 1 | 0 | 0 | 0 | 1 | 1 | 0 | 1 | 1 | 1 | 0 | 0 | 0 | 1 | 0 | 0 |
| 178 | 0 | 1 | 0 | 0 | 1 | 1 | 0 | 1 | 0 | 0 | 0 | 1 | 0 | 1 | 1 | 0 |
| 179 | 1 | 1 | 0 | 0 | 1 | 1 | 0 | 1 | 1 | 0 | 0 | 0 | 1 | 0 | 1 | 0 |
| 180 | 0 | 0 | 1 | 0 | 1 | 1 | 0 | 1 | 0 | 1 | 1 | 1 | 1 | 1 | 1 | 1 |
| 181 | 1 | 0 | 1 | 0 | 1 | 1 | 0 | 1 | 1 | 1 | 1 | 0 | 0 | 0 | 1 | 1 |
| 182 | 0 | 1 | 1 | 0 | 1 | 1 | 0 | 1 | 0 | 0 | 1 | 1 | 0 | 0 | 0 | 1 |
| 183 | 1 | 1 | 1 | 0 | 1 | 1 | 0 | 1 | 1 | 0 | 1 | 0 | 1 | 1 | 0 | 1 |
| 184 | 0 | 0 | 0 | 1 | 1 | 1 | 0 | 1 | 1 | 1 | 0 | 1 | 0 | 1 | 1 | 1 |
| 185 | 1 | 0 | 0 | 1 | 1 | 1 | 0 | 1 | 0 | 1 | 0 | 0 | 1 | 0 | 1 | 1 |
| 186 | 0 | 1 | 0 | 1 | 1 | 1 | 0 | 1 | 1 | 0 | 0 | 1 | 1 | 0 | 0 | 1 |
| 187 | 1 | 1 | 0 | 1 | 1 | 1 | 0 | 1 | 0 | 0 | 0 | 0 | 0 | 1 | 0 | 1 |
| 188 | 0 | 0 | 1 | 1 | 1 | 1 | 0 | 1 | 1 | 1 | 1 | 1 | 0 | 0 | 0 | 0 |
| 189 | 1 | 0 | 1 | 1 | 1 | 1 | 0 | 1 | 0 | 1 | 1 | 0 | 1 | 1 | 0 | 0 |
| 190 | 0 | 1 | 1 | 1 | 1 | 1 | 0 | 1 | 1 | 0 | 1 | 1 | 1 | 1 | 1 | 0 |
| 191 | 1 | 1 | 1 | 1 | 1 | 1 | 0 | 1 | 0 | 0 | 1 | 0 | 0 | 0 | 1 | 0 |
| 192 | 0 | 0 | 0 | 0 | 0 | 0 | 1 | 1 | 1 | 0 | 0 | 1 | 0 | 1 | 1 | 0 |
| 193 | 1 | 0 | 0 | 0 | 0 | 0 | 1 | 1 | 0 | 0 | 0 | 0 | 1 | 0 | 1 | 0 |
| 194 | 0 | 1 | 0 | 0 | 0 | 0 | 1 | 1 | 1 | 1 | 0 | 1 | 1 | 0 | 0 | 0 |
| 195 | 1 | 1 | 0 | 0 | 0 | 0 | 1 | 1 | 0 | 1 | 0 | 0 | 0 | 1 | 0 | 0 |
| 196 | 0 | 0 | 1 | 0 | 0 | 0 | 1 | 1 | 1 | 0 | 1 | 1 | 0 | 0 | 0 | 1 |
| 197 | 1 | 0 | 1 | 0 | 0 | 0 | 1 | 1 | 0 | 0 | 1 | 0 | 1 | 1 | 0 | 1 |
| 198 | 0 | 1 | 1 | 0 | 0 | 0 | 1 | 1 | 1 | 1 | 1 | 1 | 1 | 1 | 1 | 1 |

TABLE II-continued

| DATA WORD | | | | | | | | | | | | | | | |
|---|---|---|---|---|---|---|---|---|---|---|---|---|---|---|---|
| 199 | 1 | 1 | 1 | 0 | 0 | 0 | 1 | 1 | 0 | 1 | 1 | 0 | 0 | 0 | 1 | 1 |
| 200 | 0 | 0 | 0 | 1 | 0 | 0 | 1 | 1 | 0 | 0 | 0 | 1 | 1 | 0 | 0 | 1 |
| 201 | 1 | 0 | 0 | 1 | 0 | 0 | 1 | 1 | 1 | 0 | 0 | 0 | 0 | 1 | 0 | 1 |
| 202 | 0 | 1 | 0 | 1 | 0 | 0 | 1 | 1 | 0 | 1 | 0 | 1 | 0 | 1 | 1 | 1 |
| 203 | 1 | 1 | 0 | 1 | 0 | 0 | 1 | 1 | 1 | 1 | 0 | 0 | 1 | 0 | 1 | 1 |
| 204 | 0 | 0 | 1 | 1 | 0 | 0 | 1 | 1 | 0 | 0 | 1 | 1 | 1 | 1 | 1 | 0 |
| 205 | 1 | 0 | 1 | 1 | 0 | 0 | 1 | 1 | 1 | 0 | 1 | 0 | 0 | 0 | 1 | 0 |
| 206 | 0 | 1 | 1 | 1 | 0 | 0 | 1 | 1 | 0 | 1 | 1 | 1 | 0 | 0 | 0 | 0 |
| 207 | 1 | 1 | 1 | 1 | 0 | 0 | 1 | 1 | 1 | 1 | 1 | 0 | 1 | 1 | 0 | 0 |
| 208 | 0 | 0 | 0 | 0 | 1 | 0 | 1 | 1 | 0 | 1 | 0 | 0 | 1 | 1 | 0 | 1 |
| 209 | 1 | 0 | 0 | 0 | 1 | 0 | 1 | 1 | 1 | 1 | 0 | 1 | 0 | 0 | 0 | 1 |
| 210 | 0 | 1 | 0 | 0 | 1 | 0 | 1 | 1 | 0 | 0 | 0 | 0 | 0 | 0 | 1 | 1 |
| 211 | 1 | 1 | 0 | 0 | 1 | 0 | 1 | 1 | 1 | 0 | 0 | 1 | 1 | 1 | 1 | 1 |
| 212 | 0 | 0 | 1 | 0 | 1 | 0 | 1 | 1 | 0 | 1 | 1 | 0 | 1 | 0 | 1 | 0 |
| 213 | 1 | 0 | 1 | 0 | 1 | 0 | 1 | 1 | 1 | 1 | 1 | 1 | 0 | 1 | 1 | 0 |
| 214 | 0 | 1 | 1 | 0 | 1 | 0 | 1 | 1 | 0 | 0 | 1 | 0 | 0 | 1 | 0 | 0 |
| 215 | 1 | 1 | 1 | 0 | 1 | 0 | 1 | 1 | 1 | 0 | 1 | 1 | 1 | 0 | 0 | 0 |
| 216 | 0 | 0 | 0 | 1 | 1 | 0 | 1 | 1 | 1 | 1 | 0 | 0 | 0 | 0 | 1 | 0 |
| 217 | 1 | 0 | 0 | 1 | 1 | 0 | 1 | 1 | 0 | 1 | 0 | 1 | 1 | 1 | 1 | 0 |
| 218 | 0 | 1 | 0 | 1 | 1 | 0 | 1 | 1 | 1 | 0 | 0 | 0 | 1 | 1 | 0 | 0 |
| 219 | 1 | 1 | 0 | 1 | 1 | 0 | 1 | 1 | 0 | 0 | 0 | 1 | 0 | 0 | 0 | 0 |
| 220 | 0 | 0 | 1 | 1 | 1 | 0 | 1 | 1 | 1 | 1 | 1 | 0 | 0 | 1 | 0 | 1 |
| 221 | 1 | 0 | 1 | 1 | 1 | 0 | 1 | 1 | 0 | 1 | 1 | 1 | 1 | 0 | 0 | 1 |
| 222 | 0 | 1 | 1 | 1 | 1 | 0 | 1 | 1 | 1 | 0 | 1 | 0 | 1 | 0 | 1 | 1 |
| 223 | 1 | 1 | 1 | 1 | 1 | 0 | 1 | 1 | 0 | 0 | 1 | 1 | 0 | 1 | 1 | 1 |
| 224 | 0 | 0 | 0 | 0 | 0 | 1 | 1 | 1 | 0 | 1 | 1 | 0 | 1 | 1 | 1 | 1 |
| 225 | 1 | 0 | 0 | 0 | 0 | 1 | 1 | 1 | 1 | 1 | 1 | 1 | 1 | 0 | 1 | 1 |
| 226 | 0 | 1 | 0 | 0 | 0 | 1 | 1 | 1 | 0 | 0 | 1 | 0 | 1 | 0 | 0 | 1 |
| 227 | 1 | 1 | 0 | 0 | 0 | 1 | 1 | 1 | 1 | 0 | 1 | 1 | 0 | 1 | 0 | 1 |
| 228 | 0 | 0 | 1 | 0 | 0 | 1 | 1 | 1 | 0 | 1 | 0 | 0 | 0 | 0 | 0 | 0 |
| 229 | 1 | 0 | 1 | 0 | 0 | 1 | 1 | 1 | 1 | 1 | 0 | 1 | 1 | 1 | 0 | 0 |
| 230 | 0 | 1 | 1 | 0 | 0 | 1 | 1 | 1 | 0 | 0 | 0 | 0 | 1 | 1 | 1 | 0 |
| 231 | 1 | 1 | 1 | 0 | 0 | 1 | 1 | 1 | 1 | 0 | 0 | 1 | 0 | 0 | 1 | 0 |
| 232 | 0 | 0 | 0 | 1 | 0 | 1 | 1 | 1 | 1 | 1 | 1 | 0 | 1 | 0 | 0 | 0 |
| 233 | 1 | 0 | 0 | 1 | 0 | 1 | 1 | 1 | 0 | 1 | 1 | 1 | 0 | 1 | 0 | 0 |
| 234 | 0 | 1 | 0 | 1 | 0 | 1 | 1 | 1 | 1 | 0 | 1 | 0 | 0 | 1 | 1 | 0 |
| 235 | 1 | 1 | 0 | 1 | 0 | 1 | 1 | 1 | 0 | 0 | 1 | 1 | 1 | 0 | 1 | 0 |
| 236 | 0 | 0 | 1 | 1 | 0 | 1 | 1 | 1 | 1 | 1 | 0 | 0 | 1 | 1 | 1 | 1 |
| 237 | 1 | 0 | 1 | 1 | 0 | 1 | 1 | 1 | 0 | 1 | 0 | 1 | 0 | 0 | 1 | 1 |
| 238 | 0 | 1 | 1 | 1 | 0 | 1 | 1 | 1 | 1 | 0 | 0 | 0 | 0 | 0 | 0 | 1 |
| 239 | 1 | 1 | 1 | 1 | 0 | 1 | 1 | 1 | 0 | 0 | 0 | 1 | 1 | 1 | 0 | 1 |
| 240 | 0 | 0 | 0 | 0 | 1 | 1 | 1 | 1 | 1 | 0 | 1 | 1 | 1 | 1 | 0 | 0 |
| 241 | 1 | 0 | 0 | 0 | 1 | 1 | 1 | 1 | 0 | 0 | 1 | 0 | 0 | 0 | 0 | 0 |
| 242 | 0 | 1 | 0 | 0 | 1 | 1 | 1 | 1 | 1 | 1 | 1 | 1 | 0 | 0 | 1 | 0 |
| 243 | 1 | 1 | 0 | 0 | 1 | 1 | 1 | 1 | 0 | 1 | 1 | 0 | 1 | 1 | 1 | 0 |
| 244 | 0 | 0 | 1 | 0 | 1 | 1 | 1 | 1 | 1 | 0 | 0 | 1 | 1 | 0 | 1 | 1 |
| 245 | 1 | 0 | 1 | 0 | 1 | 1 | 1 | 1 | 0 | 0 | 0 | 0 | 0 | 1 | 1 | 1 |
| 246 | 0 | 1 | 1 | 0 | 1 | 1 | 1 | 1 | 1 | 1 | 0 | 1 | 0 | 1 | 0 | 1 |
| 247 | 1 | 1 | 1 | 0 | 1 | 1 | 1 | 1 | 0 | 1 | 0 | 0 | 1 | 0 | 0 | 1 |
| 248 | 0 | 0 | 0 | 1 | 1 | 1 | 1 | 1 | 0 | 0 | 1 | 1 | 0 | 0 | 1 | 1 |
| 249 | 1 | 0 | 0 | 1 | 1 | 1 | 1 | 1 | 1 | 0 | 1 | 0 | 1 | 1 | 1 | 1 |
| 250 | 0 | 1 | 0 | 1 | 1 | 1 | 1 | 1 | 0 | 1 | 1 | 1 | 1 | 1 | 0 | 1 |
| 251 | 1 | 1 | 0 | 1 | 1 | 1 | 1 | 1 | 1 | 1 | 1 | 0 | 0 | 0 | 0 | 1 |
| 252 | 0 | 0 | 1 | 1 | 1 | 1 | 1 | 1 | 0 | 0 | 0 | 1 | 0 | 1 | 0 | 0 |
| 253 | 1 | 0 | 1 | 1 | 1 | 1 | 1 | 1 | 1 | 0 | 0 | 0 | 1 | 0 | 0 | 0 |
| 254 | 0 | 1 | 1 | 1 | 1 | 1 | 1 | 1 | 0 | 1 | 0 | 1 | 1 | 0 | 1 | 0 |
| 255 | 1 | 1 | 1 | 1 | 1 | 1 | 1 | 1 | 1 | 1 | 0 | 0 | 0 | 1 | 1 | 0 |

| DATA WORD | IMPROVED ERROR CORRECTING CODE | | | | | | | | | | | | | | |
|---|---|---|---|---|---|---|---|---|---|---|---|---|---|---|---|
| | $^1Y$ | | | | | | | $^2Y$ | | | | | | | |
| x | 1 | 2 | 4 | 7 | A | B | $\overline{D}$ | $\overline{G}$ | 3 | 5 | 6 | 8 | C | E | $\overline{F}$ | $\overline{H}$ |
| 0 | 0 | 0 | 0 | 0 | 0 | 0 | 1 | 1 | 0 | 0 | 0 | 0 | 0 | 0 | 1 | 1 |
| 1 | 1 | 0 | 0 | 0 | 1 | 0 | 0 | 1 | 0 | 0 | 0 | 0 | 0 | 1 | 0 | 1 |
| 2 | 0 | 1 | 0 | 0 | 0 | 1 | 1 | 0 | 0 | 0 | 0 | 0 | 0 | 1 | 0 | 1 |
| 3 | 1 | 1 | 0 | 0 | 1 | 1 | 0 | 0 | 0 | 0 | 0 | 0 | 0 | 0 | 1 | 1 |
| 4 | 0 | 0 | 0 | 0 | 0 | 0 | 1 | 0 | 1 | 0 | 0 | 0 | 1 | 0 | 0 | 0 |
| 5 | 1 | 0 | 0 | 0 | 1 | 0 | 0 | 0 | 1 | 0 | 0 | 0 | 1 | 1 | 1 | 0 |
| 6 | 0 | 1 | 0 | 0 | 0 | 1 | 1 | 1 | 1 | 0 | 0 | 0 | 1 | 1 | 1 | 0 |
| 7 | 1 | 1 | 0 | 0 | 1 | 1 | 0 | 1 | 1 | 0 | 0 | 0 | 1 | 0 | 0 | 0 |
| 8 | 0 | 0 | 1 | 0 | 1 | 0 | 1 | 0 | 0 | 0 | 0 | 0 | 0 | 1 | 0 | 0 |
| 9 | 1 | 0 | 1 | 0 | 0 | 0 | 0 | 0 | 0 | 0 | 0 | 0 | 0 | 0 | 1 | 0 |
| 10 | 0 | 1 | 1 | 0 | 1 | 1 | 1 | 1 | 0 | 0 | 0 | 0 | 0 | 0 | 1 | 0 |
| 11 | 1 | 1 | 1 | 0 | 0 | 1 | 0 | 1 | 0 | 0 | 0 | 0 | 0 | 1 | 0 | 0 |
| 12 | 0 | 0 | 1 | 0 | 1 | 0 | 1 | 1 | 1 | 0 | 0 | 0 | 1 | 1 | 1 | 1 |
| 13 | 1 | 0 | 1 | 0 | 0 | 0 | 0 | 1 | 1 | 0 | 0 | 0 | 1 | 0 | 0 | 1 |
| 14 | 0 | 1 | 1 | 0 | 1 | 1 | 1 | 0 | 1 | 0 | 0 | 0 | 1 | 0 | 0 | 1 |
| 15 | 1 | 1 | 1 | 0 | 0 | 1 | 0 | 0 | 1 | 0 | 0 | 0 | 1 | 1 | 1 | 1 |
| 16 | 0 | 0 | 0 | 0 | 1 | 1 | 0 | 0 | 0 | 1 | 0 | 0 | 0 | 1 | 1 | 0 |
| 17 | 1 | 0 | 0 | 0 | 0 | 1 | 1 | 0 | 0 | 1 | 0 | 0 | 0 | 0 | 0 | 0 |
| 18 | 0 | 1 | 0 | 0 | 1 | 0 | 0 | 1 | 0 | 1 | 0 | 0 | 0 | 0 | 0 | 0 |
| 19 | 1 | 1 | 0 | 0 | 0 | 0 | 1 | 1 | 0 | 1 | 0 | 0 | 0 | 1 | 1 | 0 |
| 20 | 0 | 0 | 0 | 0 | 1 | 1 | 0 | 1 | 1 | 1 | 0 | 0 | 1 | 1 | 0 | 1 |

TABLE II-continued

| | | | | | | | | | | | | | | | | |
|---|---|---|---|---|---|---|---|---|---|---|---|---|---|---|---|---|
| 21 | 1 | 0 | 0 | 0 | 0 | 1 | 1 | 1 | 1 | 1 | 0 | 0 | 1 | 0 | 1 | 1 |
| 22 | 0 | 1 | 0 | 0 | 1 | 0 | 0 | 0 | 1 | 1 | 0 | 0 | 1 | 0 | 1 | 1 |
| 23 | 1 | 1 | 0 | 0 | 0 | 0 | 1 | 0 | 1 | 1 | 0 | 0 | 1 | 1 | 0 | 1 |
| 24 | 0 | 0 | 1 | 0 | 0 | 1 | 0 | 1 | 0 | 1 | 0 | 0 | 0 | 0 | 0 | 1 |
| 25 | 1 | 0 | 1 | 0 | 1 | 1 | 1 | 1 | 0 | 1 | 0 | 0 | 1 | 1 | 1 | 1 |
| 26 | 0 | 1 | 1 | 0 | 0 | 0 | 0 | 0 | 0 | 1 | 0 | 0 | 0 | 1 | 1 | 1 |
| 27 | 1 | 1 | 1 | 0 | 1 | 0 | 1 | 0 | 0 | 1 | 0 | 0 | 0 | 0 | 0 | 1 |
| 28 | 0 | 0 | 1 | 0 | 0 | 1 | 0 | 0 | 1 | 1 | 0 | 0 | 1 | 0 | 1 | 0 |
| 29 | 1 | 0 | 1 | 0 | 1 | 1 | 1 | 0 | 1 | 1 | 0 | 0 | 1 | 1 | 0 | 0 |
| 30 | 0 | 1 | 1 | 0 | 0 | 0 | 0 | 1 | 1 | 1 | 0 | 0 | 1 | 1 | 0 | 0 |
| 31 | 1 | 1 | 1 | 0 | 1 | 0 | 1 | 1 | 1 | 1 | 0 | 0 | 1 | 0 | 1 | 0 |
| 32 | 0 | 0 | 0 | 0 | 1 | 1 | 0 | 1 | 0 | 0 | 1 | 0 | 1 | 0 | 1 | 0 |
| 33 | 1 | 0 | 0 | 0 | 0 | 1 | 1 | 1 | 0 | 0 | 1 | 0 | 1 | 1 | 0 | 0 |
| 34 | 0 | 1 | 0 | 0 | 1 | 0 | 0 | 0 | 0 | 0 | 1 | 0 | 1 | 1 | 0 | 0 |
| 35 | 1 | 1 | 0 | 0 | 0 | 0 | 1 | 0 | 0 | 0 | 1 | 0 | 1 | 0 | 1 | 0 |
| 36 | 0 | 0 | 0 | 0 | 1 | 1 | 0 | 0 | 1 | 0 | 1 | 0 | 0 | 0 | 0 | 1 |
| 37 | 1 | 0 | 0 | 0 | 0 | 1 | 1 | 0 | 1 | 0 | 1 | 0 | 0 | 1 | 1 | 1 |
| 38 | 0 | 1 | 0 | 0 | 1 | 0 | 0 | 1 | 1 | 0 | 1 | 0 | 0 | 1 | 1 | 1 |
| 39 | 1 | 1 | 0 | 0 | 0 | 0 | 1 | 1 | 1 | 0 | 1 | 0 | 0 | 0 | 0 | 1 |
| 40 | 0 | 0 | 1 | 0 | 0 | 1 | 0 | 0 | 0 | 0 | 1 | 0 | 1 | 1 | 0 | 1 |
| 41 | 1 | 0 | 1 | 0 | 1 | 1 | 1 | 0 | 0 | 0 | 1 | 0 | 1 | 0 | 1 | 1 |
| 42 | 0 | 1 | 1 | 0 | 0 | 0 | 0 | 1 | 0 | 0 | 1 | 0 | 1 | 0 | 1 | 1 |
| 43 | 1 | 1 | 1 | 0 | 1 | 0 | 1 | 1 | 0 | 0 | 1 | 0 | 1 | 1 | 0 | 1 |
| 44 | 0 | 0 | 1 | 0 | 0 | 1 | 0 | 1 | 1 | 0 | 1 | 0 | 0 | 1 | 1 | 0 |
| 45 | 1 | 0 | 1 | 0 | 1 | 1 | 1 | 1 | 1 | 0 | 1 | 0 | 0 | 0 | 0 | 0 |
| 46 | 0 | 1 | 1 | 0 | 0 | 0 | 0 | 0 | 1 | 0 | 1 | 0 | 0 | 0 | 0 | 0 |
| 47 | 1 | 1 | 1 | 0 | 1 | 0 | 1 | 0 | 1 | 0 | 1 | 0 | 0 | 1 | 1 | 0 |
| 48 | 0 | 0 | 0 | 0 | 0 | 0 | 1 | 0 | 0 | 1 | 1 | 0 | 1 | 1 | 1 | 1 |
| 49 | 1 | 0 | 0 | 0 | 1 | 0 | 0 | 0 | 0 | 1 | 1 | 0 | 1 | 0 | 0 | 1 |
| 50 | 0 | 1 | 0 | 0 | 0 | 1 | 1 | 1 | 0 | 1 | 1 | 0 | 1 | 0 | 0 | 1 |
| 51 | 1 | 1 | 0 | 0 | 1 | 1 | 0 | 1 | 0 | 1 | 1 | 0 | 1 | 1 | 1 | 1 |
| 52 | 0 | 0 | 0 | 0 | 0 | 0 | 1 | 1 | 1 | 1 | 1 | 0 | 0 | 1 | 0 | 0 |
| 53 | 1 | 0 | 0 | 0 | 1 | 0 | 0 | 1 | 1 | 1 | 1 | 0 | 0 | 0 | 1 | 0 |
| 54 | 0 | 1 | 0 | 0 | 0 | 1 | 1 | 0 | 1 | 1 | 1 | 0 | 0 | 0 | 1 | 0 |
| 55 | 1 | 1 | 0 | 0 | 1 | 1 | 0 | 0 | 1 | 1 | 1 | 0 | 0 | 1 | 0 | 0 |
| 56 | 0 | 0 | 1 | 0 | 1 | 0 | 1 | 1 | 0 | 1 | 1 | 0 | 1 | 0 | 0 | 0 |
| 57 | 1 | 0 | 1 | 0 | 0 | 0 | 0 | 1 | 0 | 1 | 1 | 0 | 1 | 1 | 1 | 0 |
| 58 | 0 | 1 | 1 | 0 | 1 | 1 | 1 | 0 | 0 | 1 | 1 | 0 | 1 | 1 | 1 | 0 |
| 59 | 1 | 1 | 1 | 0 | 0 | 1 | 0 | 0 | 0 | 1 | 1 | 0 | 1 | 0 | 0 | 0 |
| 60 | 0 | 0 | 1 | 0 | 1 | 0 | 1 | 0 | 1 | 1 | 1 | 0 | 0 | 0 | 1 | 1 |
| 61 | 1 | 0 | 1 | 0 | 0 | 0 | 0 | 0 | 1 | 1 | 1 | 0 | 0 | 1 | 0 | 1 |
| 62 | 0 | 1 | 1 | 0 | 1 | 1 | 1 | 1 | 1 | 1 | 1 | 0 | 0 | 1 | 0 | 1 |
| 63 | 1 | 1 | 1 | 0 | 0 | 1 | 0 | 1 | 1 | 1 | 1 | 0 | 0 | 0 | 1 | 1 |
| 64 | 0 | 0 | 0 | 1 | 1 | 1 | 1 | 1 | 0 | 0 | 0 | 0 | 1 | 0 | 0 | 1 |
| 65 | 1 | 0 | 0 | 1 | 0 | 1 | 0 | 1 | 0 | 0 | 0 | 0 | 1 | 1 | 1 | 1 |
| 66 | 0 | 1 | 0 | 1 | 1 | 0 | 1 | 0 | 0 | 0 | 0 | 0 | 1 | 1 | 1 | 1 |
| 67 | 1 | 1 | 0 | 1 | 0 | 0 | 0 | 0 | 0 | 0 | 0 | 0 | 1 | 0 | 0 | 1 |
| 68 | 0 | 0 | 0 | 1 | 1 | 1 | 1 | 0 | 1 | 0 | 0 | 0 | 0 | 0 | 1 | 0 |
| 69 | 1 | 0 | 0 | 1 | 0 | 1 | 0 | 0 | 1 | 0 | 0 | 0 | 0 | 1 | 0 | 0 |
| 70 | 0 | 1 | 0 | 1 | 1 | 0 | 1 | 1 | 1 | 0 | 0 | 0 | 0 | 1 | 0 | 0 |
| 71 | 1 | 1 | 0 | 1 | 0 | 0 | 0 | 1 | 1 | 0 | 0 | 0 | 0 | 0 | 1 | 0 |
| 72 | 0 | 0 | 1 | 1 | 0 | 1 | 1 | 0 | 0 | 0 | 0 | 0 | 1 | 1 | 1 | 0 |
| 73 | 1 | 0 | 1 | 1 | 1 | 1 | 0 | 0 | 0 | 0 | 0 | 0 | 1 | 0 | 0 | 0 |
| 74 | 0 | 1 | 1 | 1 | 0 | 0 | 1 | 1 | 0 | 0 | 0 | 0 | 1 | 0 | 0 | 0 |
| 75 | 1 | 1 | 1 | 1 | 1 | 0 | 0 | 1 | 0 | 0 | 0 | 0 | 1 | 1 | 1 | 0 |
| 76 | 0 | 0 | 1 | 1 | 0 | 1 | 1 | 1 | 1 | 0 | 0 | 0 | 0 | 1 | 0 | 1 |
| 77 | 1 | 0 | 1 | 1 | 1 | 1 | 0 | 1 | 1 | 0 | 0 | 0 | 0 | 0 | 1 | 1 |
| 78 | 0 | 1 | 1 | 1 | 0 | 0 | 1 | 0 | 1 | 0 | 0 | 0 | 0 | 0 | 1 | 1 |
| 79 | 1 | 1 | 1 | 1 | 1 | 0 | 0 | 0 | 1 | 0 | 0 | 0 | 0 | 1 | 0 | 1 |
| 80 | 0 | 0 | 0 | 1 | 0 | 0 | 0 | 0 | 0 | 1 | 0 | 0 | 1 | 1 | 0 | 0 |
| 81 | 1 | 0 | 0 | 1 | 1 | 0 | 1 | 0 | 0 | 1 | 0 | 0 | 1 | 0 | 1 | 0 |
| 82 | 0 | 1 | 0 | 1 | 0 | 1 | 0 | 1 | 0 | 1 | 0 | 0 | 1 | 0 | 1 | 0 |
| 83 | 1 | 1 | 0 | 1 | 1 | 1 | 1 | 1 | 0 | 1 | 0 | 0 | 1 | 1 | 0 | 0 |
| 84 | 0 | 0 | 0 | 1 | 0 | 0 | 0 | 1 | 1 | 1 | 0 | 0 | 0 | 1 | 1 | 1 |
| 85 | 1 | 0 | 0 | 1 | 1 | 0 | 1 | 1 | 1 | 1 | 0 | 0 | 0 | 0 | 0 | 1 |
| 86 | 0 | 1 | 0 | 1 | 0 | 1 | 0 | 0 | 1 | 1 | 0 | 0 | 0 | 0 | 0 | 1 |
| 87 | 1 | 1 | 0 | 1 | 1 | 1 | 1 | 0 | 1 | 1 | 0 | 0 | 0 | 1 | 1 | 1 |
| 88 | 0 | 0 | 1 | 1 | 1 | 0 | 0 | 1 | 0 | 1 | 0 | 0 | 1 | 0 | 1 | 1 |
| 89 | 1 | 0 | 1 | 1 | 0 | 0 | 1 | 1 | 0 | 1 | 0 | 0 | 1 | 1 | 0 | 1 |
| 90 | 0 | 1 | 1 | 1 | 1 | 1 | 0 | 0 | 0 | 1 | 0 | 0 | 1 | 1 | 0 | 1 |
| 91 | 1 | 1 | 1 | 1 | 0 | 1 | 1 | 0 | 0 | 1 | 0 | 0 | 1 | 0 | 1 | 1 |
| 92 | 0 | 0 | 1 | 1 | 1 | 0 | 0 | 0 | 1 | 1 | 0 | 0 | 0 | 0 | 0 | 0 |
| 93 | 1 | 0 | 1 | 1 | 0 | 0 | 1 | 0 | 1 | 1 | 0 | 0 | 0 | 1 | 1 | 0 |
| 94 | 0 | 1 | 1 | 1 | 1 | 1 | 0 | 1 | 1 | 1 | 0 | 0 | 0 | 1 | 1 | 0 |
| 95 | 1 | 1 | 1 | 1 | 0 | 1 | 1 | 1 | 1 | 1 | 0 | 0 | 0 | 0 | 0 | 0 |
| 96 | 0 | 0 | 0 | 1 | 0 | 0 | 0 | 1 | 0 | 0 | 1 | 0 | 0 | 0 | 0 | 0 |
| 97 | 1 | 0 | 0 | 1 | 1 | 0 | 1 | 1 | 0 | 0 | 1 | 0 | 0 | 1 | 1 | 0 |
| 98 | 0 | 1 | 0 | 1 | 0 | 1 | 0 | 0 | 0 | 0 | 1 | 0 | 0 | 1 | 1 | 0 |
| 99 | 1 | 1 | 0 | 1 | 1 | 1 | 1 | 0 | 0 | 0 | 1 | 0 | 0 | 0 | 0 | 0 |
| 100 | 0 | 0 | 0 | 1 | 0 | 0 | 0 | 0 | 1 | 0 | 1 | 0 | 1 | 0 | 1 | 1 |
| 101 | 1 | 0 | 0 | 1 | 1 | 0 | 1 | 0 | 1 | 0 | 1 | 0 | 1 | 1 | 0 | 1 |
| 102 | 0 | 1 | 0 | 1 | 0 | 1 | 0 | 1 | 1 | 0 | 1 | 0 | 1 | 1 | 0 | 1 |

TABLE II-continued

| | | | | | | | | | | | | | | | | |
|---|---|---|---|---|---|---|---|---|---|---|---|---|---|---|---|---|
| 103 | 1 | 1 | 0 | 1 | 1 | 1 | 1 | 1 | 1 | 0 | 1 | 0 | 1 | 0 | 1 | 1 |
| 104 | 0 | 0 | 1 | 1 | 1 | 0 | 0 | 0 | 0 | 0 | 1 | 0 | 0 | 1 | 1 | 1 |
| 105 | 1 | 0 | 1 | 1 | 0 | 0 | 1 | 0 | 0 | 0 | 1 | 0 | 0 | 0 | 0 | 1 |
| 106 | 0 | 1 | 1 | 1 | 1 | 1 | 0 | 1 | 0 | 0 | 1 | 0 | 0 | 0 | 0 | 1 |
| 107 | 1 | 1 | 1 | 1 | 0 | 1 | 1 | 1 | 0 | 0 | 1 | 0 | 0 | 1 | 1 | 1 |
| 108 | 0 | 0 | 1 | 1 | 1 | 0 | 0 | 1 | 1 | 0 | 1 | 0 | 1 | 1 | 0 | 0 |
| 109 | 1 | 0 | 1 | 1 | 0 | 0 | 1 | 1 | 1 | 0 | 1 | 0 | 1 | 0 | 1 | 0 |
| 110 | 0 | 1 | 1 | 1 | 1 | 1 | 0 | 0 | 1 | 0 | 1 | 0 | 1 | 0 | 1 | 0 |
| 111 | 1 | 1 | 1 | 1 | 0 | 1 | 1 | 0 | 1 | 0 | 1 | 0 | 1 | 1 | 0 | 0 |
| 112 | 0 | 0 | 0 | 1 | 1 | 1 | 1 | 0 | 0 | 1 | 1 | 0 | 0 | 1 | 0 | 1 |
| 113 | 1 | 0 | 0 | 1 | 0 | 1 | 0 | 0 | 0 | 1 | 1 | 0 | 0 | 0 | 1 | 1 |
| 114 | 0 | 1 | 0 | 1 | 1 | 0 | 1 | 1 | 0 | 1 | 1 | 0 | 0 | 0 | 1 | 1 |
| 115 | 1 | 1 | 0 | 1 | 0 | 0 | 0 | 1 | 0 | 1 | 1 | 0 | 0 | 1 | 0 | 1 |
| 116 | 0 | 0 | 0 | 1 | 1 | 1 | 1 | 1 | 1 | 1 | 1 | 0 | 1 | 1 | 1 | 0 |
| 117 | 1 | 0 | 0 | 1 | 0 | 1 | 0 | 1 | 1 | 1 | 1 | 0 | 1 | 0 | 0 | 0 |
| 118 | 0 | 1 | 0 | 1 | 1 | 0 | 1 | 0 | 1 | 1 | 1 | 0 | 1 | 0 | 0 | 0 |
| 119 | 1 | 1 | 0 | 1 | 0 | 0 | 0 | 0 | 1 | 1 | 1 | 0 | 1 | 1 | 1 | 0 |
| 120 | 0 | 0 | 1 | 1 | 0 | 1 | 1 | 1 | 0 | 1 | 1 | 0 | 0 | 0 | 1 | 0 |
| 121 | 1 | 0 | 1 | 1 | 1 | 1 | 0 | 1 | 0 | 1 | 1 | 0 | 0 | 1 | 0 | 0 |
| 122 | 0 | 1 | 1 | 1 | 0 | 0 | 1 | 0 | 0 | 1 | 1 | 0 | 0 | 1 | 0 | 0 |
| 123 | 1 | 1 | 1 | 1 | 1 | 0 | 0 | 0 | 0 | 1 | 1 | 0 | 0 | 0 | 1 | 0 |
| 124 | 0 | 0 | 1 | 1 | 0 | 1 | 1 | 0 | 1 | 1 | 1 | 0 | 1 | 0 | 0 | 1 |
| 125 | 1 | 0 | 1 | 1 | 1 | 1 | 0 | 0 | 1 | 1 | 1 | 0 | 1 | 1 | 1 | 1 |
| 126 | 0 | 1 | 1 | 1 | 0 | 0 | 1 | 1 | 1 | 1 | 1 | 0 | 1 | 1 | 1 | 1 |
| 127 | 1 | 1 | 1 | 1 | 1 | 0 | 0 | 1 | 1 | 1 | 1 | 0 | 1 | 0 | 0 | 1 |
| 128 | 0 | 0 | 0 | 0 | 0 | 1 | 0 | 0 | 0 | 0 | 0 | 1 | 1 | 0 | 1 | 1 |
| 129 | 1 | 0 | 0 | 0 | 1 | 1 | 1 | 0 | 0 | 0 | 0 | 1 | 1 | 1 | 0 | 1 |
| 130 | 0 | 1 | 0 | 0 | 0 | 0 | 0 | 1 | 0 | 0 | 0 | 1 | 1 | 1 | 0 | 1 |
| 131 | 1 | 1 | 0 | 0 | 1 | 0 | 1 | 1 | 0 | 0 | 0 | 1 | 1 | 0 | 1 | 1 |
| 132 | 0 | 0 | 0 | 0 | 0 | 1 | 0 | 1 | 1 | 0 | 0 | 1 | 0 | 0 | 0 | 0 |
| 133 | 1 | 0 | 0 | 0 | 1 | 1 | 1 | 1 | 1 | 0 | 0 | 1 | 0 | 1 | 1 | 0 |
| 134 | 0 | 1 | 0 | 0 | 0 | 0 | 0 | 0 | 1 | 0 | 0 | 1 | 0 | 1 | 1 | 0 |
| 135 | 1 | 1 | 0 | 0 | 1 | 0 | 1 | 0 | 1 | 0 | 0 | 1 | 0 | 0 | 0 | 0 |
| 136 | 0 | 0 | 1 | 0 | 1 | 1 | 0 | 1 | 0 | 0 | 0 | 1 | 1 | 1 | 0 | 0 |
| 137 | 1 | 0 | 1 | 0 | 0 | 1 | 1 | 1 | 0 | 0 | 0 | 1 | 1 | 0 | 1 | 0 |
| 138 | 0 | 1 | 1 | 0 | 1 | 0 | 0 | 0 | 0 | 0 | 0 | 1 | 1 | 0 | 1 | 0 |
| 139 | 1 | 1 | 1 | 0 | 0 | 0 | 1 | 0 | 0 | 0 | 0 | 1 | 1 | 1 | 0 | 0 |
| 140 | 0 | 0 | 1 | 0 | 1 | 1 | 0 | 0 | 1 | 0 | 0 | 1 | 0 | 1 | 1 | 1 |
| 141 | 1 | 0 | 1 | 0 | 0 | 1 | 1 | 0 | 1 | 0 | 0 | 1 | 0 | 0 | 0 | 1 |
| 142 | 0 | 1 | 1 | 0 | 1 | 0 | 0 | 1 | 1 | 0 | 0 | 1 | 0 | 0 | 0 | 1 |
| 143 | 1 | 1 | 1 | 0 | 0 | 0 | 1 | 1 | 1 | 0 | 0 | 1 | 0 | 1 | 1 | 1 |
| 144 | 0 | 0 | 0 | 0 | 1 | 0 | 1 | 1 | 0 | 1 | 0 | 1 | 1 | 1 | 1 | 0 |
| 145 | 1 | 0 | 0 | 0 | 0 | 0 | 0 | 1 | 0 | 1 | 0 | 1 | 1 | 0 | 0 | 0 |
| 146 | 0 | 1 | 0 | 0 | 1 | 1 | 1 | 0 | 0 | 1 | 0 | 1 | 1 | 0 | 0 | 0 |
| 147 | 1 | 1 | 0 | 0 | 0 | 1 | 0 | 0 | 0 | 1 | 0 | 1 | 1 | 1 | 1 | 0 |
| 148 | 0 | 0 | 0 | 0 | 1 | 0 | 1 | 0 | 1 | 1 | 0 | 1 | 0 | 1 | 0 | 1 |
| 149 | 1 | 0 | 0 | 0 | 0 | 0 | 0 | 0 | 1 | 1 | 0 | 1 | 0 | 0 | 1 | 1 |
| 150 | 0 | 1 | 0 | 0 | 1 | 1 | 1 | 1 | 1 | 1 | 0 | 1 | 0 | 0 | 1 | 1 |
| 151 | 1 | 1 | 0 | 0 | 0 | 1 | 0 | 1 | 1 | 1 | 0 | 1 | 0 | 1 | 0 | 1 |
| 152 | 0 | 0 | 1 | 0 | 0 | 0 | 1 | 0 | 0 | 1 | 0 | 1 | 1 | 0 | 0 | 1 |
| 153 | 1 | 0 | 1 | 0 | 1 | 0 | 0 | 0 | 0 | 1 | 0 | 1 | 1 | 1 | 1 | 1 |
| 154 | 0 | 1 | 1 | 0 | 0 | 1 | 1 | 1 | 0 | 1 | 0 | 1 | 1 | 1 | 1 | 1 |
| 155 | 1 | 1 | 1 | 0 | 1 | 1 | 0 | 1 | 0 | 1 | 0 | 1 | 1 | 0 | 0 | 1 |
| 156 | 0 | 0 | 1 | 0 | 0 | 0 | 1 | 1 | 1 | 1 | 0 | 1 | 0 | 0 | 1 | 0 |
| 157 | 1 | 0 | 1 | 0 | 1 | 0 | 0 | 1 | 1 | 1 | 0 | 1 | 0 | 1 | 0 | 0 |
| 158 | 0 | 1 | 1 | 0 | 0 | 1 | 1 | 0 | 1 | 1 | 0 | 1 | 0 | 1 | 0 | 0 |
| 159 | 1 | 1 | 1 | 0 | 1 | 1 | 0 | 0 | 1 | 1 | 0 | 1 | 0 | 0 | 1 | 0 |
| 160 | 0 | 0 | 0 | 0 | 1 | 0 | 1 | 0 | 0 | 0 | 1 | 1 | 0 | 0 | 1 | 0 |
| 161 | 1 | 0 | 0 | 0 | 0 | 0 | 0 | 0 | 0 | 0 | 1 | 1 | 0 | 1 | 0 | 0 |
| 162 | 0 | 1 | 0 | 0 | 1 | 1 | 1 | 1 | 0 | 0 | 1 | 1 | 0 | 1 | 0 | 0 |
| 163 | 1 | 1 | 0 | 0 | 0 | 1 | 0 | 1 | 0 | 0 | 1 | 1 | 0 | 0 | 1 | 0 |
| 164 | 0 | 0 | 0 | 0 | 1 | 0 | 1 | 1 | 1 | 0 | 1 | 1 | 1 | 0 | 0 | 1 |
| 165 | 1 | 0 | 0 | 0 | 0 | 0 | 0 | 1 | 1 | 0 | 1 | 1 | 1 | 1 | 1 | 1 |
| 166 | 0 | 1 | 0 | 0 | 1 | 1 | 1 | 0 | 1 | 0 | 1 | 1 | 1 | 1 | 1 | 1 |
| 167 | 1 | 1 | 0 | 0 | 0 | 1 | 0 | 0 | 1 | 0 | 1 | 1 | 1 | 0 | 0 | 1 |
| 168 | 0 | 0 | 1 | 0 | 0 | 0 | 1 | 1 | 0 | 0 | 1 | 1 | 0 | 1 | 0 | 1 |
| 169 | 1 | 0 | 1 | 0 | 1 | 0 | 0 | 1 | 0 | 0 | 1 | 1 | 0 | 0 | 1 | 1 |
| 170 | 0 | 1 | 1 | 0 | 0 | 1 | 1 | 0 | 0 | 0 | 1 | 1 | 0 | 0 | 1 | 1 |
| 171 | 1 | 1 | 1 | 0 | 1 | 1 | 0 | 0 | 0 | 0 | 1 | 1 | 0 | 1 | 0 | 1 |
| 172 | 0 | 0 | 1 | 0 | 0 | 0 | 1 | 0 | 1 | 0 | 1 | 1 | 1 | 1 | 1 | 0 |
| 173 | 1 | 0 | 1 | 0 | 1 | 0 | 0 | 0 | 1 | 0 | 1 | 1 | 1 | 0 | 0 | 0 |
| 174 | 0 | 1 | 1 | 0 | 0 | 1 | 1 | 1 | 1 | 0 | 1 | 1 | 1 | 0 | 0 | 0 |
| 175 | 1 | 1 | 1 | 0 | 1 | 1 | 0 | 1 | 1 | 0 | 1 | 1 | 1 | 1 | 1 | 0 |
| 176 | 0 | 0 | 0 | 0 | 0 | 1 | 0 | 1 | 0 | 1 | 1 | 1 | 0 | 1 | 1 | 1 |
| 177 | 1 | 0 | 0 | 0 | 1 | 1 | 1 | 1 | 0 | 1 | 1 | 1 | 0 | 0 | 0 | 1 |
| 178 | 0 | 1 | 0 | 0 | 0 | 0 | 0 | 0 | 0 | 1 | 1 | 1 | 0 | 0 | 0 | 1 |
| 179 | 1 | 1 | 0 | 0 | 1 | 0 | 1 | 0 | 0 | 1 | 1 | 1 | 0 | 1 | 1 | 1 |
| 180 | 0 | 0 | 0 | 0 | 0 | 1 | 0 | 0 | 1 | 1 | 1 | 1 | 1 | 1 | 0 | 0 |
| 181 | 1 | 0 | 0 | 0 | 1 | 1 | 1 | 0 | 1 | 1 | 1 | 1 | 1 | 0 | 1 | 0 |
| 182 | 0 | 1 | 0 | 0 | 0 | 0 | 0 | 1 | 1 | 1 | 1 | 1 | 1 | 0 | 1 | 0 |
| 183 | 1 | 1 | 0 | 0 | 1 | 0 | 1 | 1 | 1 | 1 | 1 | 1 | 1 | 1 | 0 | 0 |
| 184 | 0 | 0 | 1 | 0 | 1 | 1 | 0 | 0 | 0 | 1 | 1 | 1 | 0 | 0 | 0 | 0 |

TABLE II-continued

| | | | | | | | | | | | | | | | | |
|---|---|---|---|---|---|---|---|---|---|---|---|---|---|---|---|---|
| 185 | 1 | 0 | 1 | 0 | 0 | 1 | 1 | 0 | 0 | 1 | 1 | 1 | 0 | 1 | 1 | 0 |
| 186 | 0 | 1 | 1 | 0 | 1 | 0 | 0 | 1 | 0 | 1 | 1 | 1 | 0 | 1 | 1 | 0 |
| 187 | 1 | 1 | 1 | 0 | 0 | 0 | 1 | 1 | 0 | 1 | 1 | 1 | 0 | 0 | 0 | 0 |
| 188 | 0 | 0 | 1 | 0 | 1 | 1 | 0 | 1 | 1 | 1 | 1 | 1 | 1 | 0 | 1 | 1 |
| 189 | 1 | 0 | 1 | 0 | 0 | 1 | 1 | 1 | 1 | 1 | 1 | 1 | 1 | 1 | 0 | 1 |
| 190 | 0 | 1 | 1 | 0 | 1 | 0 | 0 | 0 | 1 | 1 | 1 | 1 | 1 | 1 | 0 | 1 |
| 191 | 1 | 1 | 1 | 0 | 0 | 0 | 1 | 0 | 1 | 1 | 1 | 1 | 1 | 0 | 1 | 1 |
| 192 | 0 | 0 | 0 | 1 | 1 | 0 | 0 | 0 | 0 | 0 | 0 | 1 | 0 | 0 | 0 | 1 |
| 193 | 1 | 0 | 0 | 1 | 0 | 0 | 1 | 0 | 0 | 0 | 0 | 1 | 0 | 1 | 1 | 1 |
| 194 | 0 | 1 | 0 | 1 | 1 | 1 | 0 | 1 | 0 | 0 | 0 | 1 | 0 | 1 | 1 | 1 |
| 195 | 1 | 1 | 0 | 1 | 0 | 1 | 1 | 1 | 0 | 0 | 0 | 1 | 0 | 0 | 0 | 1 |
| 196 | 0 | 0 | 0 | 1 | 1 | 0 | 0 | 1 | 1 | 0 | 0 | 1 | 1 | 0 | 1 | 0 |
| 197 | 1 | 0 | 0 | 1 | 0 | 0 | 1 | 1 | 1 | 0 | 0 | 1 | 1 | 1 | 0 | 0 |
| 198 | 0 | 1 | 0 | 1 | 1 | 1 | 0 | 0 | 1 | 0 | 0 | 1 | 1 | 1 | 0 | 0 |
| 199 | 1 | 1 | 0 | 1 | 0 | 1 | 1 | 0 | 1 | 0 | 0 | 1 | 1 | 0 | 1 | 0 |
| 200 | 0 | 0 | 1 | 1 | 0 | 0 | 0 | 1 | 0 | 0 | 0 | 1 | 0 | 1 | 1 | 0 |
| 201 | 1 | 0 | 1 | 1 | 1 | 0 | 1 | 1 | 0 | 0 | 0 | 1 | 0 | 0 | 0 | 0 |
| 202 | 0 | 1 | 1 | 1 | 0 | 1 | 0 | 0 | 0 | 0 | 0 | 1 | 0 | 0 | 0 | 0 |
| 203 | 1 | 1 | 1 | 1 | 1 | 1 | 1 | 0 | 0 | 0 | 0 | 1 | 0 | 1 | 1 | 0 |
| 204 | 0 | 0 | 1 | 1 | 0 | 0 | 0 | 0 | 1 | 0 | 0 | 1 | 1 | 1 | 0 | 1 |
| 205 | 1 | 0 | 1 | 1 | 1 | 0 | 1 | 0 | 1 | 0 | 0 | 1 | 1 | 0 | 1 | 1 |
| 206 | 0 | 1 | 1 | 1 | 0 | 1 | 0 | 1 | 1 | 0 | 0 | 1 | 1 | 0 | 1 | 1 |
| 207 | 1 | 1 | 1 | 1 | 1 | 1 | 1 | 1 | 1 | 0 | 0 | 1 | 1 | 1 | 0 | 1 |
| 208 | 0 | 0 | 0 | 1 | 0 | 1 | 1 | 1 | 0 | 1 | 0 | 1 | 0 | 1 | 0 | 0 |
| 209 | 1 | 0 | 0 | 1 | 1 | 1 | 0 | 1 | 0 | 1 | 0 | 1 | 0 | 0 | 1 | 0 |
| 210 | 0 | 1 | 0 | 1 | 0 | 0 | 1 | 0 | 0 | 1 | 0 | 1 | 0 | 0 | 1 | 0 |
| 211 | 1 | 1 | 0 | 1 | 1 | 0 | 0 | 0 | 0 | 1 | 0 | 1 | 0 | 1 | 0 | 0 |
| 212 | 0 | 0 | 0 | 1 | 0 | 1 | 1 | 0 | 1 | 1 | 0 | 1 | 1 | 1 | 1 | 1 |
| 213 | 1 | 0 | 0 | 1 | 1 | 1 | 0 | 0 | 1 | 1 | 0 | 1 | 1 | 0 | 0 | 1 |
| 214 | 0 | 1 | 0 | 1 | 0 | 0 | 1 | 1 | 1 | 1 | 0 | 1 | 1 | 0 | 0 | 1 |
| 215 | 1 | 1 | 0 | 1 | 1 | 0 | 0 | 1 | 1 | 1 | 0 | 1 | 1 | 1 | 1 | 1 |
| 216 | 0 | 0 | 1 | 1 | 1 | 1 | 1 | 0 | 0 | 1 | 0 | 1 | 0 | 0 | 1 | 1 |
| 217 | 1 | 0 | 1 | 1 | 0 | 1 | 0 | 0 | 0 | 1 | 0 | 1 | 0 | 1 | 0 | 1 |
| 218 | 0 | 1 | 1 | 1 | 1 | 0 | 1 | 1 | 0 | 1 | 0 | 1 | 0 | 1 | 0 | 1 |
| 219 | 1 | 1 | 1 | 1 | 0 | 0 | 0 | 1 | 0 | 1 | 0 | 1 | 0 | 0 | 1 | 1 |
| 220 | 0 | 0 | 1 | 1 | 1 | 1 | 1 | 1 | 1 | 0 | 1 | 1 | 0 | 0 | 0 | 0 |
| 221 | 1 | 0 | 1 | 1 | 0 | 1 | 0 | 1 | 1 | 1 | 0 | 1 | 1 | 1 | 1 | 0 |
| 222 | 0 | 1 | 1 | 1 | 1 | 0 | 1 | 0 | 1 | 1 | 0 | 1 | 1 | 1 | 1 | 0 |
| 223 | 1 | 1 | 1 | 1 | 0 | 0 | 0 | 0 | 1 | 1 | 0 | 1 | 1 | 0 | 0 | 0 |
| 224 | 0 | 0 | 0 | 1 | 0 | 1 | 1 | 0 | 0 | 0 | 1 | 1 | 1 | 0 | 0 | 0 |
| 225 | 1 | 0 | 0 | 1 | 1 | 1 | 0 | 0 | 0 | 0 | 1 | 1 | 1 | 1 | 1 | 0 |
| 226 | 0 | 1 | 0 | 1 | 0 | 0 | 1 | 1 | 0 | 0 | 1 | 1 | 1 | 1 | 1 | 0 |
| 227 | 1 | 1 | 0 | 1 | 1 | 0 | 0 | 1 | 0 | 0 | 1 | 1 | 1 | 0 | 0 | 0 |
| 228 | 0 | 0 | 0 | 1 | 0 | 1 | 1 | 1 | 1 | 0 | 1 | 1 | 0 | 0 | 1 | 1 |
| 229 | 1 | 0 | 0 | 1 | 1 | 1 | 0 | 1 | 1 | 0 | 1 | 1 | 0 | 1 | 0 | 1 |
| 230 | 0 | 1 | 0 | 1 | 0 | 0 | 1 | 0 | 1 | 0 | 1 | 1 | 0 | 1 | 0 | 1 |
| 231 | 1 | 1 | 0 | 1 | 1 | 0 | 0 | 0 | 1 | 0 | 1 | 1 | 0 | 0 | 1 | 1 |
| 232 | 0 | 0 | 1 | 1 | 1 | 1 | 1 | 1 | 0 | 0 | 1 | 1 | 1 | 1 | 1 | 1 |
| 233 | 1 | 0 | 1 | 1 | 0 | 1 | 0 | 1 | 0 | 0 | 1 | 1 | 1 | 0 | 0 | 1 |
| 234 | 0 | 1 | 1 | 1 | 1 | 0 | 1 | 0 | 0 | 0 | 1 | 1 | 1 | 0 | 0 | 1 |
| 235 | 1 | 1 | 1 | 1 | 0 | 0 | 0 | 0 | 0 | 0 | 1 | 1 | 1 | 1 | 1 | 1 |
| 236 | 0 | 0 | 1 | 1 | 1 | 1 | 1 | 0 | 1 | 0 | 1 | 1 | 0 | 1 | 0 | 0 |
| 237 | 1 | 0 | 1 | 1 | 0 | 1 | 0 | 0 | 1 | 0 | 1 | 1 | 0 | 0 | 1 | 0 |
| 238 | 0 | 1 | 1 | 1 | 1 | 0 | 1 | 1 | 1 | 0 | 1 | 1 | 0 | 0 | 1 | 0 |
| 239 | 1 | 1 | 1 | 1 | 0 | 0 | 0 | 1 | 1 | 0 | 1 | 1 | 0 | 1 | 0 | 0 |
| 240 | 0 | 0 | 0 | 1 | 1 | 0 | 0 | 1 | 0 | 1 | 1 | 1 | 1 | 1 | 0 | 1 |
| 241 | 1 | 0 | 0 | 1 | 0 | 0 | 1 | 1 | 0 | 1 | 1 | 1 | 1 | 0 | 1 | 1 |
| 242 | 0 | 1 | 0 | 1 | 1 | 0 | 0 | 0 | 0 | 1 | 1 | 1 | 1 | 0 | 1 | 1 |
| 243 | 1 | 1 | 0 | 1 | 0 | 1 | 1 | 0 | 0 | 1 | 1 | 1 | 1 | 1 | 0 | 1 |
| 244 | 0 | 0 | 0 | 1 | 1 | 0 | 0 | 0 | 1 | 1 | 1 | 1 | 0 | 1 | 1 | 0 |
| 245 | 1 | 0 | 0 | 1 | 0 | 0 | 1 | 0 | 1 | 1 | 1 | 1 | 0 | 0 | 0 | 0 |
| 246 | 0 | 1 | 0 | 1 | 1 | 1 | 0 | 1 | 1 | 1 | 1 | 1 | 0 | 0 | 0 | 0 |
| 247 | 1 | 1 | 0 | 1 | 0 | 1 | 1 | 1 | 1 | 1 | 1 | 1 | 0 | 1 | 1 | 0 |
| 248 | 0 | 0 | 1 | 1 | 0 | 0 | 0 | 0 | 1 | 1 | 1 | 1 | 1 | 0 | 1 | 0 |
| 249 | 1 | 0 | 1 | 1 | 1 | 0 | 1 | 0 | 0 | 1 | 1 | 1 | 1 | 1 | 0 | 0 |
| 250 | 0 | 1 | 1 | 1 | 0 | 1 | 0 | 1 | 0 | 1 | 1 | 1 | 1 | 1 | 0 | 0 |
| 251 | 1 | 1 | 1 | 1 | 1 | 1 | 1 | 0 | 1 | 1 | 1 | 1 | 1 | 0 | 1 | 0 |
| 252 | 0 | 0 | 1 | 1 | 0 | 0 | 0 | 1 | 1 | 1 | 1 | 1 | 0 | 0 | 0 | 1 |
| 253 | 1 | 0 | 1 | 1 | 1 | 0 | 1 | 1 | 1 | 1 | 1 | 1 | 0 | 1 | 1 | 1 |
| 254 | 0 | 1 | 1 | 1 | 0 | 1 | 0 | 0 | 1 | 1 | 1 | 1 | 0 | 1 | 1 | 1 |
| 255 | 1 | 1 | 1 | 1 | 1 | 1 | 0 | 1 | 1 | 1 | 1 | 0 | 0 | 0 | 1 | |

What is claimed is:

1. A computer network for coupling computing equipment located in a plurality of subscriber locations through a telephone system, said network comprising a plurality of network units coupled by communication links, said communication link being capable of communicating digital data in a first mode using at least a first and a second data rate, said communication link includes a first subscriber loop and a second subscriber loop, said digital data being organized into a plurality of frame on said communication link, each said frame including synchronization data, command data, error correcting data, and user data, each network unit of said plurality of network units comprising:

address storage means for storing an identification address identifying said network unit;

synchronization data generation means for generating said synchronization data;

command data generation means for generating said command data;

error correcting data generation means for generating said error correcting data;

user data generation means for generating said user data;

frame generation means for generating said frame to be communicated on said communication links by combining said synchronization data generated by said synchronization data generation means, said command data generated by said command data generation means, said error correcting data generated by said error correcting data generation means, and said user data generated by said user data generating means;

frame receiving means for receiving said plurality of frames from other network units communicated to said network unit on said communication links in said computer network using said first data rate;

command retrieving means for retrieving a command from each of said plurality of frames received by said frame receiving means, said command being specified by command data in said frame received by said frame receiving means;

means for causing said command data generation means to generate said command data in response to at least one of said commands retrieved by said command retrieving means;

frame transmitting means for transmitting said frame generated by said frame generating means on said communication links to other network units in said computer network using said first data rate;

means for executing at least one of said commands retrieved by said command retrieving means specifying said identification address as the target for said commands;

means, in response to at least one of said commands retrieved by said command retrieving means, for causing said frame receiving means to receive said plurality of frames using said second data rate and for causing said frame transmitting means to transmit said plurality of frames using said second data rate;

at least one of said network units comprising:

command port means for receiving a plurality of computer commands from a control computer connected thereto, said plurality of computer commands to be executed by one or more of said network units;

means for causing said command data generation means to generate said command data in response to at least one of said computer commands received by said command port means;

means for causing said frame generation means to generate said frame containing said command data generated in responses to at least one of said plurality of computer commands;

means for causing said frame transmitting means to transmit said frame containing said command data generated in response to at least one of said plurality of computer commands;

at least one of said network units comprising a digital service unit, said digital service unit comprising:

user data receiving means for receiving data from data processing equipment on a subscriber's premises;

means for transmitting data to said data processing equipment;

means for causing said user data generation means to generate said user data comprising said data received by said user data receiving means;

means for causing said frame generation means to generate said frame including said user data generated by said user data generation means;

means for causing said frame transmitting means to transmit said frame on said first subscriber loop communication link;

second subscriber loop receiving means for receiving at least one of said frame on said second subscriber loop communicating link, said second subscriber loop receiving means including means for detecting transmission errors in said frame and means for correcting said transmission errors if said transmission errors comprise no more than a predetermined number, N, single bit errors, where N>0;

user data retrieving means for retrieving said user data contained in said frame received on said second subscriber loop communication link by said second subscriber loop receiving means; and means for causing said means for transmitting data to said data processing equipment to send said retrieved user data contained in said frame received on said second subscriber loop communication link to said data processing equipment.

2. The computer network of claim 1 wherein said communication links comprises a time domain multiplexed communication link having a plurality of channels and at least one of said network units comprises an office control unit, said office control unit comprising:

first port means for receiving at least one of said plurality of frames on said first subscriber loop communication link connected to said office control unit;

second port means for transmitting said frame received by said first port means on a predetermined channel of said time domain multiplexed communication link connected to said office control unit;

third port means for receiving at least one of said plurality of frames on said predetermined channel of said time domain multiplexed communication link; and fourth port means for transmitting said frame received on said third port means on said second subscriber loop communication link connected to said office control unit.

3. The computer network of claim 2 wherein each said channel of said time domain multiplexed communication link comprising means for transmitting data and means for receiving data, said data being transmitted and received in data packets, one byte of said data from each said channel being transmitted or received in each said data packet, said data being transmitted or received in each said channel at a rate equal to T and wherein at least one of said frames is transmitted by one of said office control unit on said time domain multiplexed communication link by transmitting bytes comprising 7 bit segments of said frames and a one bit in each said packet, and wherein at least one of said frames is received by said office control unit from said time domain multiplexed communication link as a plurality of data bytes, each said data byte comprising a 7 bit segment of said frame and a one bit.

4. The computer network of claim 3 wherein each said network unit further comprises means responsive to a predetermined said command retrieved from said command retrieving means for storing a digital value specifying a selected one of said first and said second data rates to be used in transmitting data within said communication links, and wherein said data is transmitted or received on said first and second subscriber loop communication links at said selected data rate, said selected data rate being chosen from a plurality of discrete values.

5. The computer network of claim 4 wherein each of said office control units further comprise:
   means coupled to said second port means for transmitting each said byte on said time domain multiplexed communication link a number of times in response to said selected data rate, said number, P, being equal to or greater than one; and
   means coupled to said third port means for recovering an error corrected byte from said P repeated transmissions utilizing a majority decision algorithm for correcting transmission errors.

6. The computer network of claim 5 wherein at least one of said network unit comprises a multijunction unit connected to first, second, and third channels of one of said time domain multiplexed communication links in said telephone system, said multijunction unit comprising:
   means for receiving frames on said first channel;
   means for transmitting each said frame received on said first channel on said second and third channels;
   means for receiving frames on said second channel;
   means for receiving frames on said third channel;
   means for combining the data in each frame received on said second channel with the data in each frame received on said third channel to form a combined frame; and
   means for transmitting said combined frame on said first channel.

7. The computer network of claim 6 wherein said combining means comprises means for ORing each bit in said frame received on said second channel with a corresponding bit of said frame received on said third channel.

8. The computer network of claim 7 wherein each said office control unit comprises:
   error correcting code encrypting means for generating first and second encrypted transmission bytes from each of said bytes comprising said 7-bit segment of said frame, said first encrypted transmission byte being transmitted by said second port means;
   fifth port means for transmitting said second encrypted transmission byte on an error correct channel comprising one of said channels of said time domain multiplexed communication link;
   sixth port means for receiving said second encrypted transmission bytes from said error correcting channel; and
   error correcting code decrypting means connected to said third and sixth port means for decrypting at least one of said bytes, said error correcting code decrypting means comprising means for decrypting said segment of said frame encrypted by at least one of said error correcting code encrypting means connected to said time domain multiplexed communication link, said error correcting code encrypting means and said error correcting decrypting means, said fifth port, and said sixth port being enabled in response to the receipt of one of said predetermined commands.

9. The computer network of claim 7 wherein each said digital service unit further comprises:
   means for specifying one of two states, master or slave, for said digital service unit, no more than one digital service unit in said computer network being in said master state at any given time;
   means responsive to a predetermined command retrieved from said command retrieving means for storing a digital value specifying a maximum error rate and a minimum error rate;
   means for determining an error rate comprising means for determining the number of said transmission errors detected by said digital service unit in a predetermined period of time and for generating a high error signal if said error rate is greater than said maximum error rate and a low error signal if said error rate is less than said minimum error rate;
   means, responsive to said digital service unit being in said slave state and said high error signal, for causing said frame generation means to insert a fallback command specifying that said maximum error rate had been exceed in said frame;
   means, responsive to said digital service unit being in said master state and said high error signal or the reception of said fallback command from a digital service unit said slave state, for causing said frame generation means to insert a predetermined command specifying a lower network transmission rate in said frame;
   means responsive to said digital service unit being in said slave state and said low error signal, for causing said frame generation means to insert a jumpup command specifying that said low error signal had been generated in said frame;
   means, responsive to said digital service unit being in said master state, said low error signal, and the receipt of said fallback command from one of said digital service units in said slave state, for causing said frame generation means to insert a predetermined command specifying a higher network transmission rate; and in said frame
   means for causing said frame transmitting means to transmit said frame generated by said frame generation means.

10. The computer network of claim 9 wherein said command data included in each said frame comprise a security flag having a first state and a second state, said first state specifying said command included in said frame originated in one of said digital service unit and said second state specifying that said command originated in a network unit other than said digital service unit specified by said first state, and wherein each said office control unit further comprises means for setting said flag to said first state in each said frame received on one of said first subscriber loop communication links connected thereto.

11. The computer network of claim 10 wherein the number of bits containing user data in each said frame is either a first or second predetermined number, said number being specified by the value of a predetermined bit in said command data, and wherein each said digital service unit further comprises:
   buffer means for storing said received data from said data processing equipment;

means for determining the amount of data in said buffer; and means, responsive to a clock signal received on either said first or said second subscriber loop communication link and to the amount of data in said buffer, for determining which of said first or second predetermined numbers of data bits will be used in the next said frame transmitted from said digital service unit on said first subscriber loop communication link.

12. The computer network of claim 10 wherein each said network unit further comprises means responsive to a predetermined said command retrieved by said command retrieving means for entering a reset state in which said address value in said address storing means is set to a predetermined value and wherein each said means for transmitting a frame is inhibited from so transmitting said frame received by said frame receiving means, and wherein said network unit exits said reset state when said command retrieving means retrieves a predetermined said command including a new address value, said network unit storing said new address value in said address storing means.

13. The computer network of claim 12 wherein each said port of one of said multijunction units remains blocked from transmitting frames received by said multijunction unit when said multijunction unit exits said reset state, said ports being selectively unblocked when said multijunction unit receives a predetermined said command specifying at least one of said ports to be unblocked.

14. The computer network of claim 10 wherein each said network unit further comprises means, responsive to a predetermined said command retrieved from said command retrieving means, for causing said frame generation means to insert an ACK command into said frame, said frame being transmitted by said frame transmitting means, said ACK command including data specifying whether said network unit is one of said multijunction unit, said digital service unit, or said office control unit and a value stored in said address storage means.

15. The computer network of claim 8 wherein each said network unit further comprises means for transmitting and means for receiving digital data in a second mode in which said data is transmitted in 9-bit data words on said subscriber loop communication links and in 8-bit data words on said time domain multiplexed communication links, each said 9-bit data work comprising one byte of said user data and a "1" and each said 8-bit data word comprising a byte of said user data, each said network unit further comprising:

means, responsive to a predetermined one of said commands retrieved from said command retrieving means for switching from said first mode to said second mode; and means, responsive to the receipt of a predetermined sequence of bytes of said user data on said subscriber loop communication link, for switching from said second mode to said first mode.

16. The computer network of claim 15 wherein when said network units transmit data in said second mode, each office control unit transmits and receives data on said time domain multiplexed communication link by transmitting and receiving, respectively, said bytes of said user data in place of said bytes comprising 7-bit segments of said frame and a "1".

* * * * *

UNITED STATES PATENT AND TRADEMARK OFFICE
CERTIFICATE OF CORRECTION

PATENT NO. : 5,124,943

DATED : June 23, 1992

INVENTOR(S) : Lubarsky

It is certified that error appears in the above-identified patent and that said Letters Patent is hereby corrected as shown below:

Column 22, line 11, delete "commands" and insert therefor --Commands--.

Column 29, line 40, delete "ntwork" and insert therefor --network--.

Column 48, line 14, delete "communicating" and insert therefor --communication--.

Column 50, line 52, after "specifying" insert --that--.

Column 52, line 15, delete "work" and insert therefor --word--.

Table II, line 96, column 1y4, delete "1" and insert therefor --0--.

Column 1, line 59, delete "an".

Column 2, line 60, delete "networks" and insert therefor --network--.

Column 22, line 17, delete "to" and insert therefor --of--.

Column 24, line 44, delete "send" and insert therefor --sent--.

Column 24, line 65, delete "kbits" and insert therefor --Kbits--.

Column 28, line 28, delete "a" and insert therefor --an--.

Column 28, line 30, delete "loses" and insert therefor --lose--.

Column 28, line 31, delete "is".

Column 28, line 31, after "not" insert --be--.

Column 29, line 4, delete "a".

UNITED STATES PATENT AND TRADEMARK OFFICE
CERTIFICATE OF CORRECTION

PATENT NO. : 5,124,943
DATED : June 23, 1992
INVENTOR(S) : Lubarsky

It is certified that error appears in the above-identified patent and that said Letters Patent is hereby corrected as shown below:

Column 32, line 19, delete "features" and insert therefor --feature--.

Column 33, line 18, after "of" delete "as".

Column 34, line 21, delete "instructions" and insert therefor --instruction--.

Column 46, line 63, delete "frame" and insert therefor --frames--.

Column 50, line 26, delete "exceed" and insert therefor --exceeded--.

Signed and Sealed this

Twelfth Day of October, 1993

Attest:

BRUCE LEHMAN

*Attesting Officer*  *Commissioner of Patents and Trademarks*